United States Patent
Park et al.

(10) Patent No.: US 10,027,395 B2
(45) Date of Patent: Jul. 17, 2018

(54) METHOD AND DEVICE FOR REPORTING CHANNEL STATE INFORMATION IN WIRELESS COMMUNICATION SYSTEM

(71) Applicants: LG ELECTRONICS INC., Seoul (KR); SOGANG UNIVERSITY RESEARCH FOUNDATION, Seoul (KR)

(72) Inventors: Jonghyun Park, Seoul (KR); Yoonsoo Kim, Seoul (KR); Wonjin Sung, Seoul (KR); Jihoon Sung, Seoul (KR); Hosik Kang, Seoul (KR)

(73) Assignees: LG Electronics Inc., Seoul (KR); SOGANG UNIVERSITY RESEARCH FOUNDATION, Seoul (KR)

( * ) Notice: Subject to any disclaimer, the term of this patent is extended or adjusted under 35 U.S.C. 154(b) by 157 days.

(21) Appl. No.: 14/913,641

(22) PCT Filed: Oct. 24, 2014

(86) PCT No.: PCT/KR2014/010063
§ 371 (c)(1),
(2) Date: Feb. 22, 2016

(87) PCT Pub. No.: WO2015/060681
PCT Pub. Date: Apr. 30, 2015

(65) Prior Publication Data
US 2016/0212643 A1    Jul. 21, 2016

Related U.S. Application Data

(60) Provisional application No. 61/894,920, filed on Oct. 24, 2013, provisional application No. 61/918,649, (Continued)

(51) Int. Cl.
*H04B 7/06* (2006.01)
*H04L 5/00* (2006.01)
(Continued)

(52) U.S. Cl.
CPC ......... *H04B 7/0626* (2013.01); *H04B 7/0417* (2013.01); *H04B 7/0456* (2013.01);
(Continued)

(58) Field of Classification Search
CPC .. H04B 7/0626; H04B 7/0417; H04B 7/0456; H04B 7/0478
See application file for complete search history.

(56) References Cited

U.S. PATENT DOCUMENTS

2009/0046807 A1* 2/2009 Xia .................. H04B 7/0617
375/299
2010/0142633 A1* 6/2010 Yu .................... H04B 7/0417
375/260
(Continued)

FOREIGN PATENT DOCUMENTS

KR  10-2012-0093027 A   8/2012
WO  WO 2010/123287 A2   10/2010
(Continued)

OTHER PUBLICATIONS

Alcatel-Lucent Shanghai Bell et al., "Considerations on CSI Feedback Enhancements for High-priority Antenna Configurations," 3GPP TSG-RAN WG1 #66, R1-112420, Athens, Greece, Aug. 22-26, 2011, 7 pages.

*Primary Examiner* — Derrick Ferris
*Assistant Examiner* — Kevin Lee
(74) *Attorney, Agent, or Firm* — Birch, Stewart, Kolasch & Birch, LLP

(57) ABSTRACT

A method and device for reporting channel state information in a wireless communication system is disclosed. The
(Continued)

method for reporting channel state information (CSI) by means of a terminal in a wireless communication system according to an embodiment of the present invention includes: measuring a first reference signal transmitted from a first subset of antenna ports from among a plurality of antenna ports in a base station; measuring a second reference signal transmitted from a second subset of antenna ports from among the plurality of antenna ports; and reporting the CSI to the base station based on at least one of the measurement of the first reference signal and the measurement of the second reference signal, wherein at least one of the plurality of antenna ports is included in both the first subset and the second subset.

9 Claims, 40 Drawing Sheets

Related U.S. Application Data filed on Dec. 19, 2013, provisional application No. 62/055,646, filed on Sep. 25, 2014.

(51) Int. Cl.
*H04B 7/0456* (2017.01)
*H04B 7/0417* (2017.01)
*H04W 24/08* (2009.01)

(52) U.S. Cl.
CPC ........ *H04B 7/0478* (2013.01); *H04L 5/0023* (2013.01); *H04L 5/0048* (2013.01); *H04W 24/08* (2013.01); *H04B 7/0628* (2013.01)

(56) References Cited

U.S. PATENT DOCUMENTS

| | | |
|---|---|---|
| 2010/0166100 A1 | 7/2010 | Medvedev et al. |
| 2011/0176634 A1 | 7/2011 | Yoon et al. |
| 2011/0281536 A1 | 11/2011 | Lee et al. |
| 2012/0039298 A1 | 2/2012 | Lee et al. |
| 2012/0201318 A1* | 8/2012 | Seo ................ H04L 5/0023 375/260 |
| 2012/0213113 A1* | 8/2012 | Zhao ............... H04B 7/0626 370/252 |
| 2013/0028182 A1 | 1/2013 | Geirhofer et al. |
| 2013/0051240 A1 | 2/2013 | Bhattad et al. |
| 2013/0142125 A1 | 6/2013 | Shimezawa et al. |
| 2013/0194940 A1* | 8/2013 | Li .................. H04J 11/0023 370/252 |
| 2014/0321414 A1 | 10/2014 | Chun et al. |

FOREIGN PATENT DOCUMENTS

| | | |
|---|---|---|
| WO | WO 2013/003974 A1 | 1/2013 |
| WO | WO 2013/085271 A1 | 6/2013 |

* cited by examiner

FIG. 2
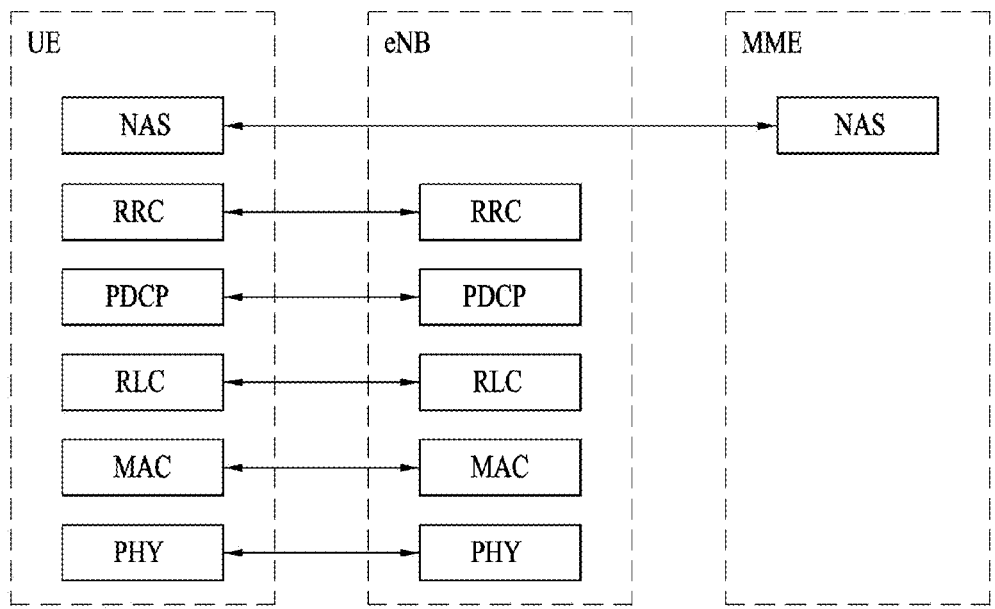
(a) control-plane protocol stack
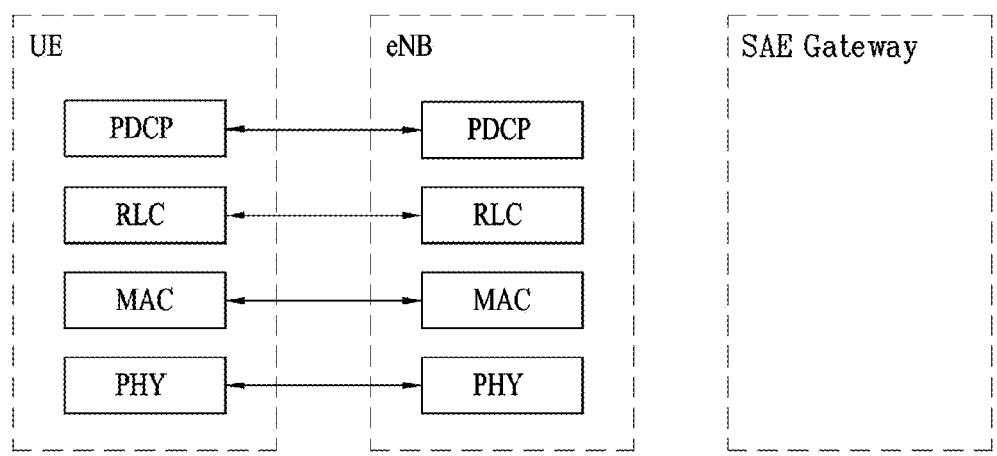
(b) user-plane protocol stack ☐ : DMRS group 1

☐ : DMRS group 2

FIG. 15

| Beamforming | Code-book size | | M = 2, L = 2 | M = 4, L = 2 | M = 8, L = 4 | M = 16, L = 4 |
|---|---|---|---|---|---|---|
| Perfect CSI-T | ∞ | μ | 4.00 | 8.00 | 16.00 | 32.00 |
| | | Ratio | 100% | 100% | 100% | 100% |
| Quantized-V | $4^{M-1}$ | μ | 3.35 | 6.16 | 11.56 | 21.16 |
| | | Ratio | 84.0% | 77.1% | 72.3% | 66.0% |

FIG. 19

| Beamforming | Code-book size | | M = 4, L = 2 | | M = 8, L = 4 | |
|---|---|---|---|---|---|---|
| | | | R1 | R2 | R1 | R2 |
| Perfect CSI-T | ∞ | μ | 6.22 | 8.00 | 11.03 | 16.00 |
| | | Ratio | 100% | 100% | 100% | 100% |
| Quantized-U/V (fixed U) | 4M-1 | μ | 4.49 | 5.22 | 6.90 | 8.38 |
| | | Ratio | 72.8% | 65.3% | 62.6% | 52.4% |
| Quantized-U/V (quantized U) | 4M-1 | μ | 4.49 | 5.22 | 6.90 | 8.38 |
| | | Ratio | 72.8% | 65.3% | 62.6% | 52.4% |

FIG. 21

| Beamforming | Code-book size | | M = 2, L = 2 | M = 4, L = 2 | M = 8, L = 4 | M = 16, L = 4 |
|---|---|---|---|---|---|---|
| Perfect CSI-T | ∞ | μ | 4.00 | 8.00 | 16.00 | 32.00 |
| | | Ratio | 100% | 100% | 100% | 100% |
| Quantized-H | 4M-1 | μ | 3.02 | 4.95 | 8.76 | 15.93 |
| | | Ratio | 75.7% | 62.0% | 54.8% | 49.7% |

FIG. 22

$$\mathbf{H} = \begin{bmatrix} h_{11} & h_{12} & h_{13} & h_{14} \\ h_{21} & h_{22} & h_{23} & h_{24} \end{bmatrix}$$

$$1^{st}\ feedback: \mathbf{V}\ of\ \mathbf{H}^{(1)} = \begin{bmatrix} h_{11} & h_{12} \\ h_{21} & h_{22} \end{bmatrix} \rightarrow \mathbf{V}^{(1)} \begin{Bmatrix} 1 & 1 \\ v_1^{(1)} & v_2^{(1)} \end{Bmatrix}$$

$$2^{nd}\ feedback: \mathbf{V}\ of\ \mathbf{H}^{(2)} = \begin{bmatrix} h_{11} & h_{12} & h_{13} \\ h_{21} & h_{22} & h_{23} \end{bmatrix} \rightarrow \mathbf{V}^{(2)} \begin{Bmatrix} 1 & 1 \\ v_1^{(2)} & v_2^{(2)} \\ v_3^{(2)} & v_4^{(2)} \end{Bmatrix}$$

$$3^{rd}\ feedback: \mathbf{V}\ of\ \mathbf{H}^{(3)} = \begin{bmatrix} h_{11} & h_{12} & h_{13} & h_{14} \\ h_{21} & h_{22} & h_{23} & h_{24} \end{bmatrix} \rightarrow \mathbf{V}^{(2)} \begin{Bmatrix} 1 & 1 \\ v_1^{(3)} & v_2^{(3)} \\ v_3^{(3)} & v_4^{(3)} \\ v_5^{(3)} & v_6^{(3)} \end{Bmatrix}$$

FIG. 24

$$\text{Beamformer } \mathbf{V} \begin{bmatrix} 1 & 1 \\ v_1^{(1)} & v_2^{(1)} \\ v_1^{(2)} & v_2^{(2)} \\ v_1^{(3)} & v_2^{(3)} \\ v_1^{(4)} & v_2^{(4)} \\ v_1^{(5)} & v_2^{(5)} \end{bmatrix}$$

$$\text{Average angle error} \begin{bmatrix} 1 & 1 \\ 31\% & 61\% \\ 27\% & 47\% \\ 22\% & 36\% \\ 16\% & 25\% \\ 0\% & 0\% \end{bmatrix}$$

FIG. 27

| Beamforming | Codebook Size | | M = 4, ℓ = 2 | | M = 16, ℓ = 4 | |
|---|---|---|---|---|---|---|
| | | | R1 | R2 | R1 | R2 |
| Perfect CSI-T | ∞ | μ | 6.22 | 8.00 | 20.39 | 32.00 |
| | | Ratio | 100% | 100% | 100% | 100% |
| Quantized-H | $4^{M-1}$ | μ | 3.98 | 4.95 | 9.41 | 15.93 |
| | | Ratio | 64.0% | 62.0% | 46.2% | 49.7% |
| Quantized-U/V | $4^{M-1}$ | μ | 4.49 | 5.24 | 10.34 | 13.36 |
| | | Ratio | 72.2% | 65.5% | 50.7% | 41.8% |
| Quantized-U/V (fixed U) | $4^{M-1}$ | μ | 4.49 | 5.22 | 10.34 | 12.21 |
| | | Ratio | 72.2% | 65.3% | 50.7% | 38.0% |
| Quantized-V | $4^{M-1}$ | μ | 4.78 | 6.16 | 13.40 | 21.16 |
| | | Ratio | 76.8% | 77.1% | 65.7% | 66.0% |
| Quantized-V (stacked) | $4^{M-1}$ | μ | 4.66 | 5.25 | 11.92 | 16.47 |
| | | Ratio | 74.9% | 65.6% | 58.4% | 51.4% |

| Parameters | Values |
|---|---|
| Cells | 2-cell model  |
| UEs | $U = 1$ UEs per sector |
| Tx antenna | $M = 16$ |
| Rx antenna | $N = 2$ |
| Noise | Noise free |
| Fading | Rayleigh fading channel |
| Pathloss model | ITU-R M.2135-1 UMa model |
| Antenna height | BS: 25m, UE: 1.5m |
| Inter-eNB distance | 500m |
| Carrier frequency | 2GHz |

FIG. 31

| Beamforming | # of feedback bits | M = 4, L = 2 | | M = 16, L = 4 | |
|---|---|---|---|---|---|
| | | R1 | R2 | R1 | R2 |
| Perfect CSI-T | ∞ | ∞ | ∞ | ∞ | ∞ |
| Quantized-H | bits per frame | 2 | 4 | 6 | 12 |
| Quantized-U/V | bits per frame | 4 | 8 | 8 | 16 |
| Quantized-U/V (fixed U) | bits per frame | 2 | 4 | 6 | 12 |
| Quantized-V | bits per frame (bits per cycle) | 2 6 | 4 12 | 6 30 | 12 60 |
| Quantized-V (stacked) | bits per frame | 2 | 4 | 6 | 12 |

METHOD AND DEVICE FOR REPORTING CHANNEL STATE INFORMATION IN WIRELESS COMMUNICATION SYSTEM

CROSS REFERENCE TO RELATED APPLICATIONS

This application is the National Phase of PCT International Application No. PCT/KR2014/010063, filed on Oct. 24, 2014, which claims priority under 35 U.S.C. 119(e) to U.S. Provisional Application No. 61/894,920, filed on Oct. 24, 2013, 61/918,649, filed on Dec. 19, 2013, 62/055,646, filed on Sep. 25, 2014, all of which are hereby expressly incorporated by reference into the present application.

TECHNICAL FIELD

The present invention relates to a wireless communication system, and more particularly, to a method of reporting channel state information in a wireless communication system and an apparatus therefor.

BACKGROUND ART

A brief description is now given of a 3rd Generation Partnership Project Long Term Evolution (3GPP LTE or, simply, LTE) communication system as an example of a wireless communication system to which the present invention is applicable.

FIG. 1 illustrates a schematic structure a network structure of an evolved universal mobile telecommunication system (E-UMTS). An E-UMTS system is an evolved version of the UMTS system and basic standardization thereof is in progress under the 3rd Generation Partnership Project (3GPP). The E-UMTS is also referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS includes a User Equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist for one BS. The cell provides a downlink or uplink transmission service to several UEs using any one of bandwidths of 1.4, 3, 5, 10, 15 and 20 MHz. Different cells may be set to provide different bandwidths. A BS controls data transmission or reception to or from a plurality of UEs. The BS transmits downlink scheduling information to a UE with respect to downlink (DL) data so as to inform the UE of time/frequency domain, coding, data size, Hybrid Automatic Repeat and reQuest (HARQ) associated information of data to be transmitted, or the like. The BS transmits uplink scheduling information to a UE with respect to uplink (UL) data so as to inform the UE of time/frequency domain, coding, data size, HARQ associated information used by the UE, or the like. An interface for transmitting user traffic or control traffic can be used between BSs. A Core Network (CN) may include the AG a network node for user registration of the UE, or the like. The AG manages mobility of a UE on a Tracking Area (TA) basis. One TA includes a plurality of cells.

Wireless communication technology has been developed to reach the LTE based on Wideband Code Division Multiple Access (WCDMA), but demands and expectations of users and providers have continuously increased. In addition, since other aspects of wireless access technology continue to evolve, new advances are required to remain competitive in the future. There is a need for reduction in cost per bit, service availability increase, the use of a flexible frequency band, a simple structure and an open type interface, appropriate power consumption of a UE, etc.

Recently, ongoing standardization of the next technology of LTE is performed by 3GPP. Such technology shall be named LTE-A. The goal of LTE-A system is to support maximum 100 MZ wideband. To this end, LTE-A system uses a carrier aggregation (CA) technology to achieve the wideband using a plurality of frequency blocks. According to the carrier aggregation, a plurality of frequency blocks are used as one wide logical frequency band to use wider frequency band. And, a bandwidth of each frequency block may be defined based on a bandwidth of a system block used by LTE system. And, each frequency block can be referred to as a component carrier (CC) or a cell.

Multiple-Input Multiple-Output (MIMO) technology is a technology capable of improving data transmission/reception efficiency using multiple transmit (Tx) antennas and multiple receive (Rx) antennas instead of using a single Tx antenna and a single Rx antenna. A receiver using a single antenna receives data through a single antenna path, but a receiver using multiple antennas receives data through multiple paths. Accordingly, data transfer rate and data throughput may be improved, and coverage may be expanded.

To increase a multiplexing gain of MIMO operation, a MIMO transmitter may receive and use channel state information (CSI) fed back from a MIMO receiver.

It is anticipated that a MIMO system is to have extensive development as a result of size increase of a user equipment, technological advancement and cost reduction. For example, a plurality of antennas (or number of antennas increased compared to legacy number of antennas) can be installed not only in a MIMO transmitting end (e.g., base station) but also in a MIMO receiving end (e.g., UE). If the number of antenna ports of a transmitting end and/or a receiving end increase, since time taken for reporting CSI and a frequency resource are sharply increasing, a transfer rate may be considerably reduced.

DISCLOSURE OF THE INVENTION

Technical Task

An object of the present invention is to provide a method of reporting channel state information in a wireless communication system and an apparatus therefor based on the aforementioned discussion.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of reporting channel state information (CSI), which is reported by a user equipment in a wireless communication system, includes measuring a first reference signal transmitted from antenna ports of a first subset among a plurality of antenna ports of a base station, measuring a second reference signal transmitted from antenna ports of a second subset among the plurality of the antenna ports and reporting CSI to the base station based on at least one of measurement of the first reference signal and measurement of the second reference signal. In this case, at least one of the plurality of the antenna ports can be included in both the first subset and the second subset.

To further achieve these and other advantages and in accordance with the purpose of the present invention, according to a different embodiment, a user equipment reporting channel state information (CSI) in a wireless communication system includes a receiver configured to receive a first reference signal transmitted from antenna ports of a first subset among a plurality of antenna ports of a base station and configured to receive a second reference signal transmitted from antenna ports of a second subset among the plurality of the antenna ports and a processor configured to respectively measure the received first reference signal and the second reference signal and configured to report CSI to the base station based on at least one of measurement of the first reference signal and measurement of the second reference signal. In this case, at least one of the plurality of the antenna ports can be included in both the first subset and the second subset.

To further achieve these and other advantages and in accordance with the purpose of the present invention, according to a further different embodiment, a method of receiving channel state information (CSI), which is received by a base station in a wireless communication system, includes transmitting a first reference signal through antenna ports of a first subset among a plurality of antenna ports of the base station, transmitting a second reference signal through antenna ports of a second subset among the plurality of antenna ports and receiving CSI from a user equipment based on at least one of measurement of the first reference signal and measurement of the second reference signal measured by the user equipment. In this case, at least one of the plurality of the antenna ports can be included in both the first subset and the second sub set.

To further achieve these and other advantages and in accordance with the purpose of the present invention, according to a further different embodiment, a base station receiving channel state information (CSI) in a wireless communication system includes a transmitter configured to transmit a first reference signal through antenna ports of a first subset among a plurality of antenna ports of the base station and configured to transmit a second reference signal through antenna ports of a second subset among the plurality of antenna ports, a receiver configured to receive CSI from a user equipment based on at least one of measurement of the first reference signal and measurement of the second reference signal measured by the user equipment and a processor configured to control the transmitter and the receiver. In this case, at least one of the plurality of the antenna ports can be included in both the first subset and the second subset.

Advantageous Effects

According to embodiments of the present invention, it is able to precisely and efficiently report channel state information in a wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 2 is a diagram for structures of control and user planes of radio interface protocol between a 3GPP radio access network standard-based user equipment and E-UTRAN;

FIG. 15 to FIG. 17 illustrate a result resulted from simulating embodiments of the present invention;

FIG. 19 to FIG. 21 illustrate a result resulted from simulating different embodiments of the present invention;

FIG. 22 and FIG. 23 are diagrams for a CSI feedback method according to a further different embodiment of the present invention;

FIG. 24 to FIG. 31 illustrate a result resulted from simulating further different embodiments of the present invention;

BEST MODE

Mode for Invention

Figure 1:
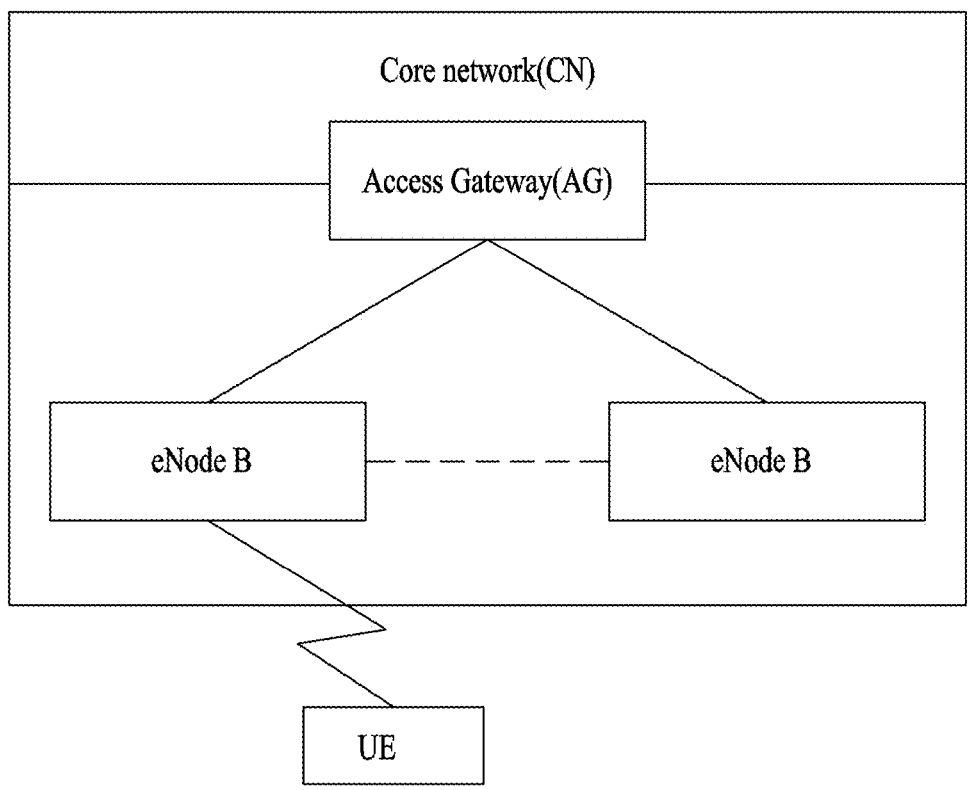
FIG. 1 is a schematic diagram of E-UMTS network structure as one example of a wireless communication system.

Reference will now be made in detail to the preferred embodiments of the present invention, examples of which are illustrated in the accompanying drawings. The following embodiments are examples in which the technical features of the present invention are applied to a 3GPP system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. In addition, although the embodiments of the present invention will be described based on frequency division duplexing (FDD), the FDD mode is purely exemplary and the embodiments of the present invention can easily be applied to half-FDD (H-FDD) or time division duplexing (TDD) with some modifications.

In this specification, the term base station may be comprehensively used to include remote radio head (RRH), evolved node B (eNB), transmission point (TP), reception point (RP), relay, etc.

FIG. 2 is a diagram showing the structure of a control plane and a user plane of a radio interface protocol between a UE and an E-UTRAN based on the 3GPP radio access network standard. The control plane refers to a path through which control messages used for managing a call by the UE and the E-UTRAN are transmitted. The user plane refers to a path through which data generated at an application layer, for example, voice data, Internet packet data or the like is transmitted.

The physical layer, which is the first layer, provides an information transfer service to a higher layer using a physical channel. The physical layer is connected with a medium access control (MAC) layer located at a higher level through a transport channel, and data is transferred between the MAC layer and the physical layer via the transport channel. Data is transferred between physical layers of a transmission side and a reception side via the physical channel. The physical channel uses time and frequency as radio resources. In detail, the physical channel is modulated using an Orthogonal Frequency Division Multiple Access (OFDMA) scheme in downlink and is modulated using a Single Carrier Frequency Division Multiple Access (SC-FDMA) scheme in uplink.

The MAC layer of the second layer provides services to a radio link control (RLC) layer, which is a higher layer, via a logical channel. The RLC layer of the second layer enables reliable data transmission. The function of the RLC layer is included as the functional block of the MAC layer. A Packet Data Convergence Protocol (PDCP) layer of the second layer performs a header compression function that reduces the size of an Internet protocol (IP) packet header containing unnecessary control information having a relatively large size in order to efficiently transmit the IP packets such as IPv4 or IPv6 packets over a radio interface having a limited bandwidth.

A Radio Resource Control (RRC) located at a lowest portion of the third layer is defined only in the control plane. The RRC layer handles logical channels, transport channels and physical channels for the configuration, re-configuration and release of Radio Bearers (RBs). Here, the RBs refer to services provided by the second layer, for data transfer between the UE and the network. The RRC layers of the UE and the network exchange RRC messages with each other. If the RRC layers of the UE and the network are RRC-connected, the UE is in an RRC connected mode and, if so not, is in an RRC idle mode. A Non-Access Stratum (NAS) layer located at a layer higher than the RRC layer performs a function such as session management and mobility management.

One cell configuring a base station (eNB) provides a downlink or uplink transmission service to several UEs using any one of bandwidths of 1.4, 3, 5, 10, 15 and 20 MHz. Different cells may be set to provide different bandwidths.

Examples of a downlink transport channel for transmitting data from the network to the UE include a Broadcast Channel (BCH) for transmitting system information, a Paging Channel (PCH) for transmitting a paging message, or a downlink Shared Channel (SCH) for transmitting user traffic or a control message. Traffic or a control message of a broadcast service or downlink multicast may be transmitted through the downlink SCH or a separate downlink Multicast Channel (MCH). Examples of an uplink transport channel for transmitting data from the UE to the network include a Random Access Channel (RACH) for transmitting an initial control message and an uplink SCH for transmitting user traffic or a control message. Examples of a logical channel located at a layer above the transport channel and mapped to the transport channel includes a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
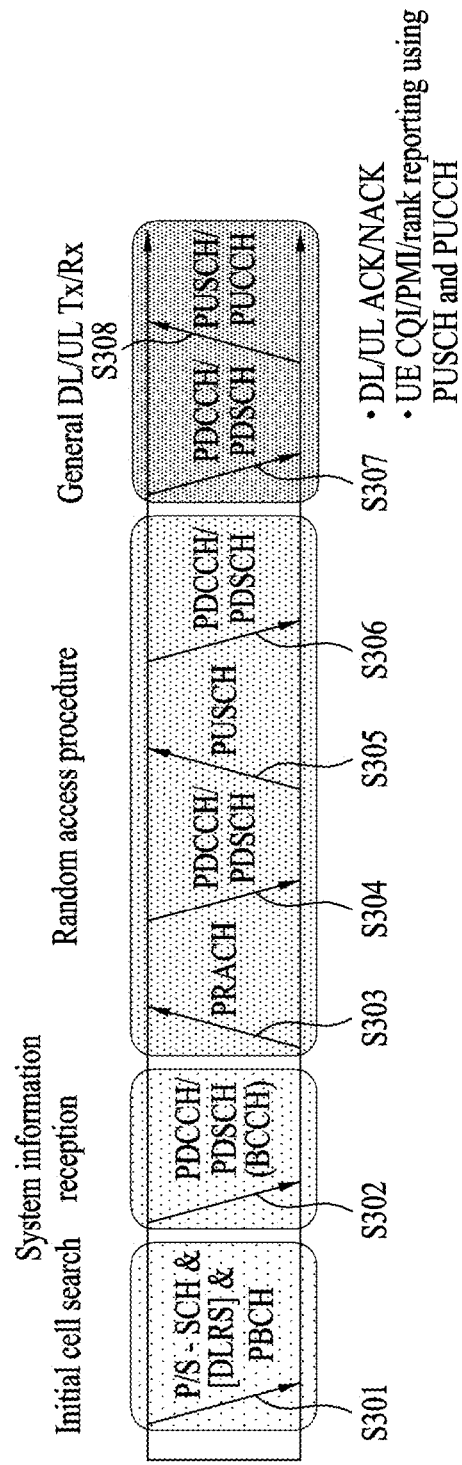
FIG. 3 is a diagram for explaining physical channels used for 3GPP system and a general signal transmission method using the physical channels.

FIG. 3 is a diagram illustrating physical channels used in a 3GPP system and a general signal transmitting method using the same.

If a UE is powered on or newly enters a cell, the UE performs an initial cell search operation such as synchronization with a base station (S301). The UE receives a primary synchronization channel (P-SCH) and a secondary synchronization channel (S-SCH) from the base station so as to synchronize with the base station and to acquire information such as a cell ID. Thereafter, the UE may receive a physical broadcast channel from the base station so as to acquire a broadcast signal in the cell. The UE may receive a downlink reference signal (DL RS) so as to check a downlink channel state in the initial cell search step.

The UE, upon completion of initial cell search, may receive a Physical Downlink Control Channel (PDCCH) and a Physical Downlink Shared Channel (PDSCH) according to information carried in the PDCCH so as to acquire more detailed system information (S302).

When the UE initially accesses the base station or when radio resources for signal transmission are not present, the UE may perform a Random Access Procedure (RACH) with respect to the base station (steps S303 to S306). The UE may transmit a specific sequence using a preamble through a Physical Random Access Channel (PRACH) (S303 and S305) and receive a response message of the preamble through the PDCCH and the PDSCH corresponding thereto (S304 and S306). In the contention-based RACH, a contention resolution procedure may be additionally performed.

The UE which performs the above-described procedure may receive the PDCCH/PDSCH (S307) and transmit a Physical Uplink Shared Channel (PUSCH)/Physical Uplink Control Channel (PUCCH) (S308), as a general uplink/downlink signal transmission procedure. Specifically, the UE receives downlink control information (DCI) through the PDCCH. Here, the DCI includes control information such as resource allocation information for the UE, and has a different format depending on the use thereof.

Meanwhile, the information transmitted from the UE to the base station in uplink and transmitted from the base station to the UE may include a downlink/uplink ACK/NACK signal, a Channel Quality Indicator (CQI), a Precoding Matrix Index(PMI), a Rank Indicator (RI), etc. In the 3GPP LTE system, the UE may transmit the above-described information such as CQI/PMI/RI through the PUSCH and/or the PUCCH.

Figure 4:
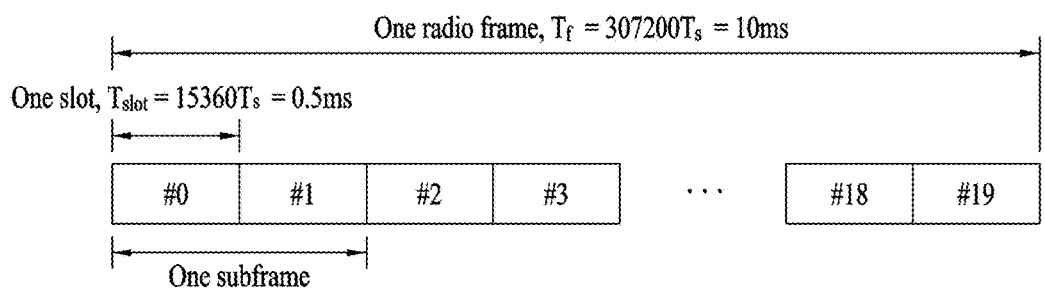
FIG. 4 is a diagram for a structure of a radio frame in LTE system.

FIG. 4 illustrates exemplary radio frame structures in a LTE system.

Referring to FIG. 4, a radio frame is 10 ms (307200 $T_s$) and divided into 10 equal-sized subframes. The 10 subframes of a radio frame may be indexed. Herein, $T_s$ represents a sampling time and $T_s=1/(2048*15 \text{ kHz})$ (approximately, 33 ns). Each subframe is 1 ms long, including two slots. Each slot is 0.5 ms (15360 $T_s$) long. A slot includes a plurality of orthogonal frequency division multiplexing (OFDM) symbols in the time domain and a plurality of resource blocks (RBs) in the frequency time. In a LTE system, single resource block includes 12 (subcarriers)*7 (or 6) OFDM symbols. TTI (Transmission Time Interval), which is unit time for data transfer, can be defined by one or more subframes. The aforementioned structure of the radio frame is shown for exemplary purposes only. Thus, the number of subframes included in the radio frame or the number of slots included in the subframe or the number of OFDM symbols included in the slot may be modified in various manners.

Figure 5:
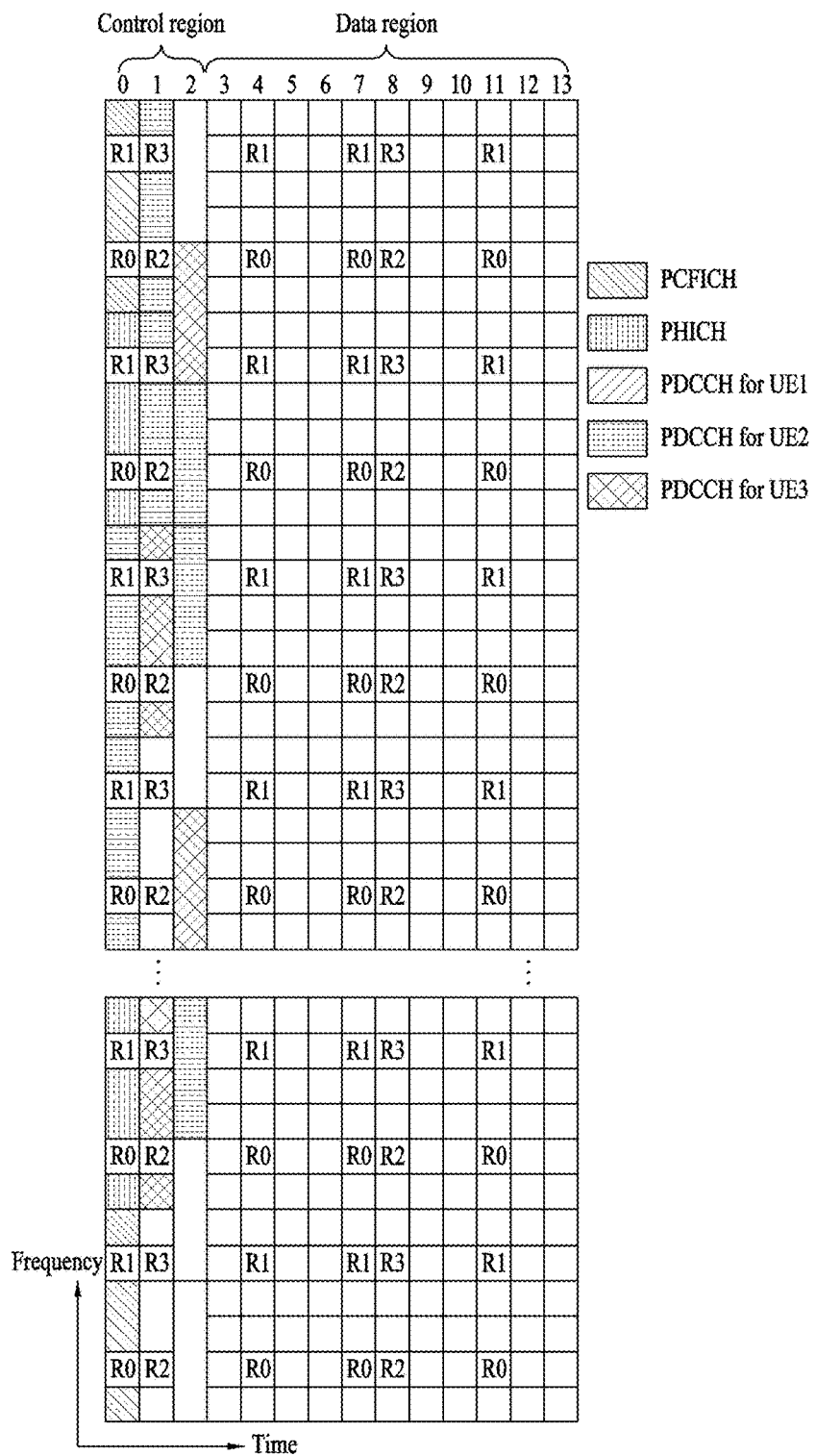
FIG. 5 is a diagram for a structure of a downlink radio frame in LTE system.

FIG. 5 illustrates control channels included in a control region of one subframe in a downlink radio frame.

Referring to FIG. 5, the subframe consists of 14 OFDM symbols. Initial 1 to 3 OFDM symbols are used as the control region and the other 13 to 11 OFDM symbols are used as a data region depending on a subframe configuration. In this figure, R1 to R4 denote reference signals (RSs) (or pilot signals) for antennas 0 to 3. The RSs are fixed as a certain pattern in the subframe irrespective of the control region and the data region. The control channels are allocated to resources of the control region to which no RS is allocated, and traffic channels are allocated to resources of the data region to which no RS is allocated. The control channels allocated to the control region include a Physical Control Format Indicator Channel (PCFICH), a Physical HARQ (Hybrid-Automatic Repeat and Request) Indicator Channel (PHICH), a Physical Downlink Control Channel (PDCCH), etc.

The PCFICH signals the number of OFDM symbols used for the PDCCH in every subframe to the UE. The PCFICH is located in the first OFDM symbol and is configured prior to the PHICH and the PDCCH. The PCFICH consists of 4 resource element groups (REGs) each distributed over the control region based on cell identity (ID). One REG consists of 4 resource elements (REs). The RE refers to a minimum physical resource defined as one subcarrier×one OFDM symbol. The value of the PCFICH indicates one of values 1 to 3 or 2 to 4 depending on a bandwidth and is modulated through quadrature phase shift keying (QPSK).

The PHICH is used to carry HARQ ACK/NACK for uplink transmission. That is, the PHICH refers to a channel for transmitting DL ACK/NACK information for UL HARQ. The PHICH consists of 1 REG, and is scrambled cell-specifically. ACK/NACK is indicated using 1 bit, and is modulated through binary phase shift keying (BPSK). The modulated ACK/NACK is spread using a spreading factor (SF)=2 or 4. A plurality of PHICH channels mapped to the same resource form a PHICH group. The number of PHICH channels multiplexed into the PHICH group is determined depending on the number of spreading codes. The PHICH (group) is repeated 3 times to achieve diversity gain in the frequency domain and/or the time domain.

The PDCCH is allocated to initial n OFDM symbols of the subframe. Here, n is an integer equal to or greater than 1 and is indicated by the PCFICH. The PDCCH consists of one or more CCEs. The PDCCH signals information related to resource allocation of a Paging Channel (PCH) and a Downlink-Shared Channel (DL-SCH) which are transmission channels, uplink scheduling grant, HARQ information, etc. to each UE or UE group. The PCH and the DL-SCH are transmitted through a PDSCH. Accordingly, the base station and the UE generally transmit and receive data other than specific control information or specific service data through the PDSCH.

Information about a UE (or UEs) targeted by the data of the PDSCH, information about schemes for receiving and decoding the PDSCH data by the UEs, etc. are carried by the PDCCH. For example, it is assumed that a specific PDCCH is CRC-masked with radio network temporary identity (RNTI) "A" and information about data to be transmitted using radio resource (e.g., frequency location) "B" and DCI format (i.e., transmission format information (e.g., transmission block size, modulation scheme, coding information, etc.)) "C" is transmitted in a specific subframe. In this case, a UE within a cell monitors, i.e., blind-decodes, the PDCCH in a search area using RNTI information of the UE. If one or more UEs have RNTI "A", the UEs receive the PDCCH, and receive a PDSCH indicated by "B" and "C" using information of the received PDCCH.

Figure 6:
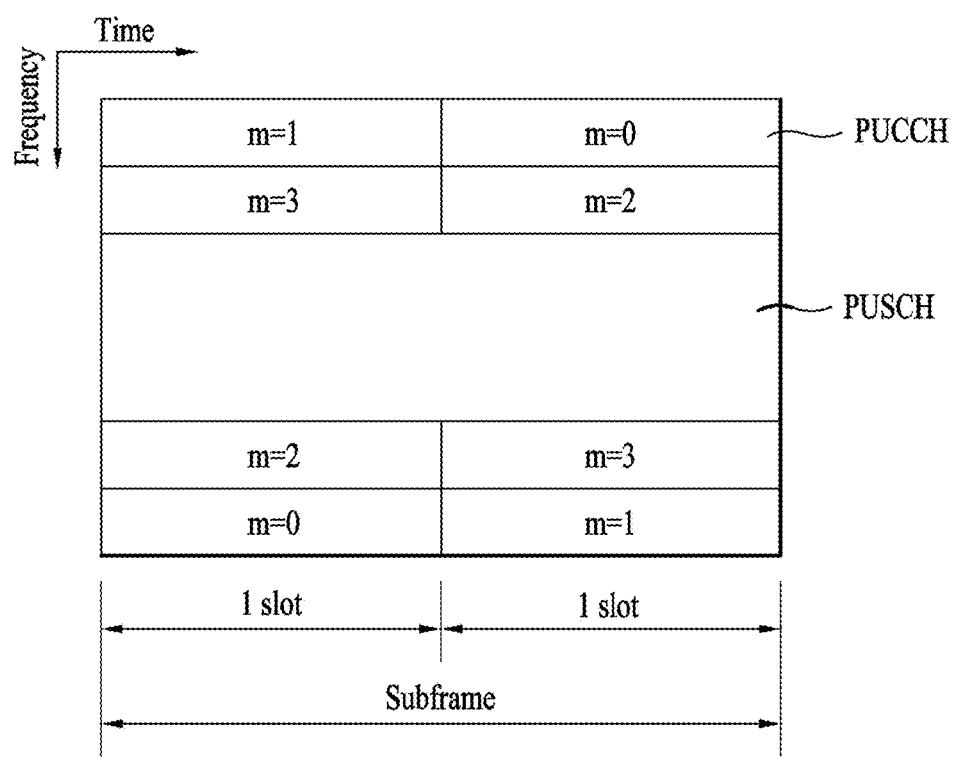
FIG. 6 is a diagram for a structure of an uplink subframe in LTE system.

FIG. 6 illustrates the structure of a UL subframe in a LTE system.

Referring to FIG. 6, the UL subframe can be divided into a region to which Physical Uplink Control Channels (PUCCHs) carrying control information are allocated, and a region to which Physical Uplink Shared Channels (PUSCHs) carrying user data are allocated. A middle part of the subframe is allocated for the PUSCHs, and two side parts of the data region in the frequency domain are allocated for the PUCCHs. The control information carried by the PUCCH includes ACK/NACK used for HARQ, a channel quality indicator (CQI) indicating DL channel state, a rank indicator (RI) for MIMO, a scheduling request (SR) which is a UL resource allocation request, etc. The PUCCH for one UE uses one resource block which occupies different frequencies in slots of the subframe. That is, 2 resource blocks allocated for the PUCCH are frequency hopped at a slot boundary. Specifically, FIG. 6 exemplarily shows that a PUCCH of m=0, a PUCCH of m=1, a PUCCH of m=2, and a PUCCH of m=3 are allocated to the subframe.

A description is now given of a MIMO system. Multiple-Input Multiple-Output (MIMO) is a method using multiple Tx antennas and multiple Rx antennas, and this method may improve transmission and reception efficiency of data. That is, a transmitter or receiver of a wireless communication system uses multiple antennas and thus the capacity and performance thereof may be improved. In the following description of the present invention, MIMO can be called 'multiple antenna technology'.

In the multiple antenna technology, reception of one whole message does not depend on a single antenna path. Instead, in the multiple antenna technology, data fragments received through multiple antennas are collected and combined to complete data. If the multiple antenna technology is used, a data transfer rate within a cell region of a specific size may be improved, or system coverage may be improved while ensuring a specific data transfer rate. In addition, this technology can be broadly used by mobile communication devices and relays. Due to the multiple antenna technology, restriction on mobile communication traffic based on a legacy technology using a single antenna can be solved.

Figure 7:
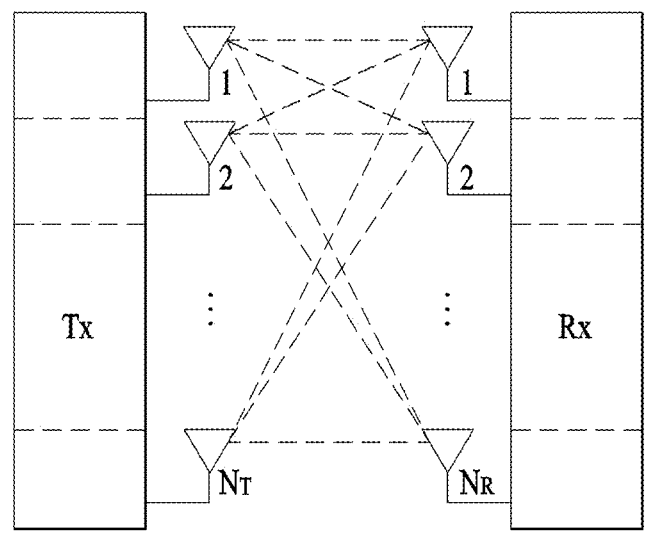
FIG. 7 is a diagram for a configuration of a multiple antenna (MIMO) communication system.

FIG. 7 shows the configuration of a wireless communication system including multiple antennas. When both the number of transmit (Tx) antennas and the number of Rx antennas respectively to $N_T$ and $N_R$, a theoretical channel transmission capacity of the MIMO communication system increases in proportion to the number of antennas, differently from the above-mentioned case in which only a transmitter or receiver uses several antennas, so that transmission rate and frequency efficiency can be greatly increased. In this case, the transfer rate acquired by the increasing channel transmission capacity can theoretically increase by a predetermined amount that corresponds to multiplication of a maximum transfer rate ($R_o$) acquired when one antenna is used and a rate of increase ($R_i$). The rate of increase ($R_i$) can be represented by the following equation 1.

$$R_i = \min(N_T, N_R) \quad \text{[Equation 1]}$$

For example, provided that a MIMO system uses four Tx antennas and four Rx antennas, the MIMO system can theoretically acquire a high transfer rate which is four times higher than that of a single antenna system. After the above-mentioned theoretical capacity increase of the MIMO system was demonstrated in the mid-1990s, many developers began to conduct intensive research into a variety of technologies which can substantially increase data transfer rate using the theoretical capacity increase. Some of the above technologies have been reflected in a variety of wireless communication standards, for example, third-generation mobile communication or next-generation wireless LAN, etc.

A variety of MIMO-associated technologies have been intensively researched by many companies or developers, for example, research into information theory associated with MIMO communication capacity under various channel environments or multiple access environments, research into a radio frequency (RF) channel measurement and modeling of the MIMO system, and research into a space-time signal processing technology.

Mathematical modeling of a communication method for use in the above-mentioned MIMO system will hereinafter be described in detail. As can be seen from FIG. 7, it is assumed that there are $N_T$ Tx antennas and $N_R$ Rx antennas. In the case of a transmission signal, a maximum number of transmission information pieces is $N_T$ under the condition that $N_T$ Tx antennas are used, so that the transmission information can be represented by a specific vector shown in the following equation 2.

$$s = [s_1, s_2, \ldots, s_{N_T}]^T \quad \text{[Equation 2]}$$

In the meantime, individual transmission information pieces $s_1, s_2, \ldots, s_{N_T}$ may have different transmission powers. In this case, if the individual transmission powers are denoted by $P_1, P_2, \ldots, P_{N_T}$, transmission information having an adjusted transmission power can be represented by a specific vector shown in the following equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In Equation 3, $\hat{s}$ is a transmission vector, and can be represented by the following equation 4 using a diagonal matrix P of a transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

In the meantime, the information vector $\hat{s}$ having an adjusted transmission power is applied to a weight matrix W, so that $N_T$ transmission signals $x_1, x_2, \ldots, x_{N_T}$ to be actually transmitted are configured. In this case, the weight matrix W is adapted to properly distribute transmission information to individual antennas according to transmission channel situations. The above-mentioned transmission signals $x_1, x_2, \ldots, x_{N_T}$ can be represented by the following equation 5 using the vector X. Here, $W_{ij}$ denotes a weight corresponding to i-th Tx antenna and j-th information. W represents a weight matrix or precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & \ddots & \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

Generally, a matrix rank is defined by a smaller number between the number of rows and the number of columns, in which the rows and the columns are independent of each other. Therefore, the matrix rank cannot be higher than the number of rows or columns. The rank of the channel matrix H can be represented by the following equation 6.

$$\text{rank}(H) \leq \min(N_T, N_R) \quad \text{[Equation 6]}$$

In addition, each of different pieces of information transmitted using the multiple antenna technology is now defined as a 'transport stream' or simply a 'stream'. This 'stream' can be called a 'layer'. Then, the number of transport streams cannot be greater than a channel rank which is the maximum number of different pieces of information transmittable using the multiple antenna technology. Accordingly, a channel matrix H can be expressed as given by Equation 7.

$$\text{\# of streams} \leq \text{rank}(H) \leq \min(N_T, N_R) \quad \text{[Equation 7]}$$

Here, "# of streams" denotes the number of streams. Meanwhile, it should be noted here that one stream can be transmitted through one or more antennas.

There can be a variety of methods for mapping one or more streams to multiple antennas. These methods may be described as follows depending on the type of the multiple antenna technology. A case in which a single stream is transmitted through multiple antennas can be regarded as a spatial diversity scheme, and a case in which multiple streams are transmitted through multiple antennas can be regarded as a spatial multiplexing scheme. Alternatively, a hybrid of spatial diversity and spatial multiplexing can also be used.

A detailed description is now given of reference signals (RSs).

In general, a reference signal known to both a transmitter and a receiver is transmitted from the transmitter to the receiver for channel measurement together with data. This reference signal indicates a modulation scheme as well as a channel measurement scheme to perform a demodulation procedure. The reference signal is divided into a dedicated RS (DRS), i.e., a UE-specific RS, for a base station and a specific UE, and a common RS (CRS), i.e., a cell-specific RS, for all UEs in a cell. In addition, the cell-specific RS includes a reference signal for reporting CQI/PMI/RI measured by the UE to the base station, which is called a channel state information-RS (CSI-RS).

Figure 8:
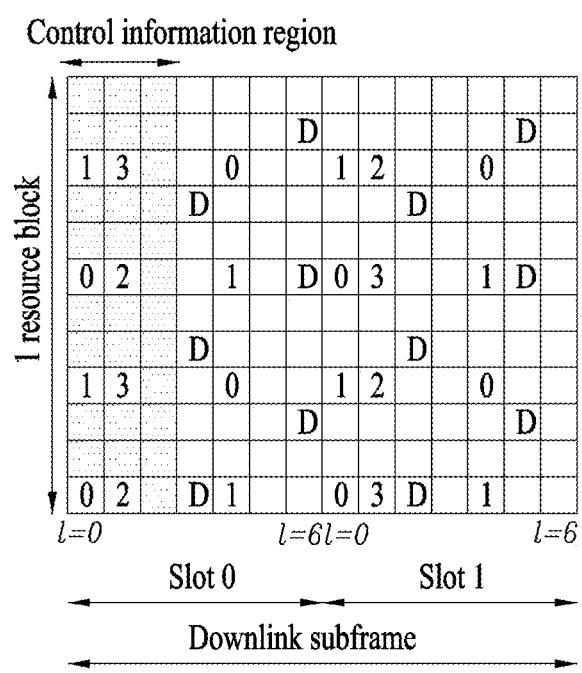
FIG. 8 and FIG. 9 are diagrams for a structure of a downlink reference signal in LTE system supportive of downlink transmission using 4 antennas.
Figure 9:
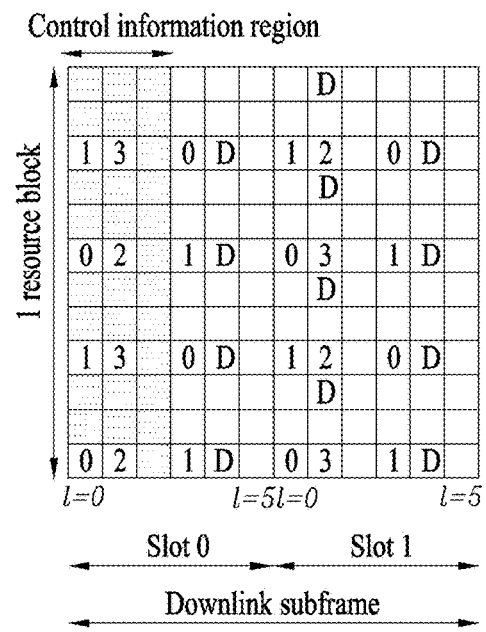

FIGS. 8 and 9 are diagrams showing the structures of reference signals in a LTE system supporting downlink transmission using 4 antennas. Specifically, FIG. 8 illustrates the case of a normal cyclic prefix (CP), and FIG. 9 illustrates the case of an extended CP.

Referring to FIGS. 8 and 9, 0 to 3 marked in the grid denote common RSs (CRSs) which are cell-specific RSs transmitted through antenna ports 0 to 3 for channel measurement and data demodulation, and the CRSs which are the cell-specific RSs can be transmitted to UEs over a control information region as well as a data information region.

In addition, 'D' marked in the grid denotes a downlink demodulation-reference signal (DM-RS) which is a UE-specific RS, and the DM-RS supports single antenna port transmission through a data region, i.e., PDSCH. The UE receives a higher layer signal indicating whether a DM-RS, which is a UE-specific RS, is present. FIGS. 8 and 9 exemplarily illustrate a DM-RS corresponding to antenna port 5, and 3GPP 36.211 also defines DM-RSs corresponding to antenna ports 7 to 14, i.e., a total of 8 antenna ports.

Figure 10:
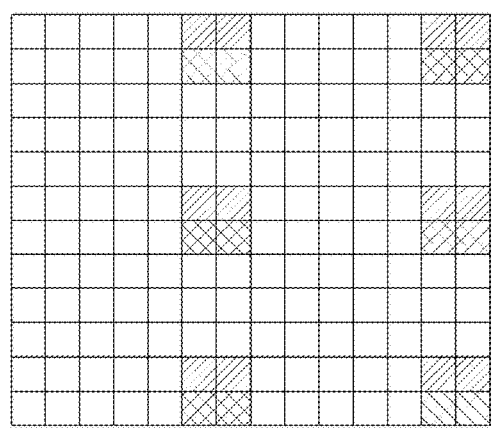
FIG. 10 is a diagram for an example of assigning a downlink DM-RS defined by a current 3GPP standard document.

FIG. 10 exemplarily illustrates downlink DM-RS allocation currently defined by the 3GPP specification.

Referring to FIG. 10, DM-RSs corresponding to antenna ports {7, 8, 11, 13} are mapped to DM-RS group 1 using antenna port sequences, and DM-RSs corresponding to antenna ports {9, 10, 12, 14} are mapped to DM-RS group 2 using antenna port sequences.

Meanwhile, unlike CRS, CSI-RS has been proposed above for PDSCH channel measurement, and can be defined as up to 32 different CSI-RS configurations to reduce inter-cell interference (ICI) in a multiple-cell environment.

The CSI-RS configuration differs depending on the number of antenna ports, and neighboring cells are configured to transmit CSI-RSs defined as different CSI-RS configurations as possible. Unlike CRS, CSI-RS supports up to 8 antenna ports, and a total of 8 antenna ports from antenna port 15 to antenna port 22 are allocated as antenna ports for CSI-RS in the 3GPP specification. Tables 1 and 2 show CSI-RS configurations defined in the 3GPP specification. Specifically, Table 1 shows the case of a normal CP, and Table 2 shows the case of an extended CP.

TABLE 1

| CSI reference signal configuration | | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |

TABLE 1-continued

| CSI reference signal configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| 30 | (1, 1) | 1 | | | | |
| 31 | (0, 1) | 1 | | | | |

TABLE 2

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

Figure 11:
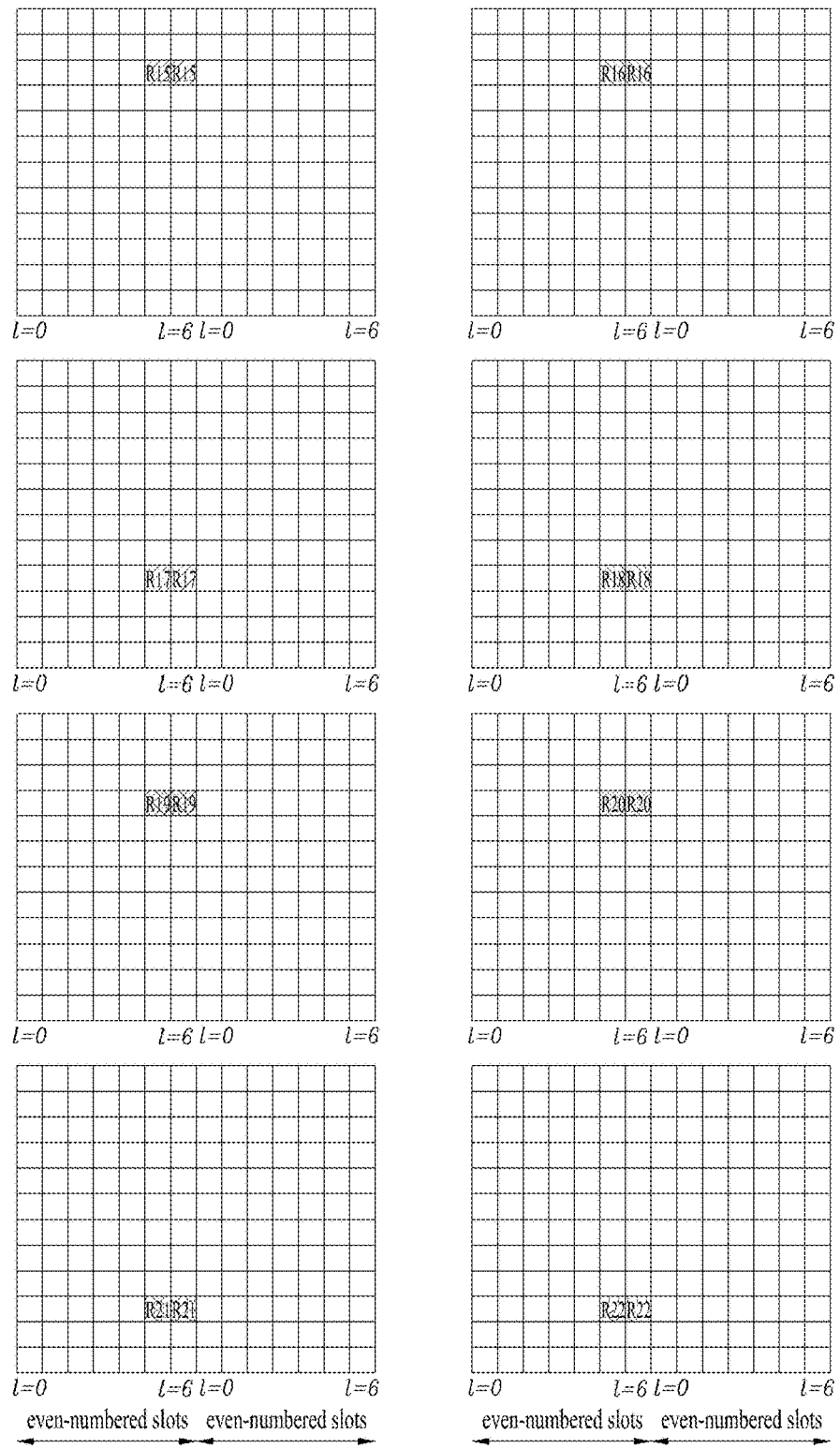
FIG. 11 is a diagram for an example of a CSI-RS configuration #0 in case of a normal CP among downlink CSI-RS configurations defined by a current 3GPP standard document.

In Tables 1 and 2, (k', l') denotes an RE index, k' denotes a subcarrier index, l' denotes an OFDM symbol index. FIG. 11 exemplarily illustrates CSI-RS configuration #0 in the case of a normal CP among CSI-RS configurations currently defined in the 3GPP specification.

CSI-RS subframe configurations can also be defined, and each CSI-RS subframe configuration includes a periodicity $T_{CSI-RS}$ and a subframe offset $\Delta_{CSI-RS}$ which are expressed on a subframe basis. Table 3 shows the CSI-RS subframe configurations defined in the 3GPP specification.

TABLE 3

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}-5$ |
| 15-34 | 20 | $I_{CSI-RS}-15$ |
| 35-74 | 40 | $I_{CSI-RS}-35$ |
| 75-154 | 80 | $I_{CSI-RS}-75$ |

Enhanced CSI Feedback

A receiving end (e.g., UE) measures a state of a channel formed by each of antenna ports of a transmitting end (e.g., base station) and may be able to report a result of the measurement. In this case, the receiving end can determine or calculate RI, PMI and/or CQI using an RS of each antenna port of the transmitting end to measure the channel state. In this case, the PMI is defined as an index value for indicating a precoding matrix appropriate for a channel measured in the aspect of the receiving end. The precoding matrix can be selected or determined from among a set of precoding matrix candidates, which are determined in advance and shared between the transmitting end and the receiving end. In this case, the set of precoding matrix candidates is called a codebook. The PMI can indicate a proper precoding matrix in a specific rank.

Meanwhile, a next generation wireless communication system considers introduction of an active antenna system (AAS). Unlike a legacy passive antenna of which an amplifier capable of controlling a phase and a size of a signal and an antenna are separated from each other, the active antenna is configured to have an active element such as an amplifier. It is not necessary for an active antenna system to have a separate cable, a connector and other hardware for connecting with an amplifier with an antenna and the active antenna system has a characteristic of high efficiency in terms of energy and management cost. In particular, since the active antenna system is able to support an electronic beam control scheme according to each antenna, the active antenna system enables such an enhanced MIMO technology as forming a delicate beam pattern or a 3-dimensional beam pattern in consideration of beam direction and beam width.

With the help of the introduction of an advanced antenna system such as the active antenna, it may also consider a massive MIMO structure including a plurality of input/output antennas and a multidimensional antenna structure. As an example, unlike a legacy straight antenna array (or one-dimensional antenna array), in case of forming a 2-dimensional antenna array, it may be able to form a 3-dimensional beam pattern by an active antenna of the active antenna system.

Figure 12:
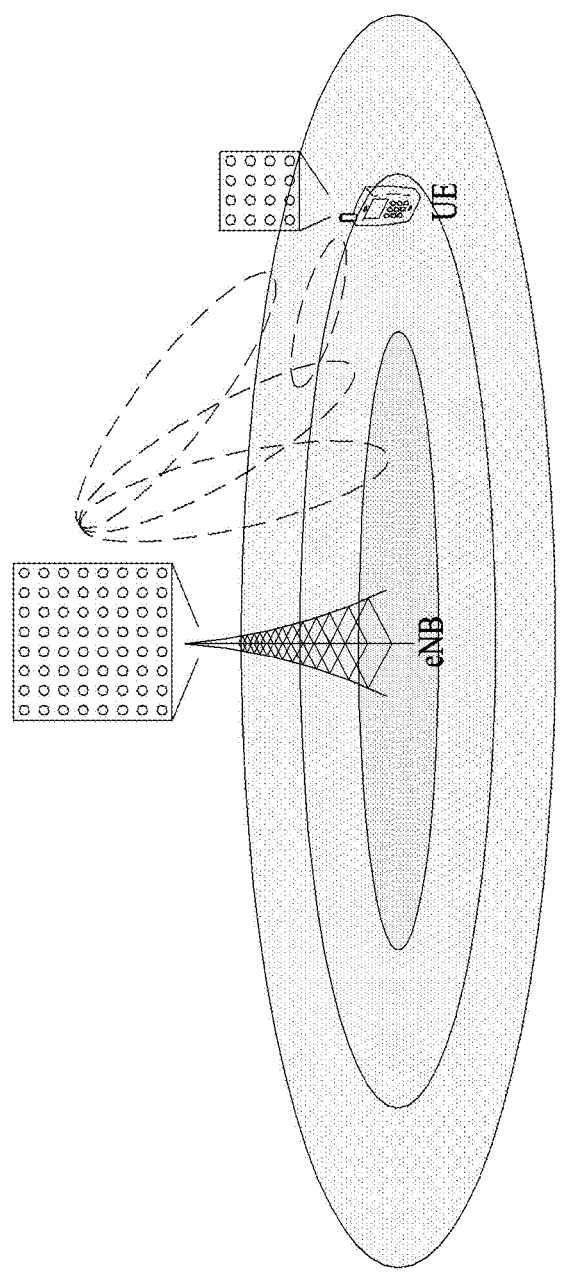
FIG. 12 is a conceptual diagram for a massive MIMO technology.

FIG. 12 is a conceptual diagram for a massive MIMO technology. In particular, FIG. 12 shows a system that an eNB or a UE has a plurality of active antenna system-based transmission/reception antennas capable of forming a 3D beam.

Referring to FIG. 12, if a 3-dimensional beam pattern is utilized in terms of a transmission antenna, semi-static or dynamic beam forming can be performed not only in horizontal direction but also in vertical direction of a beam and it may also consider such an application as sector forming in vertical direction and the like. In terms of a reception antenna, when a reception beam is formed by utilizing a massive reception antenna, it may be able to expect a signal power increasing effect according to an antenna array gain. Hence, in case of uplink, an eNB can receive a signal transmitted from a UE through a plurality of antennas. In this case, the UE can configure transmit power of the UE to be very low in consideration of a gain of the massive reception antenna to reduce an impact of interference.

In order to perform 3D beamforming in a massive MIMO system, it is required to feedback more delicate CSI compared to legacy CSI. And, in order to support the increased number of antenna ports such as the massive MIMO system, it is necessary to define or add a new codebook. If a codebook is defined or added, a feedback overhead increasing problem may occur. And, as the number of antenna ports increases, the number of RS for identifying each antenna port also increases. As a result, an amount of using a resource (e.g., time, frequency and/or a code resource) for transmitting an RS increases and an amount of using a resource for transmitting data may decrease among total system resources. In particular, overhead for supporting the increased number of antenna ports increases, whereas user data processing ratio decreases.

In order to solve the aforementioned problem, a CSI feedback method for maximizing MIMO transmission efficiency is required in a system to which a massive MIMO scheme is applied. As a method of enhancing CSI feedback, the present invention proposes a method of designing a codebook for a massive MIMO system supporting the increased number of antenna ports (or antenna elements) and a method of reducing or mitigating feedback overhead of a CSI report based on the codebook. Moreover, the present invention proposes a method of performing efficient CSI feedback and transmission/reception beamforming based on the CSI feedback in a massive MIMO system. More specifically, the present invention includes a method of making a feedback on CSI in a manner of measuring a partial channel in a receiving end, a method of generating a beam former corresponding to the number of physical antennas in a manner that a transmitting end matches repetitive CSI feedbacks received from a receiving end with each other, and a method of separating a received signal into a plurality of data streams.

According to one embodiment of the present invention, a transmitting end performs grouping on physical antenna ports. If a subframe in which an RS is transmitted is differently configured according to an antenna port group, an RS is transmitted over a plurality of subframes. A receiving end measures a channel using an RS and may be able to generate and report CSI. The transmitting end generates a beamforming codebook or a code vector using the CSI reported from the receiving end to transmit a plurality of data streams or multiple layers.

In the following examples of the present invention, for example, a transmitting end of MIMO transmission (i.e., a receiving end of feedback information) and a receiving end of MIMO transmission (i.e., a transmitting end of feedback information) correspond to an eNB and a UE, respectively, by which the present invention may be non-limited.

I. Antenna Port Configuration for RS Transmission

A pattern of an antenna port transmitting an RS according to one embodiment of the present invention is explained with reference to FIG. 13 in the following. The RS may correspond to a CSI-RS, by which the present invention may be non-limited. In an embodiment of FIG. 13, assume that an RS is transmitted through the total M number of antenna ports. The RS is transmitted by L number of antenna ports among the M number of antenna ports over K number of time durations or instances instead of being transmitted by the M number of antenna ports at the same time. In this case, the L is a natural number smaller than the M. The K number of time durations may correspond to the K number of OFDMA symbols, the K number of slots, the K number of subframes or the K number of frames, by which the present invention may be non-limited. For example, the M corresponds to 4, the K corresponds to 3 and the L corresponds to 2 in FIGS. 13(a) and (b). On the contrary, the M corresponds to 4, the K corresponds to 6 and the L corresponds to 2 in FIG. 13(c).

Figure 13:
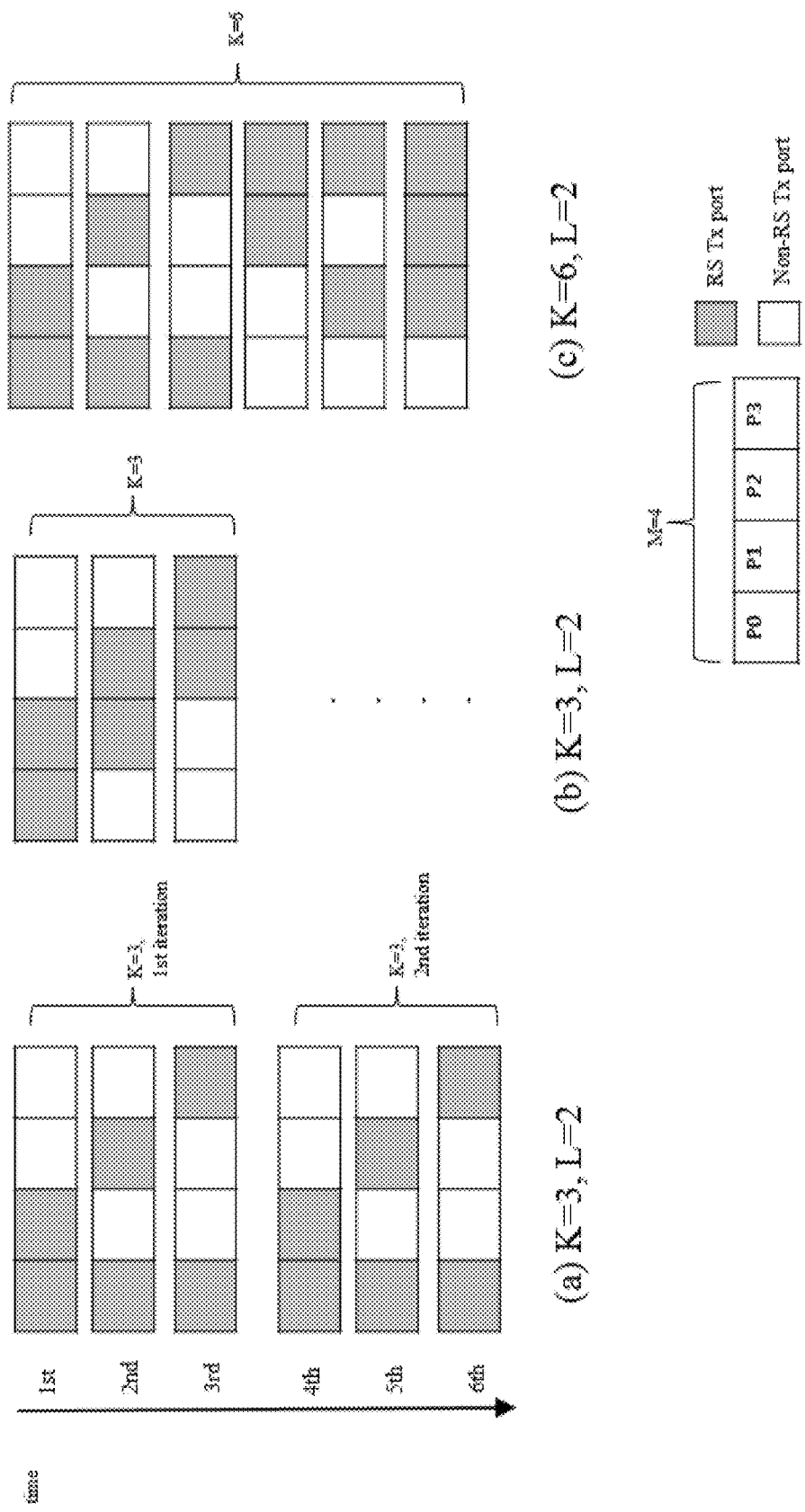
FIG. 13 is a diagram for a pattern of an antenna port transmitting an RS according to one embodiment of the present invention.

In FIG. 13, a UE performs channel measurement using RSs transmitted from 2 antenna ports over one time duration (e.g., subframe unit). In FIG. 13(a) and FIG. 13(b), although RSs are transmitted from antenna ports different from each other over K time duration corresponding to 3, a pattern of antenna ports selected for transmitting the RSs is different from each other in FIG. 13(a) and FIG. 13(b).

The UE measures a partial radio channel corresponding to the L number of antenna ports at every time duration (e.g., subframe unit) in a manner of receiving signaling on pattern information of the antenna ports from an eNB. For example, the eNB signals at least one selected from the group consisting of transmission timing of an RS transmitted by the antenna ports and an offset, sequence scrambling information of an RS, information on RE (resource element) mapping of an RS to the UE together with a pattern of the antenna ports. If the eNB operates in a transmission mode for CoMP operation (mode 10), the sequence scrambling information of RS may correspond to a scrambling initialization parameter using a virtual cell ID.

Meanwhile, the UE can feedback CSI on a partial channel to the eNB as many as K times based on partial channel measurement measured over K number of time durations. For example, the UE feedbacks CSI 3 times over single iteration in FIG. 13(a) and FIG. 13(b) and the UE can feedback CSI 6 times over single iteration in FIG. 13(c). The eNB matches the CSI on the K number of partial channels with each other and obtains CSI on total channels.

On the contrary, the UE can feedback CSI to the eNB in a manner of matching channel measurements measured n times (n is a natural number equal to or less than K) with each other. For example, in FIG. 13(a), the UE matches channel measurements measured 3 times within single iteration with each other and may be able to feedback CSI to the eNB one time. On the contrary, the UE matches channel measurements measured 2 times within single iteration with each other and may be then able to feedback CSI to the eNB twice (e.g., (1,2) matching feedback, (2,3) matching feedback, etc.)

In order to more accurately match channel measurements measured over time durations different from each other, at least one or more ports transmitting an RS should be in common in the time durations different from each other. For example, in FIG. 13(a), a P0 transmits an RS in all time durations including first to third time duration. Hence, the P0 and the RS transmitted by the P0 become a reference for matching channel measurements measured over time durations different from each other. For example, in order to make strength or phase of an RS received from the P0 to be practically same in the time durations including the first to the third time duration, the channel measurements measured over the first to the third time duration can be revised. In FIG. 13(b), a reference for matching channel measurements in the second and the third time duration corresponds to a P1 and a reference for matching channel measurements in the second and the third time duration corresponds to a P3. It is not mandatory that an antenna port becoming a reference for matching channel measurements corresponds to a single antenna port. A reference antenna port may change in various ways depending on an embodiment.

Meanwhile, according to a legacy scheme that all antenna ports transmit an RS to a same subframe, a UE or an eNB is able to obtain CSI in a manner of averaging n number of channel measurements measured in n number of subframes. Yet, according to one embodiment of the present invention, antenna ports transmitting an RS change according to time duration. Hence, channel measurements can be averaged only in time durations where a pattern of an antenna port is identical to each other. For example, in FIG. 13(a), it is unable to average channel measurements in the first, the second and the third time duration of single iteration.

Yet, since antenna ports transmitting an RS are identical to each other in (1,4) time duration, (2,5) time duration and (2,5) time duration respectively belonging to iterations different from each other, channel measurements can be averaged in the time durations. Meanwhile, the eNB can provide the UE with information on time duration in which averaging of channel measurements is unavailable (or time duration in which averaging of channel measurements is available). For example, CSI measurement averaging window information can be set to the UE to indicate time duration at which CSI measurement values are averaged among iterations. The eNB makes the UE identify the CSI measurement averaging window in a manner of informing the UE of a pattern of an antenna port transmitting an RS.

II. CSI Feedback Based on Partial Channel Measurement

In the following description, an embodiment for a UE to make a feedback to an eNB in a manner of performing singular value decomposition on a channel measurement result (channel matrix) in a plurality of time durations (e.g., subframes) is explained.

II-1. CSI Feedback Including Quantized-V

Singular value decomposition can be performed after channel measurements are accumulated for prescribed time durations. And, a result of the singular value decomposition is not fed back whenever the singular value decomposition is performed. Instead, the result can be intermittently fed back according to a prescribed interval.

For example, a UE measures RSs transmitted from the L number of antenna ports of an eNB in every time duration (e.g., subframe) and accumulates measurement results. The UE performs singular value decomposition (SVD) on the channel measurements accumulated to the eNB as shown in Equation 8.

$$H = U\Sigma V^H$$ [Equation 8]

A matrix H is a channel matrix of m×n size. U is an orthogonal matrix of m×m size and is referred to as a left singular matrix. $\Sigma$ is a diagonal matrix of m×n size. V is a unitary matrix and is referred to as a right singular matrix.

According to one embodiment, a UE feedbacks a right singular matrix V extracted from a result of singular value decomposition to an eNB. Meanwhile, if a single antenna is mounted on the UE, a right singular vector V is transmitted to the eNB.

According to a different embodiment, the UE searches for a precoding matrix of which similarity of phase information with the quantized right singular matrix V is biggest in a codebook and may be then able to report a precoding matrix index (PMI) to the eNB rather than feedbacks the right singular matrix V as it is. In this case, the codebook may correspond to a codebook of a legacy mobile communication system or a codebook newly defined for a quantized right singular matrix $V_q$.

Figure 14:
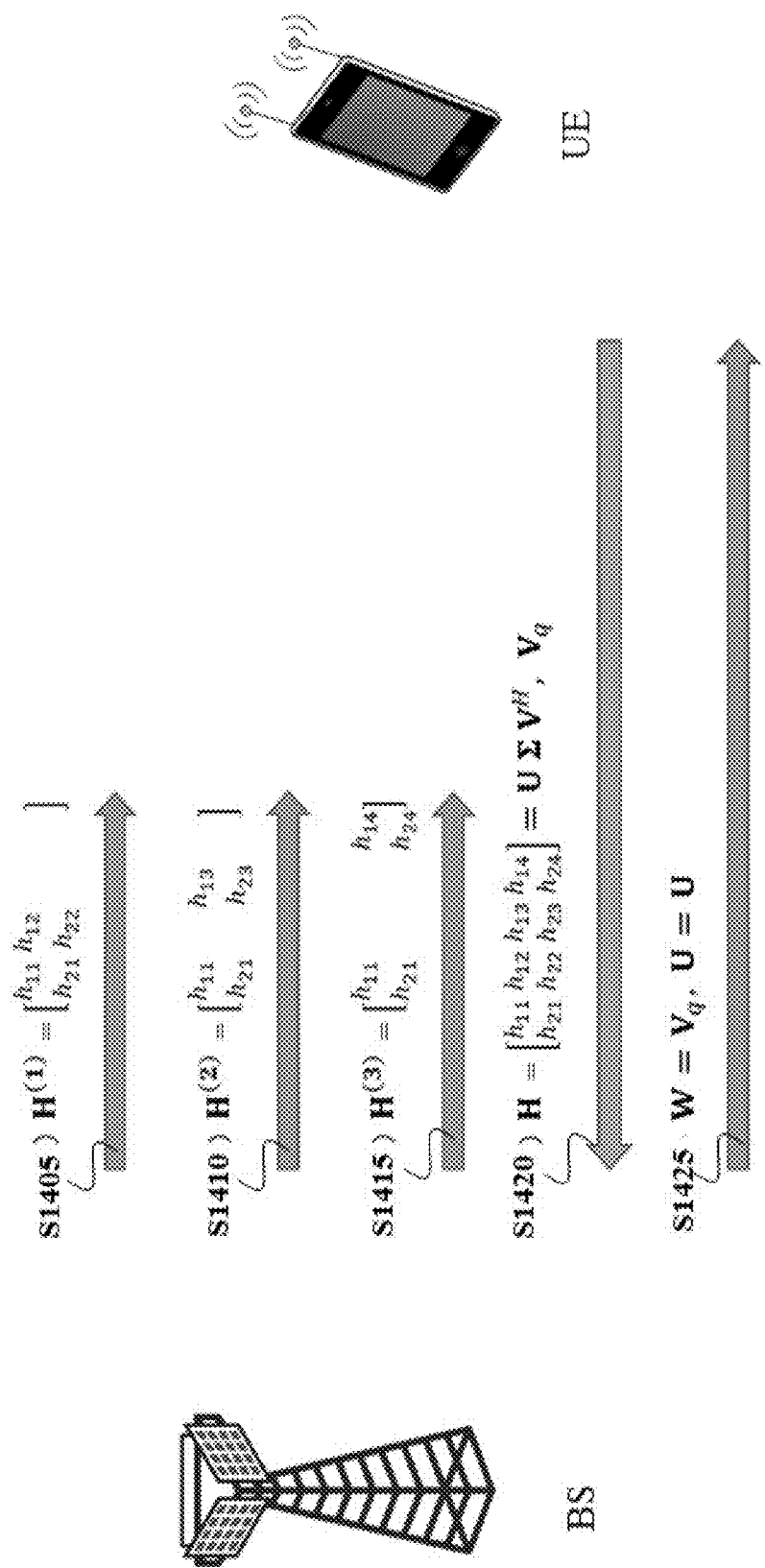
FIG. 14 is a diagram for a CSI feedback method according to one embodiment of the present invention.

FIG. 14 is a diagram for a CSI feedback process according to one embodiment of the present invention. In FIG. 14, assume that an eNB transmits an RS according to a pattern shown in FIG. 13(a) and two reception antenna ports are installed in a UE. Hence, total channels can be represented by a channel matrix of a size of 2×4. The aforementioned assumption is just an example for clarity. Those skilled in the art can understand that the scope of the present invention includes massive MIMO environment.

Although the eNB transmits an RS through a part of antenna ports, the UE can be configured to perform CSI feedback at a time after channel measurements are all finished. All channel measurements measured by the UE can be obtained in a manner of performing interpolation on partial channel measurement values. To this end, it is preferable for the eNB to inform the UE of at least one of the number of antenna ports (e.g., M'), which becomes a unit of CSI feedback, after that UE performs interpolation using the number of RS transmission antenna ports (e.g., such information as M=4), a size of single iteration (e.g., such information as K=3), the number of RS transmission antenna ports corresponding to a partial channel (e.g., such information as L=2) and partial channel measurement values. If the number of antenna ports M' becoming a CSI feedback unit is delivered to the UE, the UE obtains CSI corresponding to the M' number of antenna ports via interpolation and may be able to feedback the CSI to the eNB. In this case, the M' may be equal to M, by which the present invention may be non-limited. If the M' is equal to M, channels obtained by the UE by performing interpolation on the partial channel measurement values correspond to total channels. In a different embodiment, the M' may exceed the L and may correspond to a natural number equal to or less than the M. Meanwhile, the CSI fed back to the eNB by the UE may include M'-Tx PMI.

Meanwhile, the UE can configure a CSI feedback period to be greater than K value received from the eNB. When CSI feedback on total channels is performed at a time, the CSI feedback is performed with a lower frequency compared to a case that CSI feedback is immediately performed whenever measurement for a partial channel is performed.

Meanwhile, when the UE performs CSI feedback through interpolation of partial channel measurement values, it is not mandatory that a CSI-RS is transmitted over a plurality of time durations. For example, the UE is able to obtain measurement values of a first partial channel in a manner of measuring a first CSI-RS transmitted in first time duration. Subsequently, the UE is able to obtain CSI of all channels in a manner of performing interpolation on the measurement values of the first partial channel.

In a different embodiment, the UE can perform CSI feedback in a manner of performing interpolation on measurement values of partial channels transmitted in time durations different from each other. For example, the UE measures a first CSI-RS transmitted in first time duration and measures a second CSI-RS transmitted in second time duration. The UE can report CSI on all channels corresponding to the M' number of antenna ports or CSI on a partial channel in a manner of performing interpolation on measurement values of a first partial channel obtained by measuring the first CSI-RS and measurement values of a second partial channel obtained by measuring the second CSI-RS.

In order to perform interpolation on measurement values of partial channels, which are measured in time durations different from each other, there may exist a reference antenna port. For example, the reference antenna port may correspond to an antenna port configured to transmit a CSI-RS in both first time duration and second time duration. After at least a part of measurement values of partial channels is revised through the reference antenna port, it may be then able to perform interpolation using the revised measurement values.

Meanwhile, in order to perform interpolation on the measurement values of the partial channel, the UE can use information on a pattern of an antenna port that transmits an RS. In particular, if it is assumed that it is necessary to perform interpolation on a first measurement value and a second measurement value and it is unable to perform interpolation on a first measurement value and a third measurement value among the measurement values of the partial channel, information on the aforementioned contents can be provided to the UE by the eNB.

In a further different embodiment, it is not mandatory for the UE to perform interpolation on a partial channel only. For example, if the UE performs CSI feedback based on measurement of a partial channel, the eNB may perform interpolation on the partial channel.

In the first time duration of FIG. 13(a), the UE receives RSs from the antenna port P0 and the P1 and obtains $H^{(1)}$ [S1405]. The UE can wait for receiving an RS in the second time duration without immediately making a feedback on the $H^{(1)}$ to the eNB.

In the second time duration of FIG. 13(a), the UE receives RSs from the antenna port P0 and the P1 and obtains $H^{(2)}$ [S1410].

In the third time duration of FIG. 13(a), the UE receives RSs from the antenna port P0 and the P1 and obtains $H^{(3)}$ [S1415].

The UE obtains a total channel matrix H and a matrix $V_q$ in a manner of matching the $H^{(1)}$, the $H^{(2)}$ and the $H^{(3)}$ with each other [S1420]. For example, the UE performs singular value decomposition on the obtained channel matrix H. The UE obtains the $V_q$ by quantizing a right singular matrix V.

The UE feedbacks the quantized right singular matrix $V_q$ to the eNB [S1425]. For example, the UE feedbacks an index of a precoding matrix (PMI) of which a similarity with the right singular matrix $V_q$ quantized from a codebook is biggest to the eNB.

After the quantized right singular matrix $V_q$ is initially fed back, in other word, after a first PMI is transmitted, the UE updates the channel matrix H in a manner of reflecting a channel measurement result of an antenna port in which an RS is transmitted in time duration to the previously calculated channel matrix H only in every time duration. The UE performs singular value decomposition on the updated channel matrix H and transmits obtained $V_q$ to the eNB. For example, in FIG. 13(a), the channel matrix H is updated in every time duration such as fourth time duration, fifth time duration, sixth time duration, and the like and the quantized right singular matrix $V_q$ can be fed back to the eNB.

The eNB transmits downlink data on which beamforming (or precoding) is performed based on the quantized right singular matrix $V_q$ to the UE [S1430]. The UE receives the downlink data using a Hermitian matrix $U^H$ of a left singular matrix U or a minimum mean square error (MMSE) scheme.

FIG. 15 illustrates a result resulted from comparing CSI feedback capability according to the embodiment of FIG. 14 and CSI feedback capability in ideal environment with each other. Perfect CSI-T corresponds to the ideal environment. In this case, an eNB and a UE are aware of perfect channel information (channel matrix H with no error). The perfect CSI-T corresponds to capability in case that the eNB and the UE performs transmission and reception beamforming through a left singular matrix U or a right singular matrix V obtained from the perfect channel information. Since it is able to transmit a not-quantized channel measurement value to the eNB as it is in the ideal environment, it is considered as a codebook size has an infinite size and resolution. Quantized V corresponds to capability of the present embodiment. A codebook size is restricted by a prescribed size and a channel measurement value is quantized like actual environment.

When the number of antenna ports M corresponds to 2, 4, 8 or 16 and the number of antenna ports L assigned to transmit an RS per every duration (e.g., every subframe) corresponds to 2 or 4, average correlation power μ is measured as an indicator of capability. The average correlation power μ is defined as Equation 9 in the following.

$$\mu = E\{\text{diag}|U^H H V|^2\} \qquad \text{[Equation 9]}$$

In Equation 9, H corresponds to $USV^H$ and V is quantized. diag indicates a diagonal element in a matrix.

Figure 16:
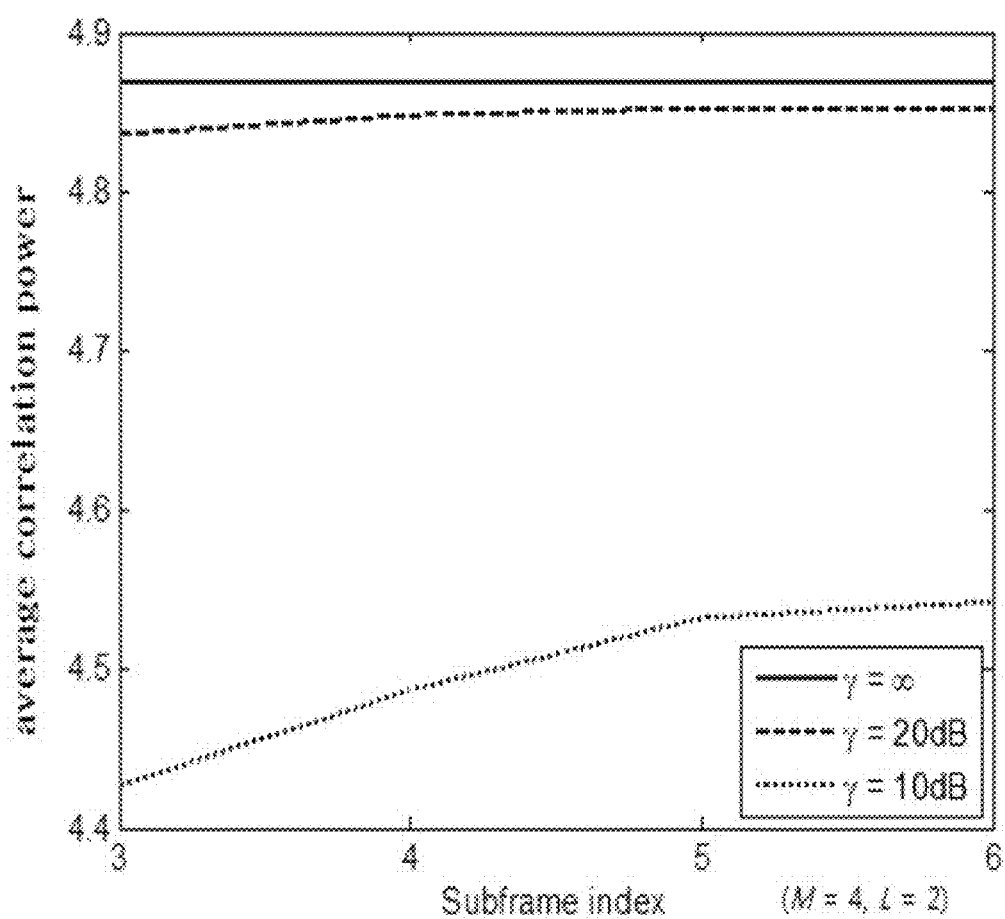

FIG. 16 shows a case that M corresponds to 4 and L corresponds to 2. FIG. 16 shows a change of average correlation power according to channel information obtained in every time duration (e.g., subframe). A ratio of transmit power to noise power of a channel is defined as $\gamma = E|H|^2/2\sigma^2$. FIG. 16 shows 3 cases. It may be able to relatively ignore the noise power in an infinite case and a 20 dB case.

In a 10 dB case, average correlation power increases as CSI feedback for each time duration is accumulated. Consequently, if M corresponds to 4 and L corresponds to 2, since the average correlation power gently increases after third time duration, K=3 may become an appropriate point of compromise between CSI feedback overhead and beamforming capability.

Figure 17:
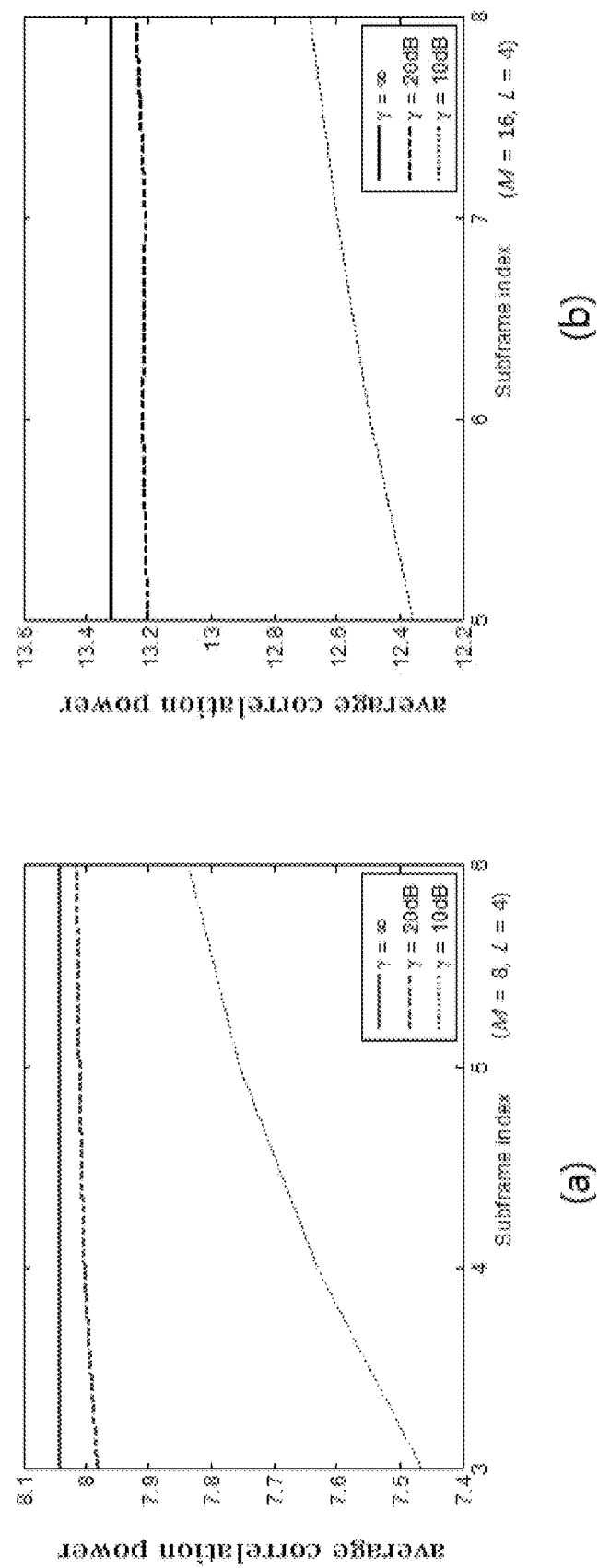

FIG. 17(a) and FIG. 17(b) show a change of average correlation power according to channel information obtained in every time duration (e.g., subframe) when M corresponds to 8 and L corresponds to 4 and when M corresponds to 16 and L corresponds to 4, respectively.

II-2. CSI Feedback Including Quantized-U or Quantized-UN

Figure 18:
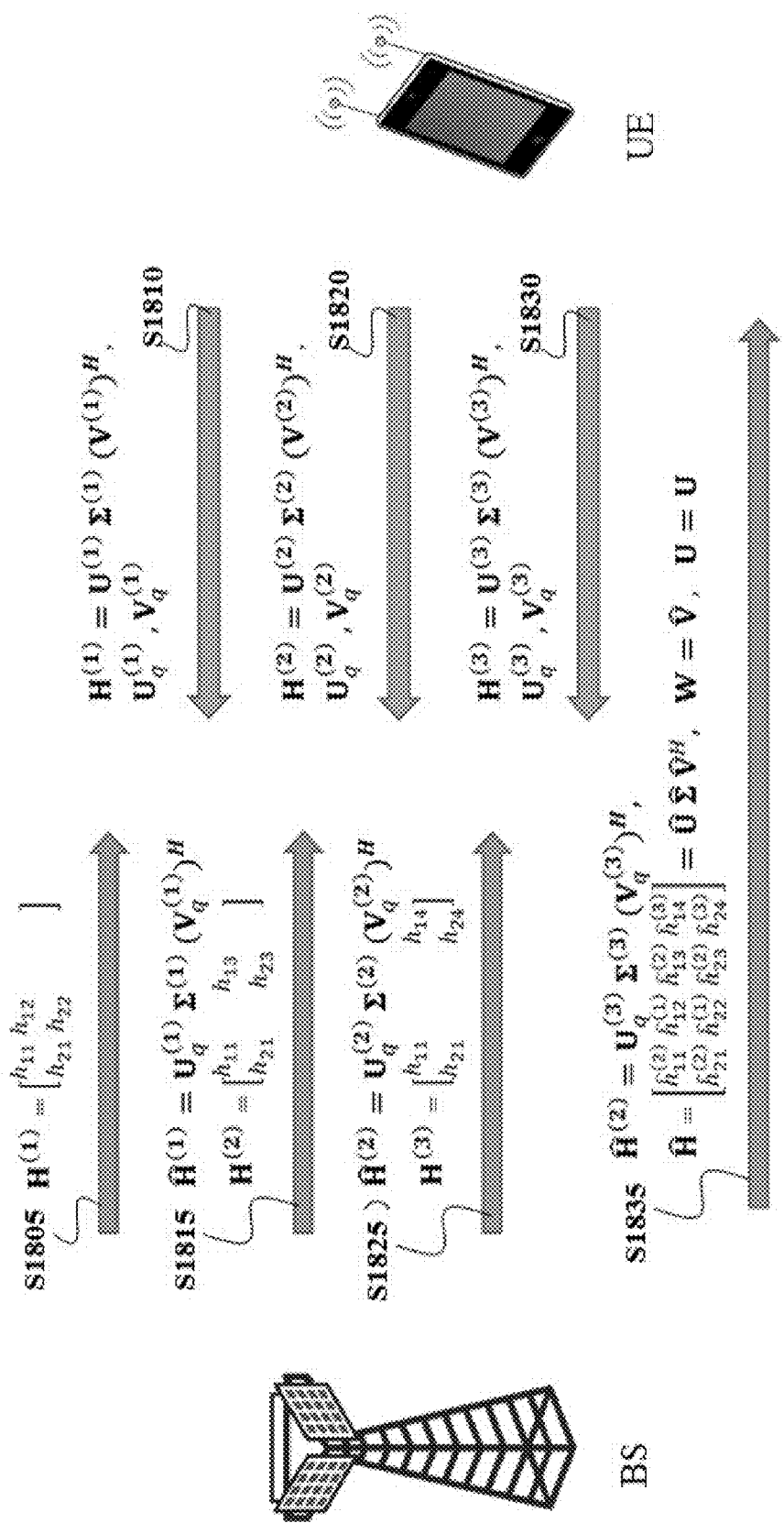
FIG. 18 is a diagram for a CSI feedback method according to a different embodiment of the present invention.

FIG. 18 is a diagram for a CSI feedback method according to a different embodiment of the present invention. Assume that an eNB transmits an RS according to a pattern of FIG.

13(a) and a UE has 2 reception antenna ports. Having received the RS, the UE feedbacks a quantized left singular matrix $U_q$ and a quantized right singular matrix $V_q$ to the eNB.

First of all, the eNB transmits an RS through antenna ports (P0 and P1) [S1805]. The UE obtains a matrix $H^{(1)}$ (hereinafter, a partial channel matrix) for partial channels corresponding to the antenna ports (P0 and P1) through the received RS. The UE performs singular value decomposition on the $H^{(1)}$ and obtains a partial left singular matrix $U^{(1)}$ and a partial right singular matrix $V^{(1)}$. The UE quantizes the partial left singular matrix $U^{(1)}$ and the partial right singular matrix $V^{(1)}$ and feedbacks the quantized partial left singular matrix $U^{(1)}$ and the partial right singular matrix $V^{(1)}$ to the eNB [S1810].

The eNB preferentially estimates the partial channel $H^{(1)}$ for first time duration by the calculation of $U_q^{(1)}\Sigma^{(1)}(V_q^{(1)})^H = \hat{H}^{(1)}$. A diagonal matrix $\Sigma^{(1)}$ can be represented using a CQI (channel quality indicator) corresponding to one of legacy feedback information. The eNB estimates the partial channel matrix $H^{(1)}$ for the antenna ports (P0 and P1) through the diagonal matrix $\Sigma^{(1)}$, a quantized partial right singular matrix $V_q^{(1)}$ and a quantized partial left singular matrix $U_q^{(1)}$.

Such a process as S1805 and S1801 is repeated for second time duration and third time duration [S1815, S1820, S1825, and S1830]. For example, the UE performs singular value decomposition on a partial channel matrix obtained in time duration j and may be able to obtain a partial left singular matrix $U^{(j)}$ and a partial right singular matrix $V^{(1)}$. The UE obtains $U_q^{(j)}$ and $V_q^{(j)}$ in a manner of quantizing each element of the partial left singular matrix $U^{(j)}$ and the partial right singular matrix $V^{(j)}$ to a phase. The UE feedbacks the $U_q^{(j)}$ and the $V_q^{(j)}$ to the eNB in every time duration.

The eNB estimates a $j^{th}$ partial channel $H^{(j)}$ by the calculation of $U_q^{(j)}\Sigma^{(j)}(V_q^{(j)})^H = \hat{H}^{(j)}$.

According to a further different embodiment, the UE does not feedback the left singular matrix $U_q$ to the eNB and the eNB may use a random orthogonal matrix satisfying a characteristic of a not-quantized left singular matrix U. For example, it may use $u_q(1)=[1;\ 1]$ and $u_q(2)=[1;\ -1]$, by which the present invention may be non-limited.

The eNB obtains channel information on total antenna ports over time duration as much as K=3. The eNB estimates an overall channel matrix $\hat{H}$ in a manner of matching partial channel matrixes, which are estimated in each time duration, with each other. In order to match the partial channel matrixes, the eNB can select a partial channel matrix from among the partial channel matrixes as a reference of matching. The partial channel matrix becoming the reference of matching (hereinafter, a reference matrix) may correspond to a channel matrix of which a channel state is best or a partial channel matrix of which phase information is most accurate based on a CQI. Phase of the rest of the partial channel matrixes can be adjusted based on a phase of the reference matrix. For example, if an RS is transmitted as shown in FIG. 13(a), although phase information of an antenna port P0 is included in all partial channel matrixes, the phase information of the antenna port P0 may delicately vary in each time duration. For example, the eNB calculates a difference between a phase of a reference antenna port P0 of a reference matrix determined as being most accurate and a phase of an antenna port P0 in a specific partial channel matrix and may be able to adjust phase of the rest of antenna ports of the specific partial channel matrix.

For example, the eNB executes phase revision for partial channels obtained via S1810, S1820 and S1803 process [S1835]. If a CQI of a partial channel obtained through j=2 is best among CQIs received through the S1810, the S1820 and the S1803, the eNB executes phase revision as follows.

In case of estimating a reference matrix $H^{(2)}$ among the total channels, the eNB reflects the estimation of the reference matrix $H^{(2)}$ to H as it is. Yet, in case of estimating $H^{(1)}$ and $H^{(3)}$, the eNB excludes a first row corresponding to the P0 and reflects it to a second row and a fourth row, respectively. A result of the estimation is shown in Equation 10 in the following.

$$\hat{H} = \begin{bmatrix} \hat{h}_{11}^{(2)} & \hat{h}_{12}^{(1)} & \hat{h}_{13}^{(2)} & \hat{h}_{14}^{(3)} \\ \hat{h}_{21}^{(2)} & \hat{h}_{22}^{(1)} & \hat{h}_{23}^{(2)} & \hat{h}_{24}^{(3)} \end{bmatrix} \quad \text{[Equation 10]}$$

It is necessary to perform phase revision on Equation 10. If the phase revision is performed on Equation 10 and a result of the phase revision is represented as Equation 11, Equation 12 shows a calculation for revising phase of H(1) and H(3) on the basis of a first row of $H^{(2)}$, i.e., an antenna port P0.

$$\hat{H} = \begin{bmatrix} \hat{h}_{11} & \hat{h}_{12} & \hat{h}_{13} & \hat{h}_{14} \\ \hat{h}_{21} & \hat{h}_{22} & \hat{h}_{23} & \hat{h}_{24} \end{bmatrix} \quad \text{[Equation 11]}$$

$$\angle \hat{h}_{12} = \angle h_{12}^{(1)} + (\angle h_{11}^{(2)} - \angle h_{11}^{(1)}), \quad \text{[Equation 12]}$$
$$\angle \hat{h}_{14} = \angle h_{14}^{(3)} + (\angle h_{11}^{(2)} - \angle h_{14}^{(3)}),$$
$$\angle \hat{h}_{22} = \angle h_{22}^{(1)} + (\angle h_{21}^{(2)} - \angle h_{22}^{(1)}),$$
$$\angle \hat{h}_{24} = \angle h_{24}^{(3)} + (\angle h_{21}^{(2)} - \angle h_{24}^{(3)})$$

As shown in the above, phase revision is not performed on a partial channel matrix corresponding to j index, which becomes a reference, and phase revision can be performed on elements of the rest of partial channel matrixes on the basis of the partial channel matrix corresponding to the j index.

Meanwhile, an RI (rank indicator) of a CSI reported in every time duration may be different from each other. The UE reports vectors of $u_q^{(j)}$ and $v_q^{(j)}$ as many as the rank number to the eNB and the eNB estimates channels as many as the limited rank number according to the report of the UE. The eNB performs downlink transmission within a range not exceeding a corresponding rank. For example, if a rank calculated for a $j^{th}$ partial channel (j=1) by the UE corresponds to 1, dimension of a matrix $U_q^{(j=1)}$ and dimension of a matrix $V_q^{(j=1)}$ correspond to $N_{RX} \times 1$ and $1 \times L$, respectively. (e.g.,)

$$\left( e.g.,\ U_q = \begin{bmatrix} 1 \\ 1 \end{bmatrix},\ V_q = [1\ \ -1] \right).$$

If a rank calculated for a $j^{th}$ partial channel (j=2) by the UE corresponds to 2, dimension of a matrix $U_q^{(j=2)}$ and dimension of a matrix $V_q^{(j=2)}$ correspond to $N_{RX} \times 2$ and $2 \times L$, respectively. (e.g., $$\left( e.g.,\ U_q = \begin{bmatrix} 1 & 1 \\ 1 & -1 \end{bmatrix},\ V_q = \begin{bmatrix} 1 & 1 \\ i & -i \end{bmatrix} \right).$$

In other word, an RI of a CSI report (e.g., RI, PMI, and/or CQI) can be independent from each other according to a partial channel index j or time duration. As mentioned in the foregoing description, if CSIs including an RI value different from each other is respectively fed back, the eNB estimates/reconfigures partial channels according to each index j and matches the estimated/reconfigured partial channels with each other. In particular, although CSIs including an RI different from each other are fed back, the eNB is able to estimate/reconfigure a total channel matrix. If CSI feedback including an independent RI value is permitted according to a partial channel index j, the UE can report CSI feedback optimized according to corresponding time duration. This may lead to increase efficiency and accuracy in case that the eNB performs transmission beamforming after a total channel is estimated or reconfigured.

The eNB performs singular value decomposition on the estimated total channel matrix $\hat{H}$ and generates a code vector. The code vector is formed in a manner that vectors as many as rank number are selected from a right singular matrix $\hat{V}$ of $\hat{H}=\hat{U}\hat{S}\hat{V}$. The eNB performs transmission beamforming through the formed code vectors.

If the UE feedbacks CSI to the eNB, the UE is able to know all of the total channel information. Hence, the UE performs singular value decomposition on the total channel matrix and obtains a left singular matrix U. When the UE receives downlink data, the UE eliminates or minimizes interference of a reception antenna using a Hermitian matrix $U^H$ of the left singular matrix.

FIG. 19 illustrates average correlation power according to the embodiment of FIG. 18. Assume that M corresponds to 4 or 8. R1 corresponds to a case that a single reception antenna is used only and R2 corresponds to a case that 2 reception antennas are used. A rank of the R1 is restricted to a half of the R2. A quantized-U/V (fixed U) indicates a case that the eNB quantizes a random orthogonal matrix ($u_q(1)$=[1; 1] and $u_q(2)$=[1; −1]) among the aforementioned embodiments. The quantized-U/V corresponds to average correlation power of which the eNB receives feedback on a quantized U matrix from the UE and the eNB uses the quantized U matrix. The quantized-U/V (fixed U) and the quantized-U/V show identical capability.

II-3. CSI Feedback Including Quantized-H

Figure 20:
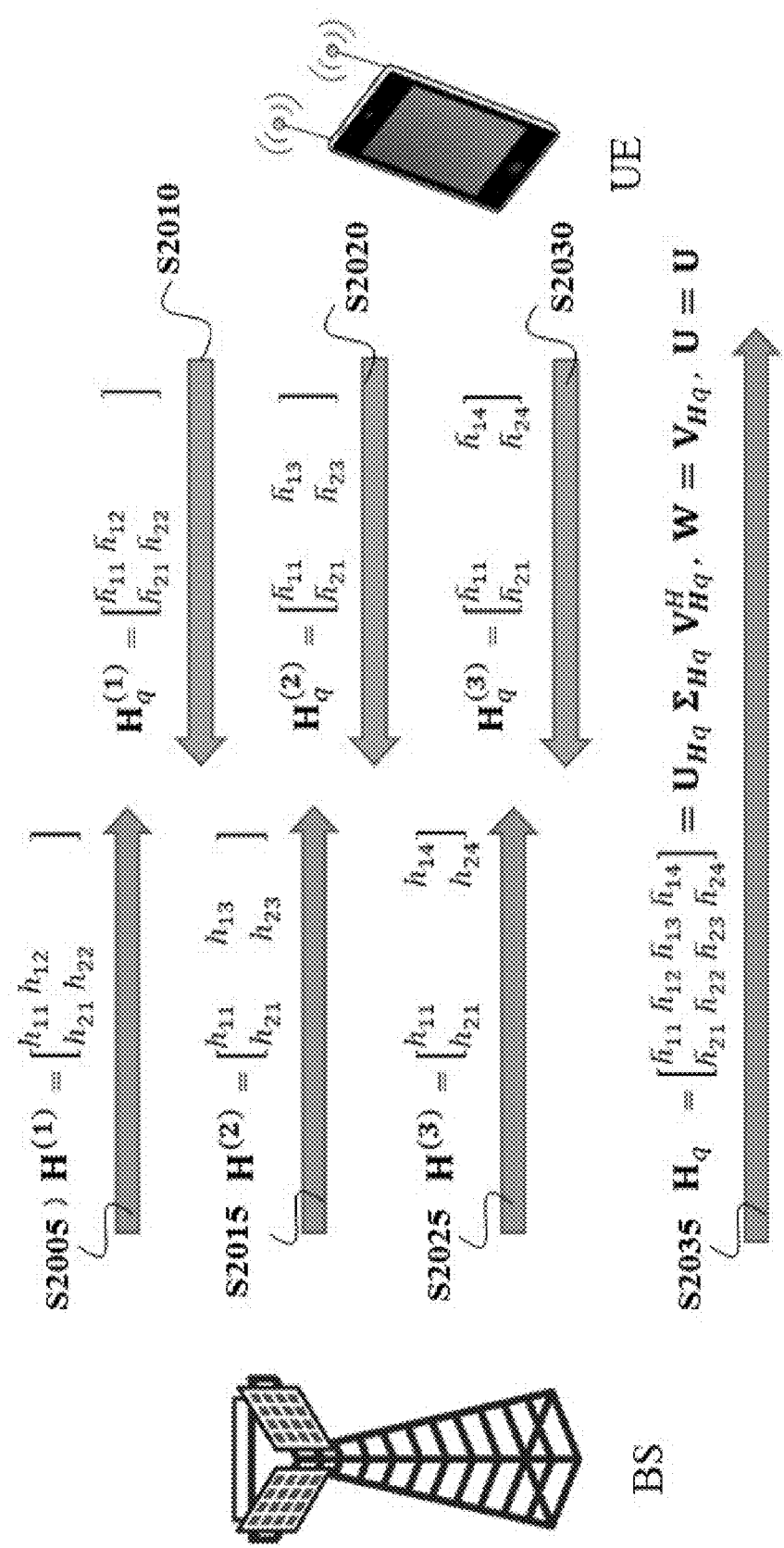

FIG. 20 is a diagram for a CSI feedback method according to a different embodiment of the present invention. Assume that an eNB has 4 transmission antenna ports and a UE has 2 reception antenna ports. According to the embodiment of FIG. 20, a process of performing singular value decomposition on a partial channel matrix performed by the UE is omitted. The UE quantizes a partial channel matrix (phase information of the partial channel matrix) and feedback the quantized partial channel matrix to the eNB.

The eNB transmits an RS according to the pattern shown in FIG. 13(a) [S2005, S2015, S2025]. The UE can obtain a partial channel matrix $H^{(1)}$, $H^{(2)}$ and $H^{(3)}$ using the RS received in each time duration. The UE quantizes the partial channel matrix $H^{(1)}$, $H^{(2)}$ and $H^{(3)}$ and feedback the quantized partial channel matrix $H^{(1)}$, $H^{(2)}$ and $H^{(3)}$ to the eNB [S2010, S2020, S2030].

The eNB obtains a quantized total channel matrix $H_q$ in a manner of accumulating the partial channel matrixes received via the S2010, S2020 and the S2030 and matching the partial channel matrixes with each other. The eNB performs singular value decomposition on the channel matrix $H_q$ and obtains a right singular matrix $V_{Hq}$. The right singular matrix $V_{Hq}$ is used as a code vector for transmission beamforming. The eNB performs transmission beamforming (or precoding) using a code vector consisting of column vectors of the right singular matrix $V_{Hq}$ [S2035].

The UE performs singular value decomposition on a channel matrix, which is known in a CSI feedback process, and receives downlink data transmitted by the eNB via transmission beamforming using a left singular matrix.

FIG. 21 illustrates average correlation power according to the embodiment of FIG. 20. Since it is able to understand a result of FIG. 21 based on the contents mentioned earlier in FIG. 15 to FIG. 19, explanation is omitted at this time.

II-4. CSI Feedback Including Quantized-V (Stacked)

According to a further different embodiment of the present invention, the UE can make a feedback on an antenna port transmitting an RS in a unit of every time duration (e.g., subframe) whenever the UE receives the RS. According to the aforementioned II-1 Quantized-V scheme, a matrix $V_q$ is fed back via singular value decomposition after the UE obtains channel information on the total M number of antenna ports. In order to more reduce the burden of a feedback resource consumed at a time compared to the aforementioned II-1 Quantized-V scheme, the present invention proposes a method of making a feedback on accumulated Quantized-V.

FIG. 22 explains a calculation process of a UE according to Quantized-V (stacked) when M corresponds to 4, L corresponds to 2 and the UE has 2 reception antennas. FIG. 22 shows channel information fed back in every time duration or each feedback reporting instance determined in advance.

The UE makes feedback on channel information of an antenna port transmitting an RS in current time duration and calculates channel information of antenna ports transmitting RSs from previous time durations to current time duration in an accumulation manner. The UE performs singular value decomposition on the accumulated channel information (or channel matrixes).

A size of a right singular matrix V on which singular value decomposition is performed is getting bigger as CSI feedback is repeated according to the accumulation of the channel information, thereby increasing overhead of the CSI feedback. Hence, the UE can transmit a part corresponding to an antenna port transmitting a current RS only to the eNB in a manner of extracting the part from the right singular matrix V instead of reporting the whole of the calculated right singular matrix V.

For example, when a rank corresponds to 2, the UE can feedback a part (2×2 matrix) represented by a dotted line to the eNB among elements of the right singular matrix in each CSI feedback instance. If a rank corresponds to 1, the UE can feedback 2×1 matrix corresponding to a left column of the dotted line only to the eNB. Those skilled in the art can understand that embodiments of the present invention are also applicable to a case that a rank exceeds 2.

It may consider a method of transmitting Quantized-V (stacked) using a codebook for PMI feedback of 3GPP LTE. Table 4 shows a codebook for transmitting maximum 2 layers in LTE system. If a rank corresponds to 1, an index is selected from the group consisting of an index 0, 1 and 2 in v=1 and the selected index is fed back. If an RI corresponds to 2, an index is selected from the group consisting of an index 0, 1 and 2 in v=2 and the selected index is fed back. For example, the UE selects a matrix (or vector) of which a similarity with a quantized right singular matrix (or vector) is biggest from among matrixes (or vectors) corresponding to each index.

TABLE 4

| Codebook index | Number of layers υ | |
| --- | --- | --- |
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | — |

Figure 23:
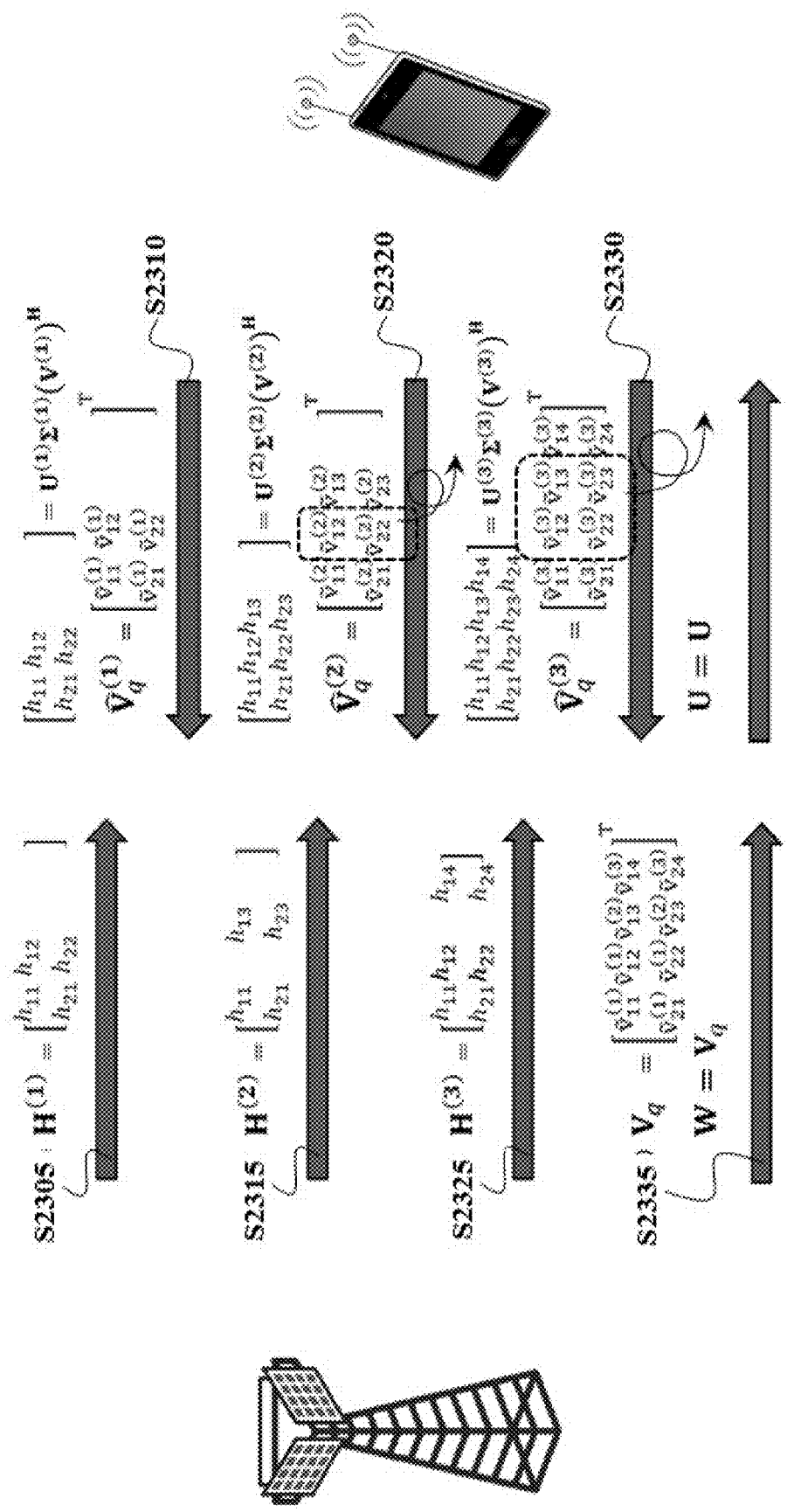

Operations of an eNB and a UE according to the Quantized-V (stacked) scheme are explained in the following with reference to FIG. 23. For clarity, assume that the eNB transmits an RS according to the pattern shown in FIG. 13(a).

The eNB transmits an RS in each time duration through the L number of antenna ports [S2305, S2315, S2325].

The UE accumulates information on a partial channel based on the RS received in each of the time durations. For example, in the step S2320, the UE generates a channel matrix using the information on the antenna ports accumulated via the step S2305 and the step S2315. In the step S2330, the UE generates a channel matrix in a manner of accumulating information of partial channels obtained through the step S2305, the step S2315 and the step S2325. The UE performs singular value decomposition on the accumulated channel matrixes.

For example, a dimension of the channel matrixes accumulated until $j^{th}$ time duration corresponds to $\{(N_{RX}) \times (1+(L-1) \cdot j)\}$. In this case, $N_{RX}$ corresponds to the number of antenna ports of the UE. A dimension of a right singular matrix V, which is obtained as a result of performing the singular value decomposition performed on the accumulated channel matrixes, corresponds to $\{(1+(L-1) \cdot j) \times (1+(L-1) \cdot j)\}$. In this case, a code vector used by the eNB for transmission beamforming corresponds to the $N_{RX}$ number of column vectors from the left of the right singular matrix V. Meanwhile, information fed back in each feedback instance corresponds to a partial matrix including column vectors corresponding to antenna ports transmitting an RS only among the V matrix consisting of the $N_{RX}$ number of columns. Hence, in the step S2320 and the step S2330 of FIG. 23, the remaining part except a part represented by a dotted line is CSI fed back to the eNB. More generally speaking, if a dimension of channel matrixes calculated in a manner of being accumulated corresponds to $\{(N) \times (L)\}$, a partial matrix of the fed back right singular matrix V corresponds to $\{(L) \times (N_{RX})\}$.

The eNB obtains the whole of the right singular matrix V in a manner of accumulating the partial matrixes of the right singular matrix V obtained in each feedback instance [S2335].

According to the present embodiment, as a feedback instance increases, in particular, as the II-4 Quantized-V (stacked) fed back by the UE is accumulated, the II-4 Quantized-V (stacked) converges into a beamforming result of II-1 Quantized-V (non-stacked).

FIG. 24 shows an average quantization error ratio of II-1 Quantized-V (non-stacked) to II-4 Quantized-V (stacked) in environment that M corresponds to 16 and L corresponds to 4. As shown in FIG. 22, similar to a legacy codebook-based feedback, a first element of partial matrixes for L number of ports, which are fed back in $j^{th}$ order, is fixed to 1. And, $[-v_1^{\varphi}-]^T$, $[-v_2^{\varphi}-]^T$ respectively indicate vectors including 3 elements in $j^{th}$ time duration (e.g., subframe).

In the present embodiment, a process of making a feedback on a quantized code vector can be applied to a process of making a feedback on a codebook-based PMI in a legacy LTE mobile communication system.

In case of making a feedback on an RI, the UE can feedback the RI in a manner of calculating PMI/CQI based on an RI selected by the UE. On the contrary, when the UE makes a feedback on CSI, if the UE differently selects an RI for a partial channel in every feedback instance, it may confuse the eNB. Hence, it may be able to restrict the UE not to change an RI within an identical iteration, i.e., K time duration (higher-layer signaling). In this case, the UE calculates PMI using a single RI in a process of generating a total channel matrix.

Meanwhile, similar to the embodiment of II-4, a CQI used for determining a MCS (modulation and coding scheme) can also be fed back based on accumulated channel information. In a different embodiment, the UE can feedback not only a CQI for a corresponding partial channel but also a CQI for all antenna ports based on the accumulated channel information when a feedback is made on $K^{th}$ time duration. For example, the UE can feedback a different with a past CQI (differential CQI) together with a complete CQI for a total channel. In a further different embodiment, a CQI feedback on all antenna ports can be performed via a separate feedback instance or a separate message based on the accumulated channel information. One of the aforementioned embodiments can be indicated to the UE via RRC signaling.

II-5. Repetition of Pattern and CSI Update

As mentioned earlier in FIG. 13, each antenna port transmits an RS according to a pattern and the pattern can be repeated. For example, if K corresponds to 3, RS transmission in fourth time duration can be performed by an antenna port identical to an antenna port transmitting an RS in first time duration.

When a pattern is repeated and CSI feedback is performed according to the pattern, an additional method of improving capability is explained in the following.

When a CSI is fed back according to a CSI-RS of a pattern such as a previous iteration, it may be able to enhance CSI feedback accuracy using previous CSI information. For example, in case of reporting a quantized matrix $V_q$ using PMI, it may be able to increase accuracy in a manner of averaging previous phase information and current phase information. Meanwhile, the current phase information can be selected from a codebook different from a codebook from which the previous phase information is selected.

Figure 25:
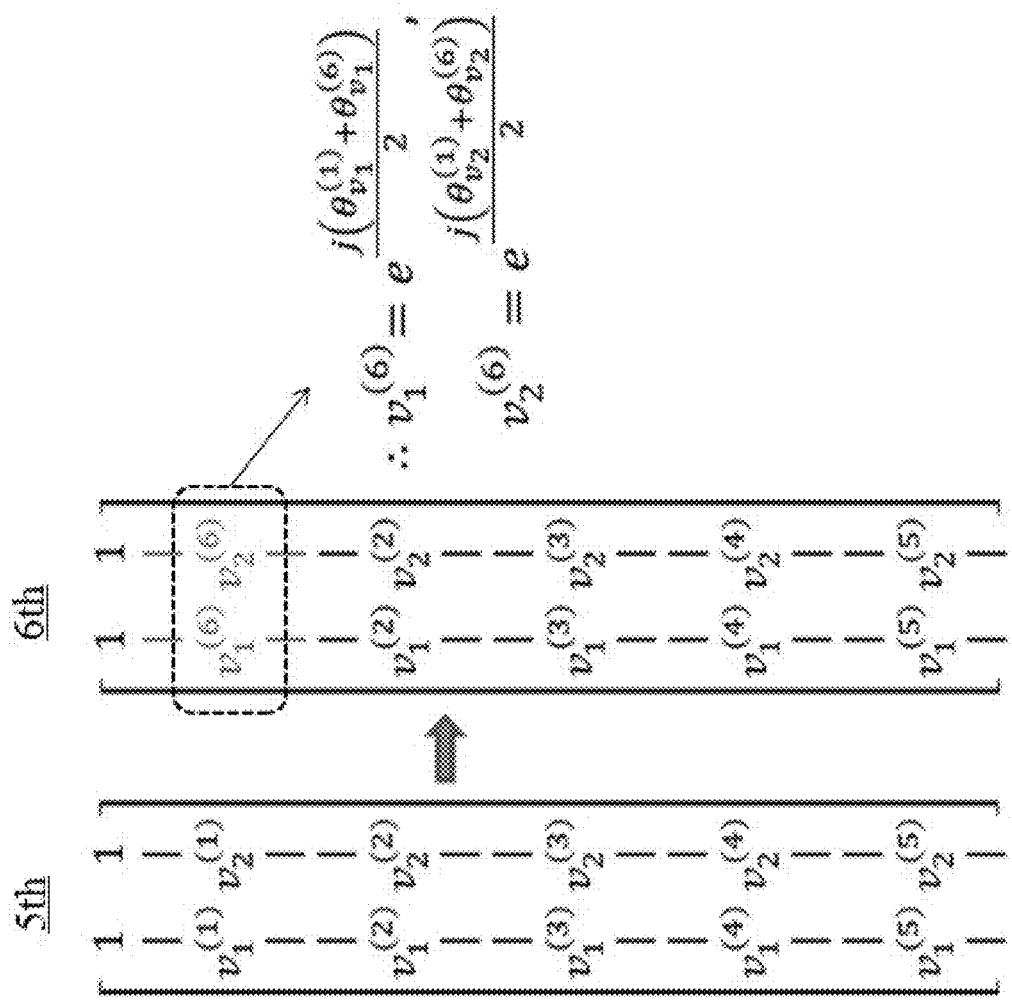

FIG. 25 corresponds to an embodiment of making a feedback on a CSI in response to a repetition of a pattern when M corresponds to 16, L corresponds to 4 and K corresponds to 5 in II-4 Quantized-V (stacked) scheme. A UE performs quantization on a right singular matrix V in $6^{th}$ time duration using a codebook including a random phase as a configuration element. $v_1^{(6)}$ and $v_2^{(6)}$ are updated through phase information selected from codebooks different from each other. For example, the UE selects phase information through a second codebook in $6^{th}$ time duration (e.g., $6^{th}$ subframe), selects phase information through a first codebook in $1^{st}$ time duration (e.g., $1^{st}$ subframe), calculates a phase information average and may be able to update a matrix V An eNB and the UE can preconfigure or discuss about a codebook to be used in each feedback instance among a plurality of codebooks (e.g., RRC signaling).

Figure 26:
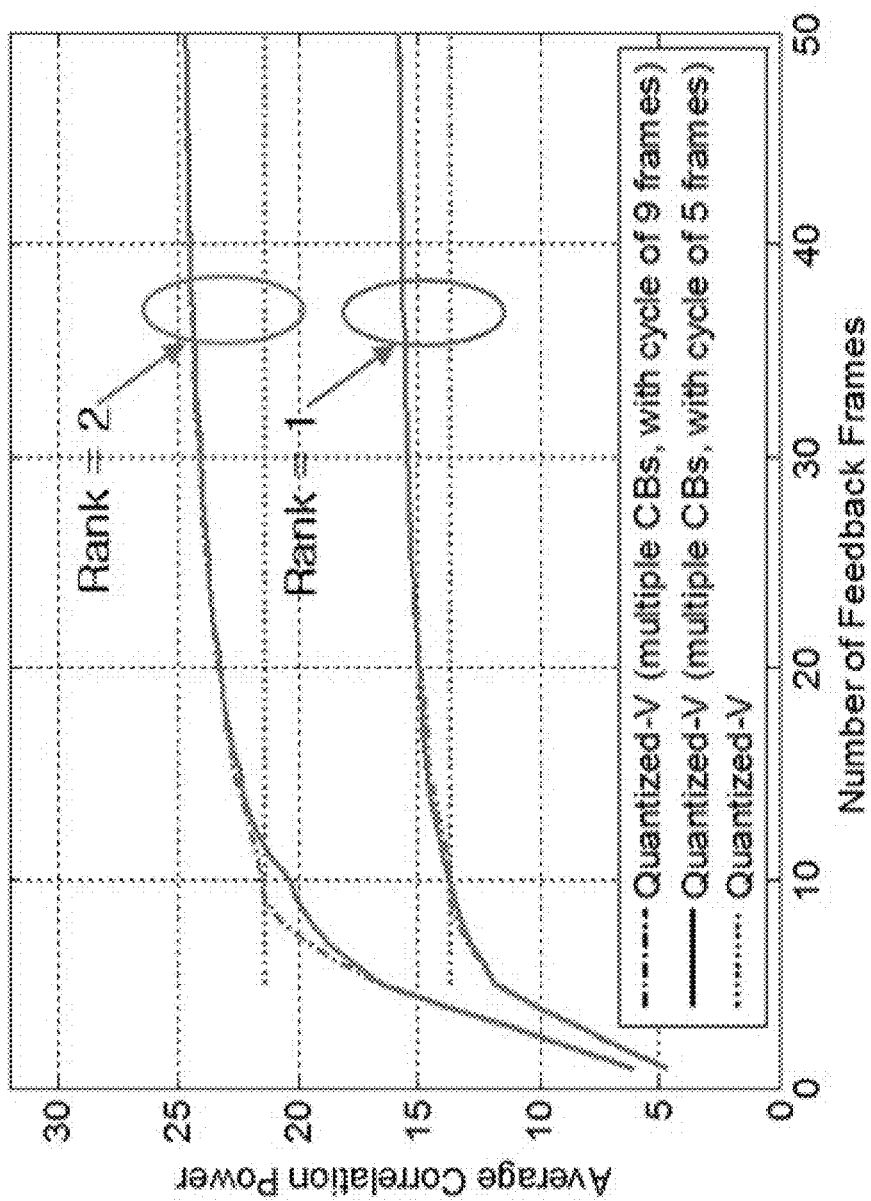

FIG. 26 illustrates a capability improvement effect improved by the embodiment mentioned earlier in II-5. In FIG. 26, time duration corresponds to a subframe unit and capability is measured on the basis of average correlation power. Assume that M corresponds to 16, L corresponds to 4, K corresponds to 5 or 9 and a UE has 2 reception antenna ports. After beamforming is performed using the II-4 Quantized-V (stacked) scheme, a previous pattern uses 'random codebook' of which phase of each code vector element has a random value for repeated time duration instead of a codebook using a QPSK symbol. In order to identically maintain the number of feedback bits assigned to every subframe, a random codebook of a size equal to a size of the codebook using the QPSK symbol is used.

II-5. Comparison of CSI Feedback Schemes

FIG. 27 illustrates a result resulted from simulating the aforementioned CSI feedback methods in terms of average correlation power.

Figure 28:
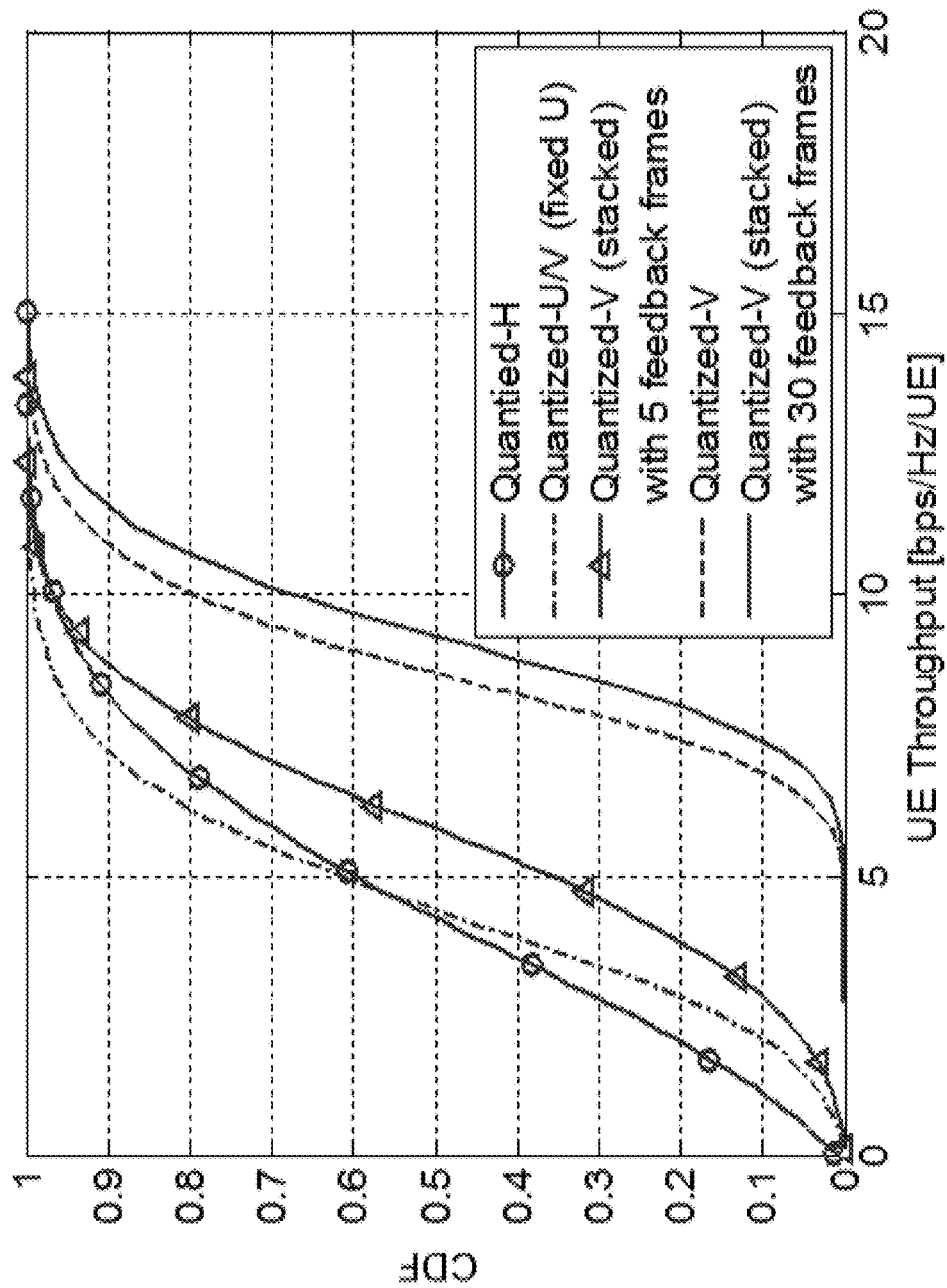
Figure 29:
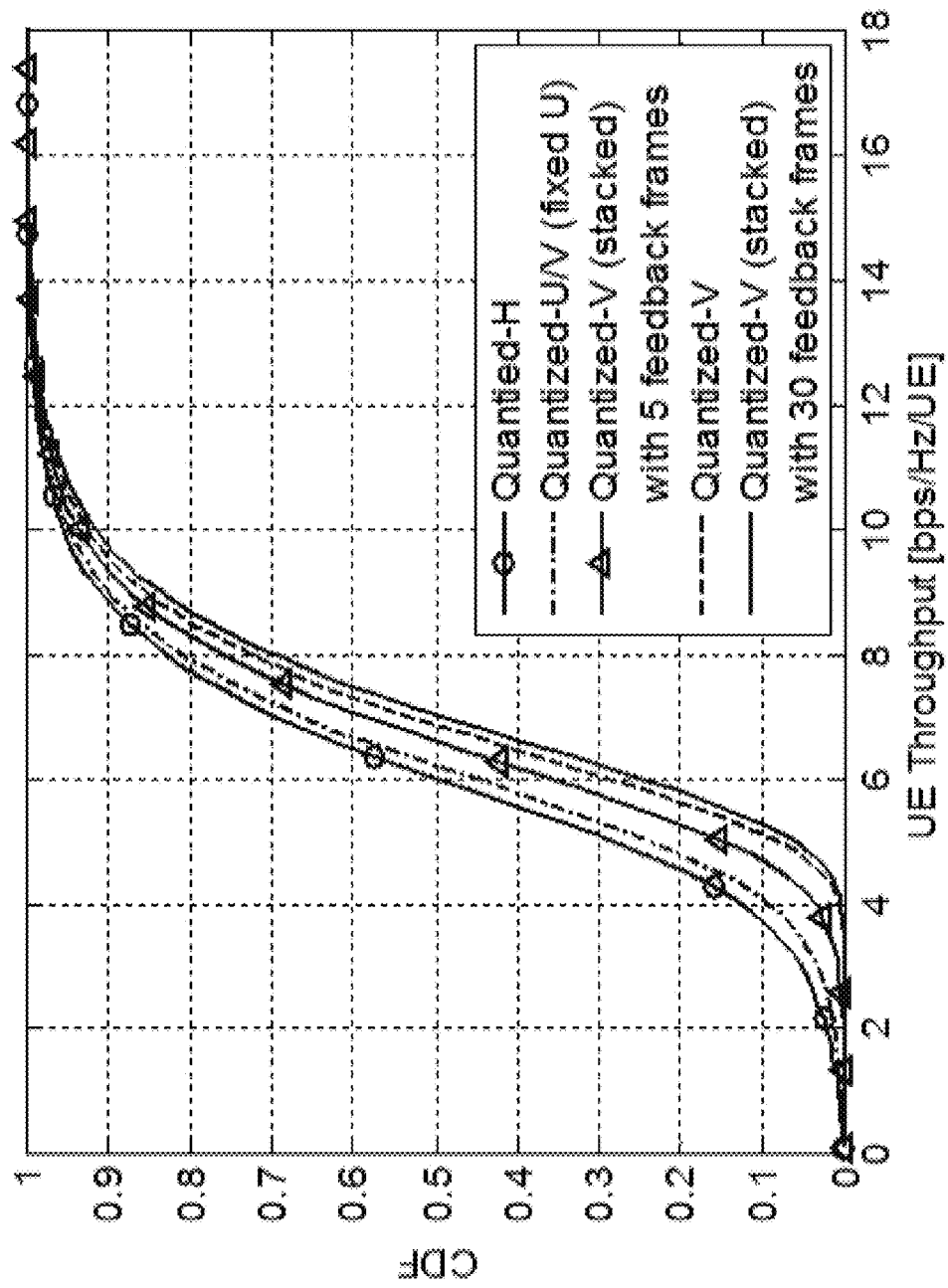

FIG. 28 and FIG. 29 illustrate a transfer rate of a user using the aforementioned CSI feedback methods. In this case, assume that a UE has 2 reception antenna ports and K corresponds to 5. FIG. 28 illustrates accumulation probability distribution of a transfer rate of a user when the UE receives information using two reception antenna ports and FIG. 29 illustrates accumulation probability distribution of a transfer rate of a user when the UE receives information using one reception antenna port only. A solid line indicates a transfer rate after feedback is performed 30 times in Quantized-V (stacked) scheme.

Figure 30:
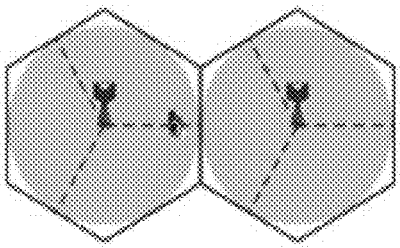

FIG. 30 illustrates simulation environment of FIG. 28 and FIG. 29. A user exists between a serving eNB and a neighboring eNB and a distance between the two eNBs corresponds to 500 m. A UE is located at a point within 150 m radius from the serving eNB.

FIG. 31 illustrates the number of CSI feedback bits transmitted according to each CSI feedback scheme. Depending on transmitted information, if one element of a matrix is quantized by one element among {1, −1, I, −i}, two bits are used. In case of Quantized-H, Quantized-UN and Quantized-V (stacked), when a subframe is transmitted, it is able to immediately feedback information on every subframe. Yet, in case of Quantized-V, accumulated information are transmitted at a time when information on all antenna ports are received through a plurality of subframes. Hence, in case of Quantized-H, Quantized-UN and Quantized-V (stacked), the number of feedback bits consumed in each every subframe corresponds to '2×(L−1)×(rank)'. In case of Quantized-V, the number of feedback bits consumed at a time after all subframes for the total M number of antenna ports corresponds to '2×(M−1)×(channel rank)'. If the aforementioned number of feedback bits is converted into a value of the number of feedback bits per subframe, consequently, the number of feedback bits of the three proposed schemes are identical with each other.

II-6. CSI Feedback Mode

In order to provide backward compatibility to a legacy UE not supporting enhanced RS transmission, a CSI feedback mode and a control signal, an eNB can selectively configure a legacy mode and an advanced mode. The UE signals whether or not the UE supports the advance mode to the eNB (capability signaling). The eNB can semi-statically signal switching of a mode to the UE (e.g., semi-static indication via RRC signaling). On the contrary, switching of a mode can be dynamically signaled via signaling of a physical layer or MAC layer (dynamic indication). In order to switch a mode, the eNB can transmit a control signal to the UE to indicate that enhanced CSI feedback is available. The eNB transmits a control signal for initiating the enhanced CSI feedback to the UE. For example, information exchanged between the eNB and the UE to switch a mode includes at least one selected from the group consisting of the number of physical antennas of the eNB, the number of antennas for transmitting an RS in a subframe, RS configuration (e.g., CSI-RS port number and CSI-RS configuration) and pattern information of an antenna port transmitting an RS.

III. Elevation Beamforming and Full-Dimension MIMO

III-1. High Level View

In the following description, in case of performing elevation beamforming (EB) and FD (full-dimension)-MIMO, a method of increasing system performance, which does not cause any serious overhead due to many numbers of antennas and measurement of an RS resource, is explained.

In the following description, the elevation beamforming and the FD-MIMO can be classified into 2 types. A first type corresponds to a type using a horizontal-domain CSI feedback only. The first type has a relatively low complexity. A second type a type using both a horizontal domain and a vertical domain. Although the second type shows a relatively accurate and high performance compared to the first type, the second type may have a complexity problem and an overhead problem.

III-1-(i) Relation Between TXRU (RF Chain) and Antenna Elements/Ports

Among terminologies used in the present specification, such a terminology as 'TXRU' is an abbreviation of a transceiver unit and may be referred to as an RF chain. For example, the TXRU corresponds to a base band processor capable of independently controlling a single RF chain or size and phase of a transmission symbol. The TXRU can be mapped to a plurality of transmission antenna elements by a corresponding phase shifters. For example, the number of TXRU may be equal to or less than the number of antenna elements.

For clarity, assume that a transmitter (or an eNB) includes 32 antenna elements in a cell, 4 elements are arrayed in horizontal direction and 8 elements are arrayed in vertical direction. Since the 8 elements arrayed in vertical direction are connected with a single TXRU, each of the 4 elements arrayed in horizontal direction is connected with 4 TXRUs.

As mentioned in the foregoing description, the number of TXRUs and the number of antenna elements may be different from each other and it may be necessary to virtualize an antenna port (hereinafter, an RS port) for transmitting an RS. It is able to virtualize an RS port to 4 TXRUs in various ways. A virtualization scheme may vary according to a mapping RS among a CRS, a CSI-RS and a DMRS. Specifically, in case of the CSI-RS, when a CSI-RS configuration including 4 CSI-RS ports is set to a UE, each of the 4 CSI-RS ports may correspond to each TXRU. In case of the CRS, if 2 CRS ports are used in a cell, one CRS port corresponds to 2 TXRUs and another CRS port may correspond to the remaining 2 TXRUs.

DMRS port virtualization may vary according to the number of layers transmitted based on a DMRS. For example, antenna ports can be variously mapped according to an RS, TXRUs, or antenna elements.

III-1-(ii). Elevation Beamforming

Beamforming in vertical direction (elevation beamforming) can be considered as vertical sectorization. For example, in case of the aforementioned example that there exist 4×8 antenna elements, 2 vertical sectors are formed and each vertical sector i is operated by 4 TXRUs ($N_i$=4) among total 8 TXRUs. In particular, in order to manage 2 vertical sectors, it may be necessary to have TXRUs as many as twice of the vertical sectors. Each vertical sector may have a unique CRS irrespective of physical cell ID virtualization by the corresponding TXRUs. Each vertical sector may have a relevant $N_i$-port CSI-RS configuration for a CSI feedback on the vertical sector. It is necessary to semi-statically change a tilting angle of each vertical sector to control load balancing and interference. In this case, vertical sector tilting is associated with a phase shifter for analog beamforming.

III-1-(iii). Full-Dimension MIMO

As mentioned in the foregoing description, each TXRU can be connected with a plurality of antenna elements, a sub-array, or a single antenna element. For performance of FD-MIMO, although it may be preferable to configure one-to-one (1:1) mapping between a TXRU and an antenna element, a subarray structure for mapping a TXRU to a plurality of antenna elements is more practical. In FD-MIMO, each antenna port of a CSI-RS is mapped to a TXRU in general. A CRS antenna port is mapped to a TXRU or is mapped to a plurality of TXRUs in a manner of being virtualized.

As mentioned in the foregoing description, the first type among the EB and the FD MIMO-scheme uses CSI feedback in horizontal domain only. In this case, in order to use a vertical domain, it is necessary to set and measure an additional CSI-RS in a UE. The UE reports a power level received per a port or a result of selecting an optimized antenna port through the additional CSI-RS. It is able to determine optimized vertical direction of long term for the UE based on the report of the UE.

In this case, each CSI-RS port in which a CSI-RS is transmitted is virtualized in response to antenna elements arrayed in vertical direction according to vertical direction becoming a target. The UE performs legacy horizontal domain short term feedback on a CSI-RS which is pre-coded in vertical direction becoming the target. In this case, it is preferable to transmit a non-periodical CSI-RS, which is associated with the UE or a UE group only, in consideration of overhead of a CSI-RS resource.

The second type among the FD-MIMO scheme can enhance vertical domain capability of a channel in a manner of using a new vertical domain feedback together with a horizontal domain feedback. It is necessary to newly define a vertical direction codebook and the codebook may correspond to a DFT-based codebook, by which the preset invention may be non-limited. In particular, a vertical domain shows characteristics different from a legacy horizontal domain. For example, a target codebook range may cover a specific angle only instead of whole range of vertical angles. It is preferable to generate a codebook on the basis of an angle at which the UE is positioned or the UE is able to position except a vertical angle heading to the sky (in 3D-Uma, zenith angles less than 90 degrees are excluded). Hence, a vertical direction codebook is limited in a subset or an angle.

Meanwhile, it is necessary to consider how many vertical direction ranks are used. In one embodiment, a vertical rank may be restricted to 1.

In summary, according to one embodiment of the present invention, vertical sector tilting can be semi-statically performed based on up/down data traffic and/or interference measurement to control load balancing and interference. And, a legacy short-term feedback can be performed based on a CSI-RS which is pre-coded in long-term vertical direction. In another embodiment of the present invention, it is able to perform vertical direction feedback together with legacy horizontal direction feedback.

III-2. RS Design Aspect

In one embodiment of the present invention, assume at least one among items described in the following. It may use a 2 dimensional antenna array. The 2 dimensional antenna array also includes a single column array of a cross pole antenna. It may use various numbers of TXRUs including 8, 16, 32 and 64 TXRUs. It may configure to measure maximum 64 (8×8) antenna ports. Designing an RS such as an SRS, a CSI-RS and a DMRS may change for EB/FD-MIMO. It is able to define an enhanced codebook and CSI feedback for a single user/multi-user MIMO (e.g., CQI definition, layer mapping, precoder/rank indication, etc.). The EB/FD-MIMO can operate based on channel reciprocity. A transmission diversity mode can be improved for the EB/FD-MIMO. Control signaling can be enhanced for SU/MU-MIMO in the EB/FD-MIMO. It is able to define eNB antenna calibration for the EB/FD-MIMO. The maximum number of reception layers per UE may also be restricted to 8 in the EB/FD-MIMO. In the following, RS design for the EB/FD-MIMO is explained in more detail.

Figure 32:
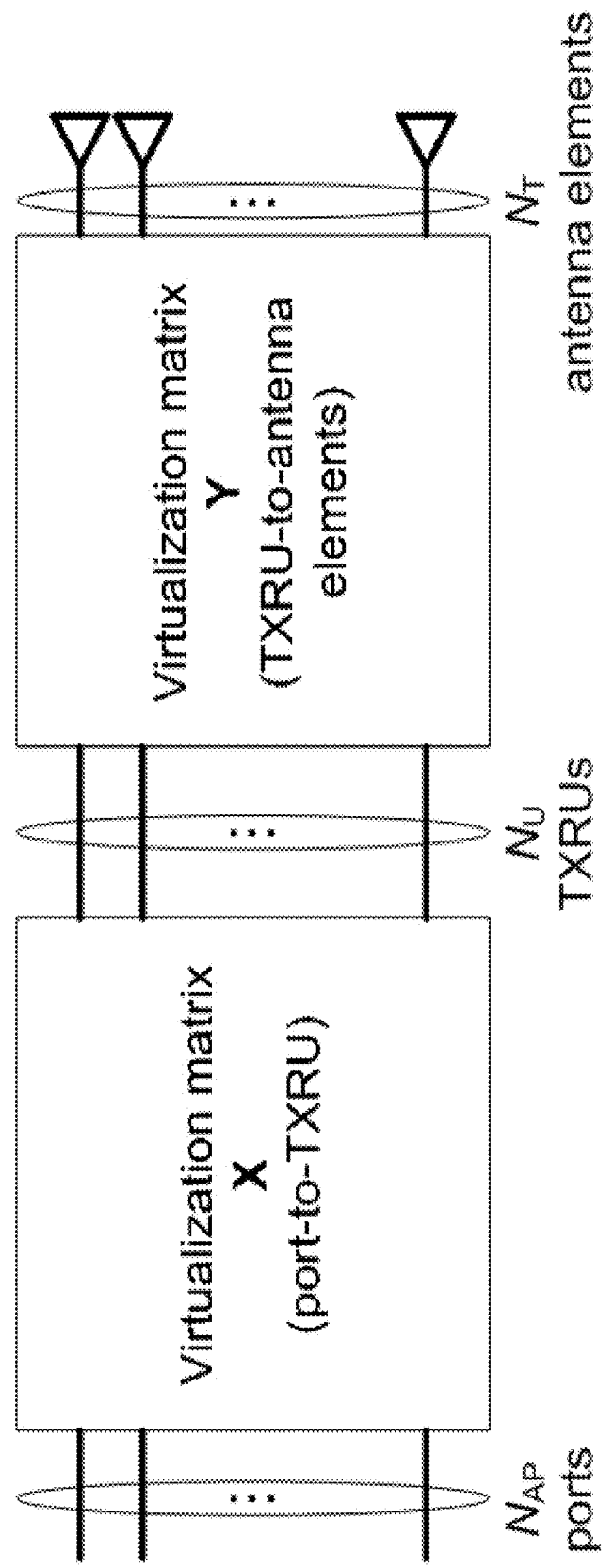
FIG. 32 is a diagram for mapping of an antenna port-TXRU-antenna element according to one embodiment of the present invention.

FIG. 32 is a diagram for briefly describing a mapping relation among an antenna port-TXRU-antenna element according to one embodiment of the present invention. Each antenna port is mapped to one or more TXRUs through a virtualization matrix X. Each TXRU is mapped to one or more antenna elements by a phase shifter corresponding to a virtualization matrix Y.

In the following, for clarity, all mapping relations between an antenna port and a physical antenna element are commonly called a virtualization matrix B. For example, the virtualization matrix B may correspond to a multiplication of the virtualization matrix X and Y, by which the present invention may be non-limited.

Meanwhile, similar to the EB/FD-MIMO, when there exist huge number of transmission antennas, it is necessary to determine how many RS ports are to be used to transmit and measure an RS. More specifically, it is necessary to consider radio resource management in the aspect of a method of setting CSI-RSs to a UE, whether or not there is a problem for a legacy RS configuration and usage for other RSs (e.g., DMRS, SRS and RS for RRM) to support the EB and FD-MIMO operation, in particular, a coverage mismatch problem between a data channel of high beam gain and a common control channel, etc.

III-2-(i). Enhancements on CSI-RS

According to one embodiment of the present invention, a CSI-RS can be virtualized over a plurality of antenna elements. Although it is able to provide a current CSI-RS configuration through UE-dedicated RRC signaling, an identical CSI-RS configuration is provided to UEs in an identical cell in general and the UEs measure and report a corresponding CSI-RS.

In another embodiment, in order to accurately configure a beam direction in an EB/FD-MIMO operation, CSI-RS transmission in a specific beam direction can be set to a UE. Meanwhile, it may use weighted vectors to virtualize a CSI-RS.

When a system performing an EB/FD-MIMO operation based on a 2-dimensional antenna array including many antenna elements is considered, there is a problem of whether to increase the number of antenna ports of a CSI-RS. In particular, there is a problem of whether to have N-port (N>8) CSI-RS configuration. In a massive MIMO system, it is able to increase the number of ports for transmitting a CSI-RS in proportion to the number of antenna elements. In particular, it may consider a method of configuring CSI-RS ports exceeding 8 CSI-RS ports (e.g., a method of increasing positions of a candidate RE according to every PRB pair). In this case, there is a demerit in that change of a legacy system is not small. Moreover, as the number of ports included in a CSI-RS configuration increases, there is a problem in that overhead of an RS resource also increases.

Hence, according to one embodiment of the present invention, the maximum number of antenna ports of a CSI-RS configuration may correspond to 8, by which the present invention may be non-limited.

It is able to estimate a channel correlation matrix through Kronecker multiplication of correlation in azimuth dimension and elevation dimension. Hence, in one embodiment of the present invention, a method of performing Kronecker precoding in a manner of combining a CSI-RS of azimuth dimension and a CSI-RS of elevation dimension with each other is proposed. In particular, the two CSI-RSs of the azimuth dimension and the elevation dimension are provided to a UE. In this case, each of the CSI-RSs has maximum 8 ports. Hence, it may be able to provide maximum 64 ports to the UE by the Kronecker multiplication.

In another embodiment, a single CSI-RS configuration including maximum 8 ports is provided to the UE. The single CSI-RS configuration can be used for virtualization-varying of CSI-RS transmissions at every time instance according to a CSI-RS period. For example, the UE can receive a single CSI-RS configuration including a sort of virtualization-varying pattern information. In order to obtain channel state information on many ports using a relatively less CSI-RS port configuration, the UE can perform CSI reporting based on a partial channel or an interpolated channel according to a CSI feedback configuration.

Figure 33:
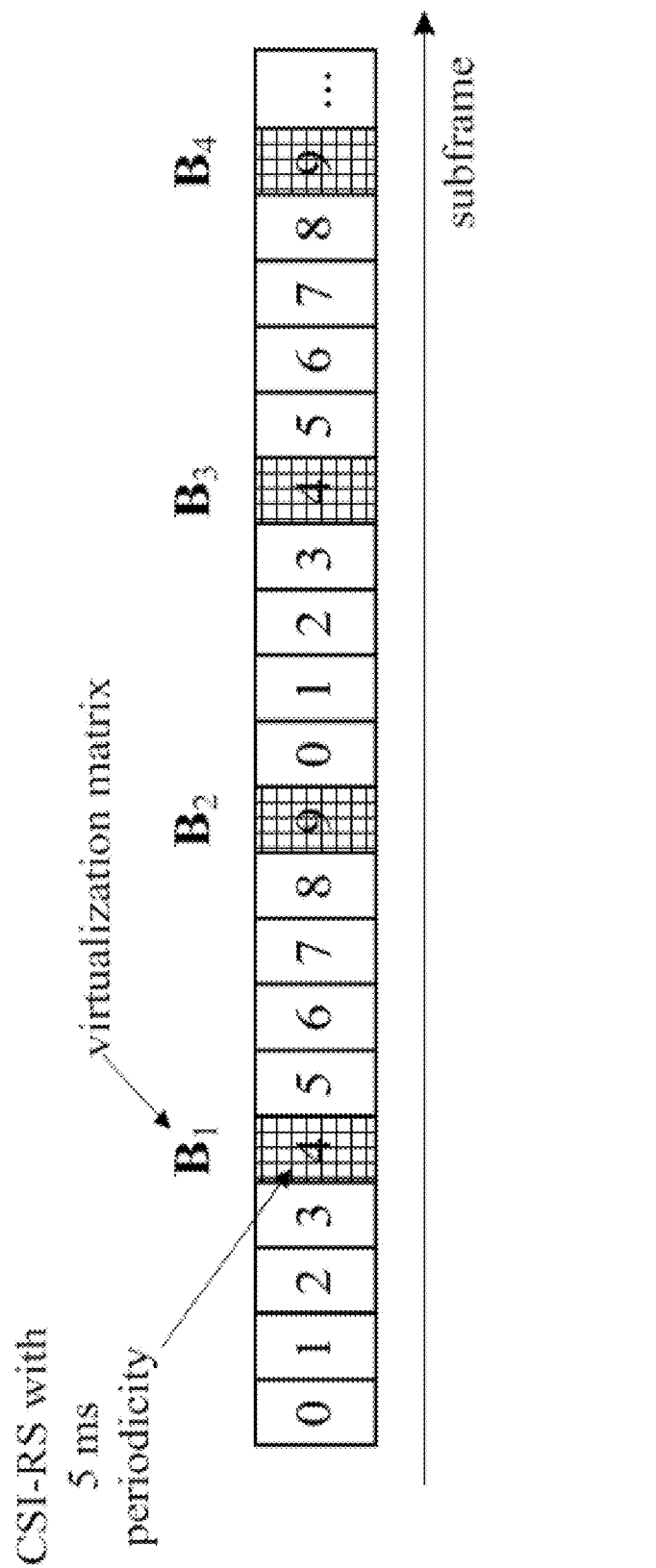
FIG. 33 is a diagram for transmission of a CSI-RS according to one embodiment of the present invention.

Meanwhile, it is necessary to consider whether or not instantaneous CSI-RS (or shirt-term CSI-RS) transmission is required for EB/FD-MIMO operation. FIG. 33 shows instantaneous CSI-RS transmission. In this case, a network can alternately use multiple virtualization matrixes for a single CSI-RS configuration (e.g., Bi for I=1, 2, . . . , K). And, the network can trigger a UE to report a CSI feedback in specific vertical beam direction only. For example, a CSI feedback can be triggered in a manner that the network indicates instantaneous CSI to be measured in a subframe where a CSI-RS to which a virtualization matrix Bi is applied is applied. If the UE is triggered to report a plurality of aperiodic CSI feedbacks in a plurality of subframes, each trigger is associated with virtual matrix Bi different from each other. An eNB can determine a beam direction appropriate for the UE based on the CSI feedbacks.

Figure 34:
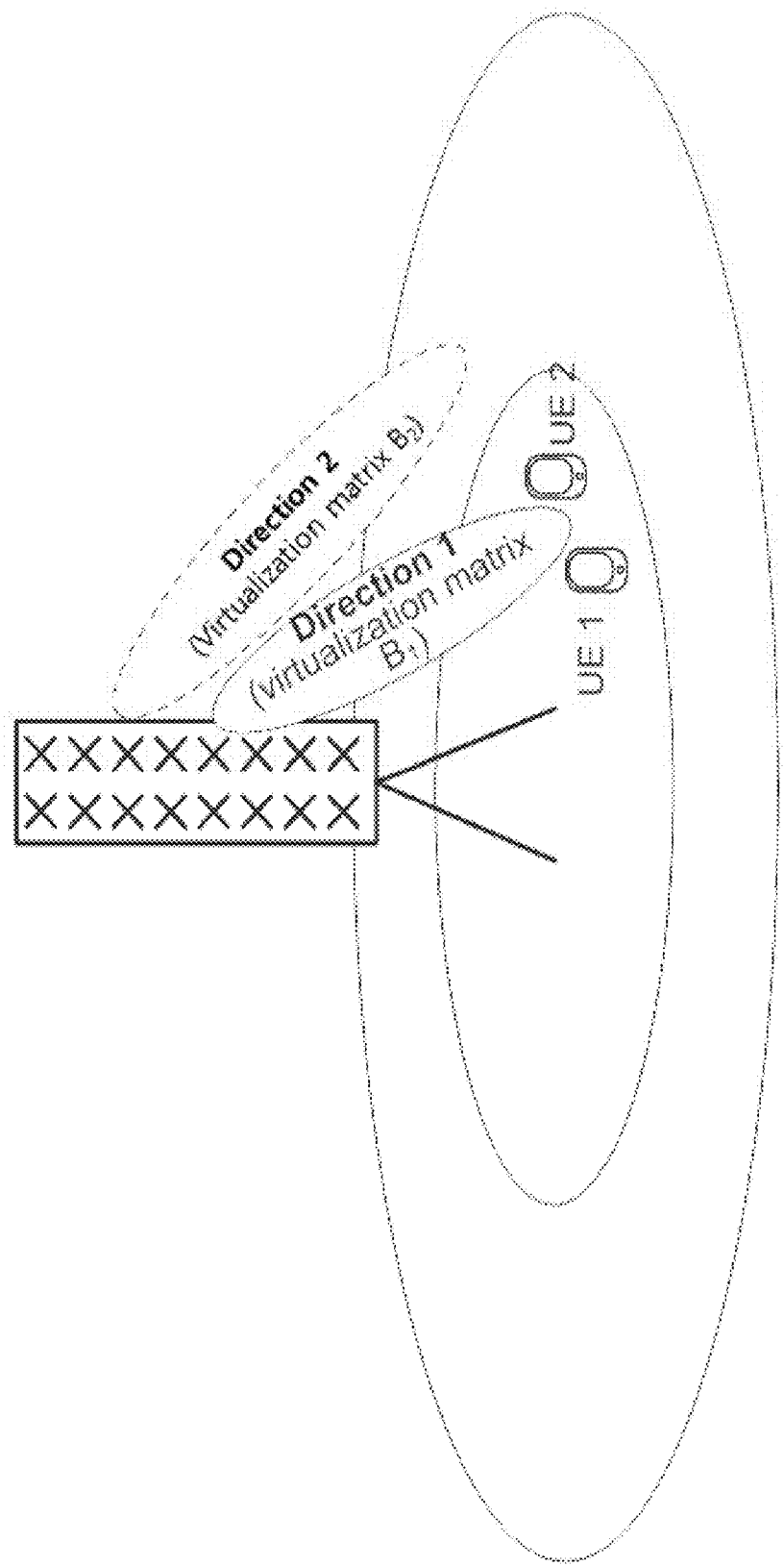
FIG. 34 is a diagram for EB/FD-MIMO environment according to one embodiment of the present invention.

FIG. 34 illustrates an EB/FD-MIMO operation according to one embodiment of the present invention. As shown in FIG. 34, instantaneous CSI-RS transmission can be used to reduce network overhead when huge number of antenna elements are implemented in a corresponding cell.

Meanwhile, in order not to waste an RS resource in a situation that there is no UE for measuring a virtualized CSI-RS, a network can control instances of transmitting the virtualized CSI-RS with an aperiodic scheme. For example, as shown in FIG. 34, when UEs are distributed in a whole cell radius and the UEs are moving, all UEs can be served at an internal area of a center of a cell at a part of the transmission instances. Hence, it is preferable to transmit a virtualized CSI-RS corresponding to the internal area of the cell only in first direction.

In other word, although a virtualized CSI-RS is not transmitted in second direction at the outer area adjacent to a cell boundary, it is O.K. Since UEs do not measure the CSI-RS in second direction, it is preferable not to transmit the CSI-RS in the second direction in the aspect of efficiency of radio resource management. Although the embodiment of FIG. 34 illustrates two areas only, if the areas are more segmented, a radio resource effect due to omission of a CSI-RS can be more increased.

III-2-(ii). Enhancements on Other RSs.

Practically, since the number of transmission antenna ports of most eNBs corresponds to 2, MU-MIMO is limited to 2. Under this limitation, there is no considerable problem in performing a MU-MIMO operation using current standard. If the huge number of transmission antenna elements and ports are activated for EB/FD-MIMO, it is able to support the huge number of MU-MIMO UE pairs in principle. In relation to this, necessity for enhancing a DMRS is raised to support the huge number of MU-MIMO pairs at the same time. For example, according to a current standard, it is a question whether it is preferable to set DMRS virtual cell IDs different from each other to MU-MIMO UE pairs different from each other. According to one embodiment of the present invention, it may be able to set a DMRS virtual cell ID to the MU-MIMO UE pairs different from each other.

In a situation that the number of antennas of an eNB is far more than the number of antennas of a UE, in case of a TDD system, the eNB can obtain channel state information base on channel reciprocity. For example, an SRS transmitted by the UE in uplink can also be used for channel measurement to determine a beam direction appropriate for downlink transmission transmitted from the eNB.

If the channel reciprocity based on a closed-loop scheme is also used for an FDD system, the eNB can set the SRS transmission to an FDD downlink band. By doing so, it is able to solve a serious mismatch problem between uplink measurement and an actual channel state of downlink.

In a heterogeneous network in which a macro cell and a small cell coexist, the macro cell can use a 2-dimensional active antenna system (2D-AAS). For example, a coverage mismatch problem inevitably occurs between not-precoded SRS transmission and pre-coded DMRS-based PDSCH transmission. More specifically, in the aspect of CRS-based control channel coverage, macro cell connection for DMRS-based PDSCH reception can be relatively better for a UE positioned at small cell coverage. This is because an eNB obtains higher beam gain from huge number of antenna elements. According to one embodiment of the present invention, in the aforementioned situation, although the UE is geographically positioned at the small cell coverage, it may be preferable for the UE to be associated with the macro cell to make the UE receive a service from the macro cell. To this end, it is necessary to enhance CRS-based legacy radio resource management. For example, it may be able to configure a radio resource management report based on a virtualized CSI-RS or it may be able to use an additional RS for a radio resource management report.

The aforementioned embodiments for the RS design can be summarized as follows. When a CSI-RS is configured in an EB/FD-MIMO operation, the number of antenna ports may not exceed 8 and it may be preferable to transmit an instantaneous CSI-RS. In order to transmit huge number of MU-MIMO pairs at the same time, it is necessary to enhance a DMRS. In order to efficiently manage a radio resource, it is necessary to enhance an SRS.

III-3. CSI Feedback and Codebook Aspect

In the following description, a CSI feedback scheme and a codebook enhanced for EB/FD-MIMO are mainly explained according to one embodiment of the present invention.

Figure 35:
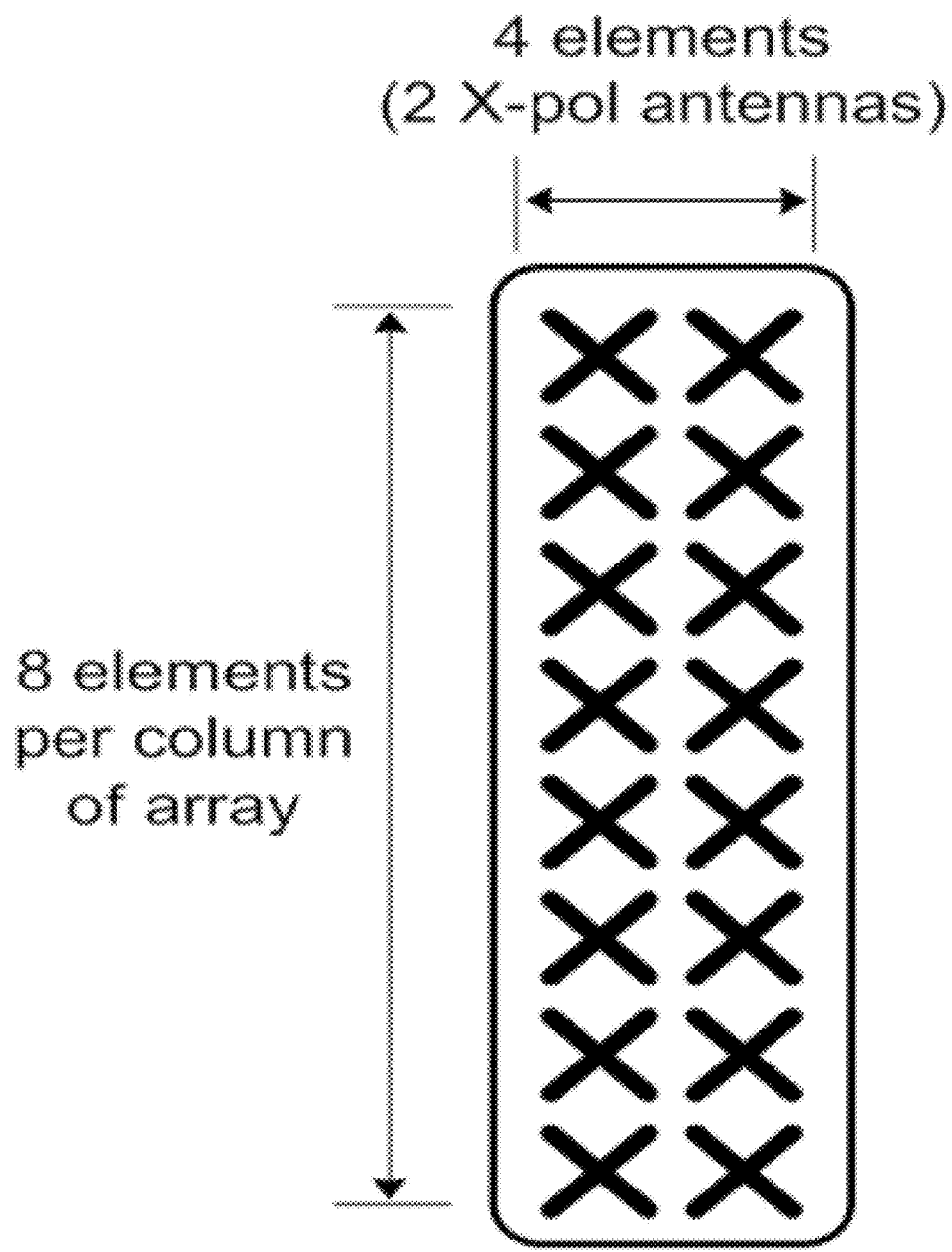
FIG. 35 is a diagram for a 2D-AAS antenna according to one embodiment of the present invention.

For clarity, an antenna configuration shown in FIG. 35 is assumed, by which the present invention may be non-limited. Referring to FIG. 35, a 2-dimensional active antenna array includes 32 antenna elements. In this case, at least 4 TXRUs exist in horizontal domain (H-domain) and each of the TXRUs is mapped to a single CSI-RS port. For example, 4-port-H-CSI-RS can be set to a UE for a horizontal domain CSI feedback. In a vertical domain, how many additional TXRUs are necessary may vary depending on a transmission scheme.

III-3-(i). Relying on H-Domain CSI Feedback

As mentioned in the foregoing description, according to one embodiment of the present invention, it may use H-domain CSI feedback only in an EB/FD MIMO operation.

Figure 36:
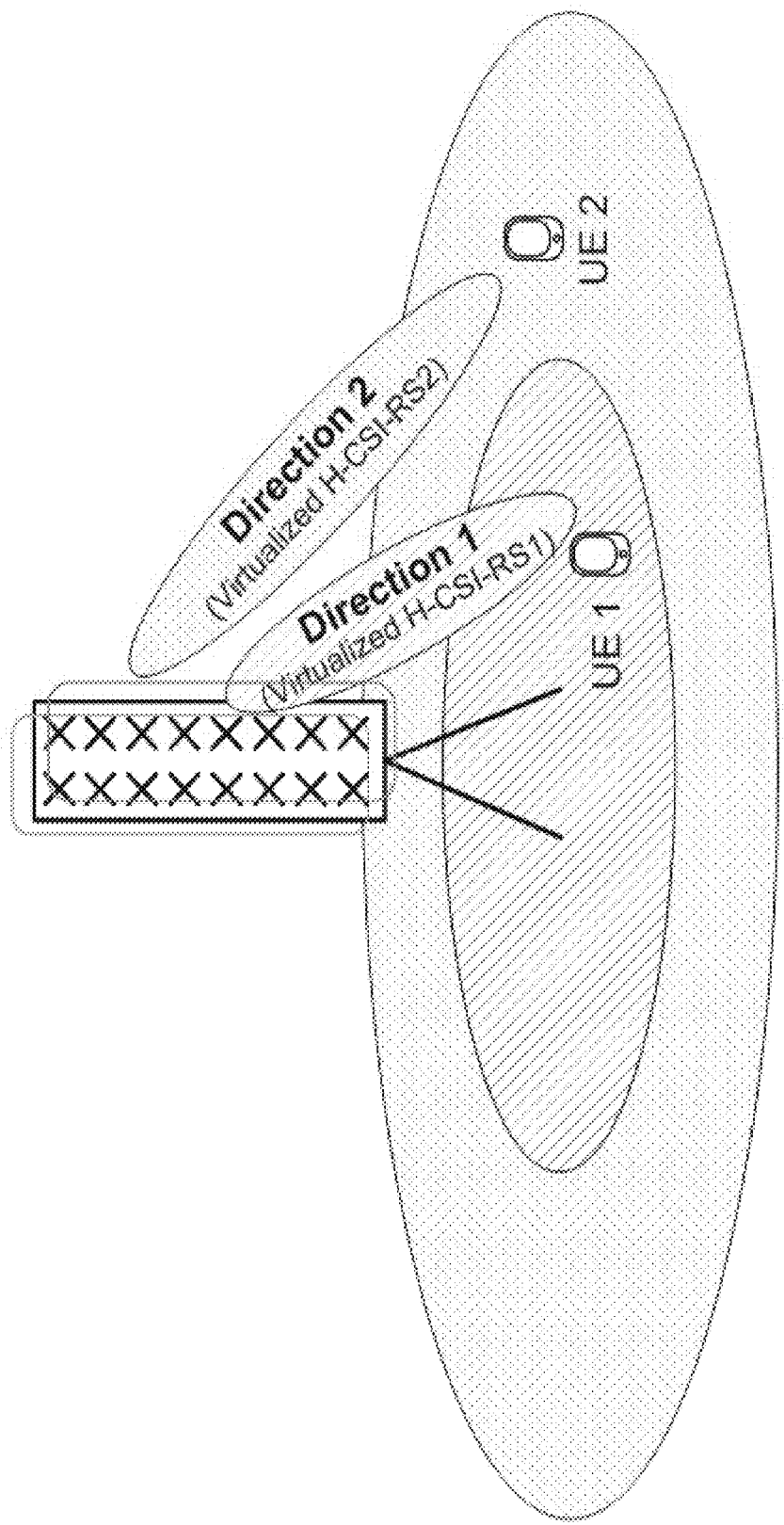
FIG. 36 is a diagram for EB/FD-MIMO environment according to a different embodiment of the present invention.

Meanwhile, an additional V-CSI-RS can be measured and set to a UE for vertical direction beamforming and a reception power level per port or a result of selecting the optimized N number of antenna ports can be fed back to an eNB. The eNB determines a long-term vertical direction optimized for the UE based on the feedback. More specifically, referring to an embodiment of FIG. 36, a cell is divided into an internal area (center part of the cell) in which 4-port H-CSI-RS1 corresponding to 4 TXRUs are transmitted and an external area (edge part of the cell) in which 4-port H-CSI-RS1 corresponding to other 4 TXRUs are transmitted. Those skilled in the art can understand that legacy horizontal direction sectorization is not depicted for clarity.

Each H-CSI-RS port is virtualized over vertically arrayed 8 antenna elements according to targeting vertical direction.

It may be able to provide 2-port V-CSI-RS configuration to a UE. One V-CSI-RS port is associated with a port of the H-CSI-RS1 and another V-CSI-RS port is associated with a port of the H-CSI-RS2. This is intended for a UE to select an optimized antenna port and make a feedback on the selected antenna port. The UE performs a horizontal domain short-term feedback on H-CSI-RSi virtualized by a target vertical direction i. When CSI-RS resource overhead for the horizontal domain short-term feedback is considered, it may be preferable to transmit an aperiodic CSI-RS to the UE or a UE group.

III-3-(ii). Consideration on Vertical Codebook

According to one embodiment of the present invention, a vertical codebook is newly defined for EB/FD-MIMO. The vertical codebook may correspond to a DFT-based codebook, by which the present invention may be non-limited. As mentioned in the foregoing description, since a UE may not exist in a specific vertical direction, it is preferable to define a codebook on the basis of an angle at which the UE is positioned or an angle at which the UE is able to be positioned. To this end, it may be able to set a limit on a subset or an angle of a codebook.

The aforementioned contents should be considered in terms of interference control. In a 3D channel model including not only an azimuth domain but also a vertical domain, interference characteristics different from each other may occur according to each domain. For example, if each transmitter (or an eNB) targets a UE positioned at a high location of a building, beams targeting a high direction may considerably affect a neighbor cell including a high beam gain. Hence, it may be able to set a limit on a specific beam direction to increase throughput of overall system.

When a vertical direction codebook is determined, it is also necessary to consider vertical channel environment. For example, since it is able to anticipate that a vertical channel has a lower angular spread in horizontal environment and has low probability of having a high transmission rank, relatively less number of multi-path components will appear. Hence, the number of available vertical ranks can be determined based on a vertical domain channel characteristic or it may be able to configure a vertical rank to be equal to or less than a specific value.

III-3-(iii). Closed-Loop Based Scheme

The number of antenna ports transmitting a CSI-RS is restricted in consideration of a trade-off relation between network overhead and performance and a CSI-RS can be transmitted over all transmission antenna elements by antenna port virtualization. A simple closed-loop scheme can be implemented by Kronecker precoding based on a horizontal domain feedback and a vertical domain feedback. According to a Kronecker precoding scheme, as shown in Equation 13 in the following, a total channel precoding matrix P can be obtained by Kronecker multiplication between a vertical-precoding matrix $P_V$ and a horizontal-precoding matrix $P_H$.

$$P = P_V \otimes P_H \qquad \text{[Equation 13]}$$

Figure 37:
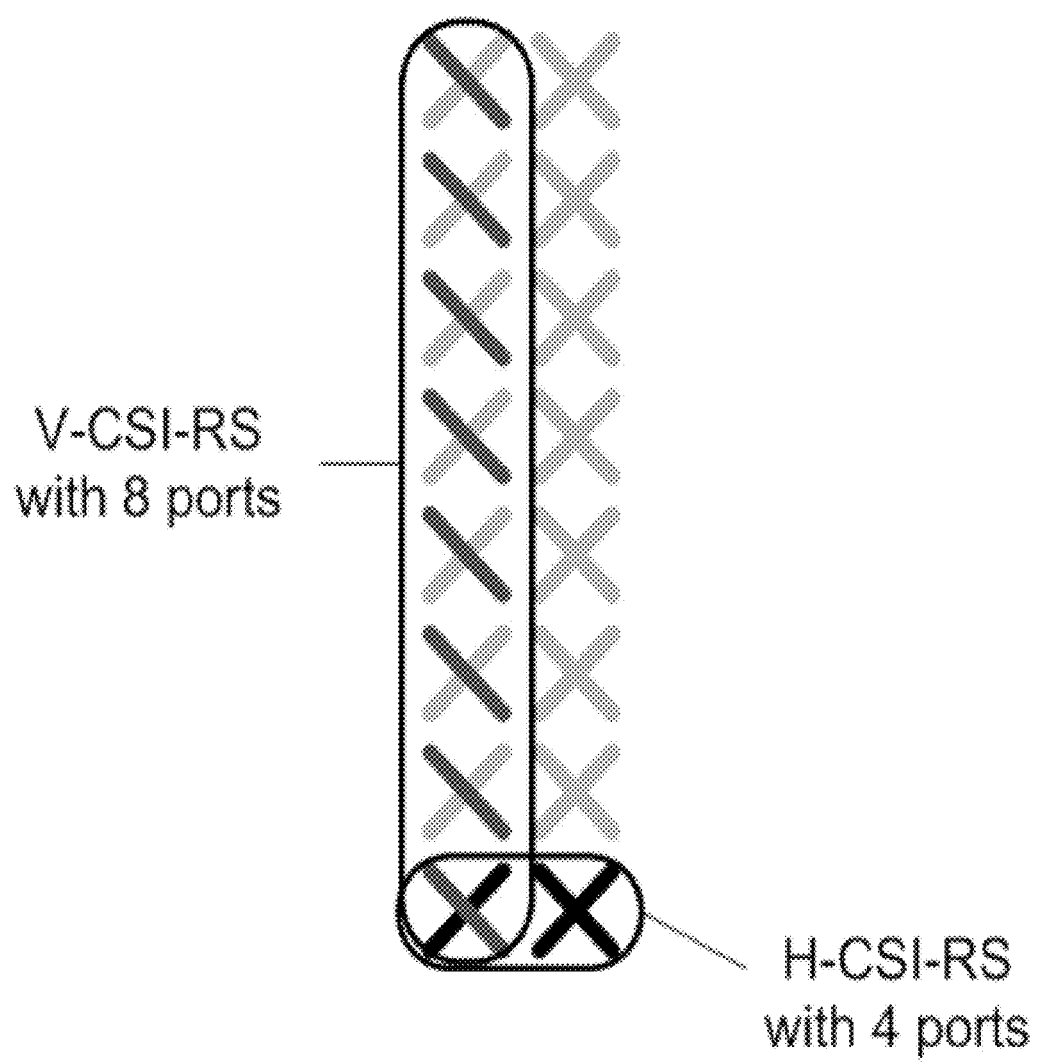
FIG. 37 is a diagram for multiple CSI-RS configurations according to one embodiment of the present invention.

In order to obtain the precoding matrix $P_V$ and $P_H$, a UE performs CSI measurement on both a vertical domain and a horizontal domain. For example, as shown in FIG. 37, the CSI measurements can be performed based on an 8-port V-CSI-RS configuration and a 4-port H-CSI-RS configuration, respectively.

According to the present embodiment, a codebook for a massive active antenna system can be divided into a vertical direction codebook and a horizontal direction codebook. Consequently, a legacy horizontal direction codebook is reused or expanded and a vertical direction codebook can be defined based on a linear phase increase. And, it is able to reduce RS and CSI feedback overhead compared to a case that total 32 (8*4)-port CSI-RS configuration is provided to a UE. This is because it is able to measure total 12 (8+4) antenna ports and individually design CSI feedback chains according to each CSI-RS configuration.

A CSI process configuration and a CQI definition may change under a dual feedback structure. For example, 2 CSI processes respectively corresponding to a vertical and horizontal feedback can be set to a UE. The UE independently determines a CSI of each process. Yet, it may be difficult for an eNB to calculate an appropriate CQI again based on a reported CQI and a reported RI may be different from an optimized rank. This is because a reported CSI is not generated based on all channels.

According to a different embodiment of the present invention, it may use a single CSI-RS configuration for EB/FD-MIMO. The single CSI-RS configuration is used for virtualization-varying CSI-RS transmission in every transmission timing according to a CSI-RS period. More specifically, a single CSI-RS configuration including a sort of virtualization-varying pattern information is included in a UE and the UE is able to perform CSI reporting based on a partial channel or an interpolation channel using the CSI-RS configuration. Meanwhile, an eNB can inform the UE of whether the CSI reporting is performed on a partial channel in every instance or a plurality of instances or is fed back at a time in a manner of combining CSIs for all channels with each other (e.g., CSI configuration).

Figure 38:
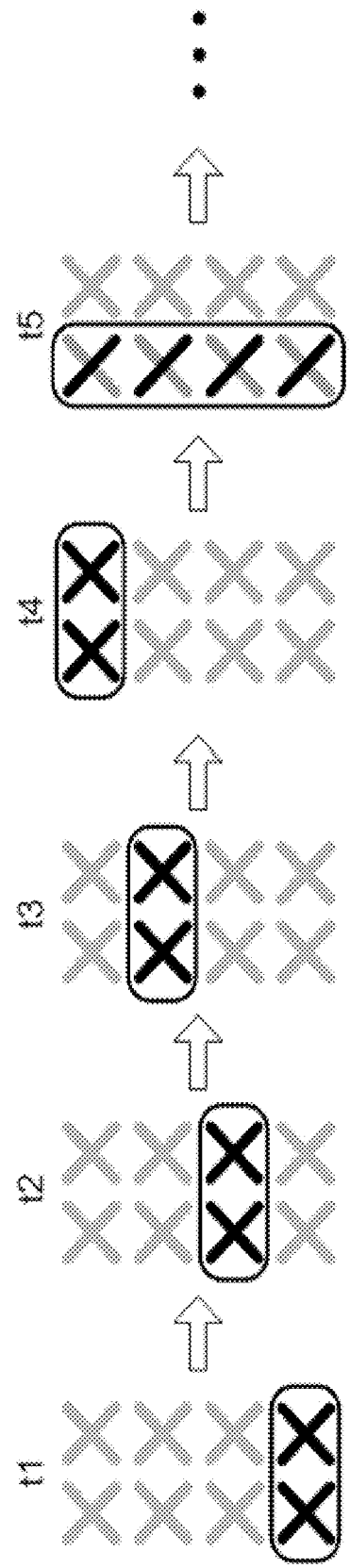
FIG. 38 is a diagram for a virtualization varying CSI-RS pattern according to one embodiment of the present invention.

FIG. 38 is a diagram for a virtualization varying CSI-RS through 4 ports. An eNB sets a 4-port CSI-RS configuration to a UE and the 4-port CSI-RS configuration makes 16 antenna elements to be measured for a plurality of timings or frequency resources in a manner of being divided. The UE may report a partial channel in every instance or report total channels over a plurality of instances in a manner of reconfiguring the total channels. In order to reconfigure the total channels, the UE can combine measurements measured over a plurality of instances with each other.

Meanwhile, a measurement window can be set to the UE. For example, the UE should not average measurement results among a plurality of L instances belonging to a virtualization-varying CSI-RS. In FIG. 38, measurements measured in t1 to t4 should not be averaged with each other. An eNB can obtain a CSI for massive antenna ports from the UE based on CSI feedbacks on the smaller number of CSI-RS ports.

In the foregoing description, although such a terminology as virtualization-varying CSI-RS is used for clarity, the scope of the present invention is not limited to the change of a virtualization matrix. For example, as shown in FIG. 38, a CSI-RS transmitted at each time instance may correspond to an unprecoded RS that an antenna port is directly mapped to a physical antenna element. Yet, since the aforementioned case can be considered as one of subsets of various virtualization matrixes, such a comprehensive term as a virtualization-varying CSI-RS is used in the present invention.

Meanwhile, in a different embodiment, a plurality of CSI-RS configurations can be set to a UE. For example, a CSI-RS configuration may exist in each of multiple partial channels measured by the UE over a plurality of timings. An RS transmitted in each time is mapped/set to an individual CSI-RS resource and a CSI-RS port number different from each other can be provided to every CSI-RS configuration of each time. For example, in FIG. 38, the total 16 port numbers can be defined and the port numbers can be set to the UE. Yet, a CSI-RS is transmitted in a part of the ports only according to each timing and the UE measures the CSI-RS. The UE accumulates measurements or performs interpolation on the measurements in consideration of a 16-port structure, calculates total RI/PMI/CQI and reports it to the eNB.

When a CSI is generated through interpolation of partial channel, the interpolation can be performed on a horizontal domain and a vertical domain, respectively. Or, the interpolation can be performed on either the horizontal domain or the vertical domain only. The eNB can explicitly signal a domain on which the interpolation is to be performed. According to a different embodiment, a criterion for whether to perform the interpolation of the partial channel can be implicitly defined between the eNB and the UE. For example, the criterion can be determined in consideration of a measurement value of a CSI-RS, a size of total channels, the number of antenna ports configured to transmit an RS and the like, by which the present invention may be non-limited.

The interpolation of the partial channel can be performed according to a subset of 2-dimensional antenna. For example, assume that a 2-dimensional antenna array includes a plurality of subsets. Yet, it is not mandatory that a plurality of the subsets are mutually exclusive. A part of a plurality of the subsets can be overlapped with each other. Assume that a UE obtains a measurement value of a first partial channel in a manner of measuring a first CSI-RS transmitted from a first subset and obtains a measurement value of a second partial channel in a manner of measuring a second CSI-RS transmitted from a second subset. The UE obtains a CSI on a third partial channel including the first partial channel in a manner of performing interpolation on measurement values of the first partial channel. Similarly, the UE obtains a CSI on a fourth partial channel in a manner of performing interpolation on measurement values of the second partial channel. The UE feedbacks the CSIs to the eNB in a manner of respectively transmitting the CSI on the third partial channel and the CSI on the fourth channel to the eNB or matching the CSI on the third partial channel and the CSI on the fourth channel with each other.

Meanwhile, the eNB can signal the UE to make a feedback on a partial channel or make a feedback on total channels. In particular, in case of an aperiodic CSI report, information for indicating whether a CSI request corresponds to a CSI request for a partial channel or a CSI request for total channels can be included in a corresponding DCI including a CSI request field. In case of a periodic CSI report, pattern information for indicating a reporting instance and a measurement value on which a CSI report is to be made can be provided to the UE.

In summary, the eNB can provide a single CSI-RS configuration or a plurality of CSI-RS configurations to the UE. And, the eNB can configure the UE to make a feedback on a CSI report for a partial channel whenever a partial channel is measured. Or, the eNB can configured the UE to make a feedback on a CSI report for total channels at a time in a manner of matching measurement results measured for partial channels with each other. Hence, there may mainly exist 4 configurations and a CSI feedback scheme of the UE may vary according to each configuration.

Case 1. A CSI-RS Configuration & CSI Feedback Configuration for Total Channels

In 3GPP standard, except a case of operating in a CoMP mode (transmission mode 10), a single CSI-RS configuration is provided to a UE and maximum 8 CSI-RS ports can be set to the UE.

Meanwhile, referring to FIG. 38, a single CSI-RS configuration is shifted over t1 to t4 and CSI-RSs are transmitted from the total 16 antenna elements. In order to perform CSI feedback on the CSI-RSs at a time, it is necessary to have a codebook supporting 16 ports similar to a case of making a feedback on one-time CSI-RS transmission through 16 antenna ports. Hence, it is difficult to use a legacy codebook supporting maximum 8 CSI-RS ports only for EB/FD-MIMO. Hence, according to one embodiment of the present invention, a method of newly defining a codebook supporting total 16 (or 32, 64) CSI-RS antenna ports is proposed. For example, if an EB/FD-MIMO mode is set to a UE used to use a codebook supporting 4 or 8 antenna ports, the UE may perform CSI feedback through a codebook supporting 16, 32 or 64 antenna ports. Meanwhile, the 16/32/64-port codebook for EB/FD-MIMO may correspond to a codebook corresponding to the aforementioned quantized right singular matrix $V_q$.

Meanwhile, if CSI is reported at a time for the total 16 CSI-RS ports, an RI may indicate rank=16. Since the RI is unable to exceed the number of CSI-RS ports, although a maximum value of the RI corresponds to 8 in a legacy system, the maximum value of the RI can be extended to 16 or 32 in the EB/FD-MIMO, by which the present invention may be non-limited.

Case 2. A CSI-RS Configuration & CSI Feedback Configuration for Partial Channel

It is able to configure an eNB to set a single CSI-RS configuration to a UE and configure the UE to make a CSI report on a partial channel. In this case, it is necessary to define transmission timing of a CSI-RS to make a feedback on a CSI report. For example, it is able to configure the UE to make a feedback on a CSI from a subframe appearing as many as N subframes prior to a subframe carrying a DCI including a CSI-request to a subframe in which a most recent CSI-RS is transmitted, by which the present invention may be non-limited.

Meanwhile, if it is assumed that the UE measures a CSI-RS transmitted at t1 and reports a CSI according to an embodiment of FIG. 38, an RI becomes rank <=4. In particular, since the RI is restricted to be a number equal to or less than the number of CSI-RS ports, the RI does not exceed a range of 2 cross-poll antennas (4 antenna ports). And, it may reuse a legacy 4-port-based codebook for reporting PMI.

When the case 1 and the case 2 are compared with each other, it is able to know that a type of a codebook and the number of rank may vary depending on whether a UE reports CSI for a partial channel or the UE reports CSI for the total channels.

Case 3. A Plurality of CSI-RS Configurations & CSI Feedback Configuration for Total Channels It is able to provide a plurality of CSI-RS configurations to a UE at the same time. In this case, each of a plurality of the CSI-RS configurations may correspond to an instance different from each other in FIG. 38. Referring to FIG. 38, an eNB can provide a CSI-RS configuration for t1, a CSI-RS configuration for t2, . . . , a CSI-RS configuration for t4 to the UE at the same time.

According to one embodiment of the present invention, at least one or more horizontal direction (or azimuth direction) CSI-RS configurations and at least one or more vertical direction CSI-RS configurations can be included in a plurality of the CSI-RS configurations. For example, in FIG. 38, it may be able to provide a horizontal direction CSI-RS configuration for t1 and a vertical direction VSI-RS configuration for t5 to the UE at the same time. Horizontal direction CSI-RS configurations for t3 to t4 can be obtained from the horizontal direction CSI-RS configuration for t1 and a vertical direction CSI-RS configuration for t6 can be obtained from a vertical direction CSI-RS configuration for t5.

Meanwhile, when the UE makes a feedback on a CSI report for total channels, as mentioned earlier in case 1, a rank corresponds to 16/32 and a PMI can be selected from a 16/32-port codebook.

Case 4. A Plurality of CSI-RS Configurations & CSI Feedback Configuration for Partial Channel If it is assumed that a plurality of CSI-RS configurations are associated with subframes different from each other, a UE can report a CSI based on a CSI-RS configuration which is associated with a subframe in which a CSI report is triggered.

Meanwhile, if a CSI-RS configuration is not associated with a subframe in which a CSI report is triggered, it is able to implicitly define as a UE makes a feedback on a CSI report based on CSI-RSs received through the N number of most recent subframes.

The aforementioned CSI-RS configuration and the CSI feedback configuration can be provided to the UE via an RRC message. The CSI-RS configuration and the CSI feedback configuration can be respectively transmitted via RRC messages different from each other or can be transmitted via a single RRC message. According to a different embodiment, a CSI-RS configuration is transmitted via an RRC message, whereas a CSI feedback configuration can be transmitted via an MAC message or PDCCH. For example, it may be able to additionally add a field indicating a CSI feedback configuration to a CSI-request field in a DCI or a size of the CSI-request field itself can be expanded.

III-3-(iv). Open-Loop Based Scheme

Depending on a channel state, it may be difficult to use the aforementioned closed-loop scheme due to overhead and a complexity problem. Hence, it may be able to consider an open-loop scheme through enhancement of SFBC or LD-CDD precoding. According to the open-loop scheme, it may be able to reduce feedback overhead and obtain a diversity gain without precoding information. Yet, since a legacy open-loop scheme operates based on a CRS, it is difficult to apply the open-loop scheme to a massive antenna array.

Meanwhile, according to one embodiment of the present invention, it may be able to use a closed loop and an open loop using a hybrid scheme. A CSI feedback is restricted to be performed for a part of RS ports only and the rest of the RS ports are used using an open-loop precoding scheme. More specifically, the total RS ports to be measured can be classified into several antenna port groups. Inter-group precoding can be performed using the closed-loop scheme and inner-group precoding can be performed using the open-loop scheme and vise-versa. By doing so, it may be able to reduce overhead of the closed-loop scheme.

In summary, a legacy short-term feedback can be performed for a CSI-RS virtualized by a preferred long-term vertical direction and a new vertical domain codebook can be defined based on a vertical direction range at which a UE is positioned. It may be able to use a Kronecker scheme. The present invention proposes a method of transmitting a virtualization-varying CSI-RS. In order to reduce feedback overhead in FD-MIMO, it may use the open-loop scheme.

IV. Exemplary Operations and Structures of UE and/or BS

Exemplary operations and structures of a UE and/or a BS are explained based on the aforementioned embodiments in the following. Contents overlapped with the aforementioned explanation are omitted.

Figure 39:
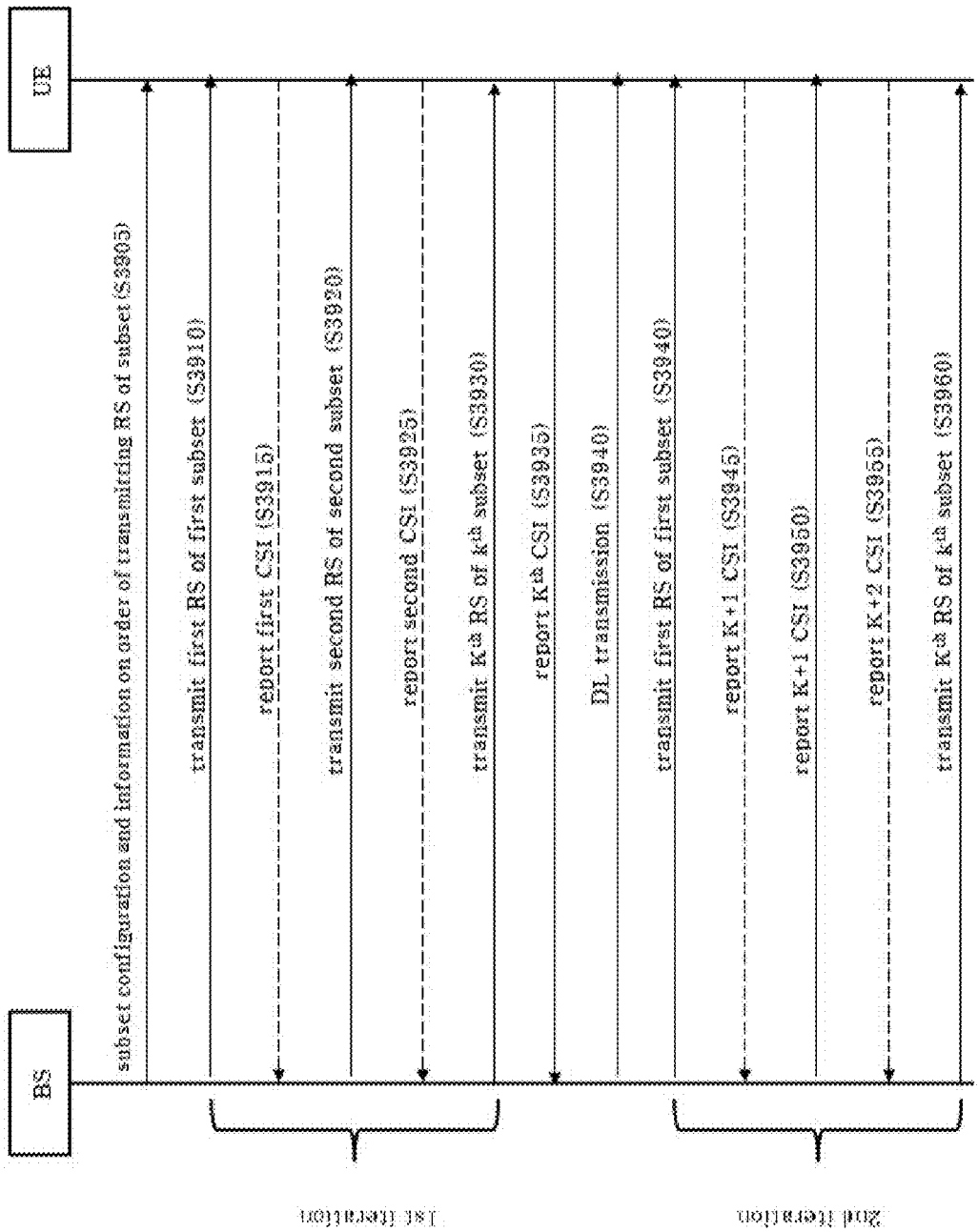
FIG. 39 is a diagram for RS transmission and CSI feedback method according to one embodiment of the present invention.

FIG. 39 is a flowchart for a method of reporting and receiving a CSI according to one embodiment of the present invention. Referring to FIG. 39, first of all, a BS transmits a subset configuration of a plurality of antenna ports and information on an order of transmitting a reference signal transmitted by each subset within an iteration interval to a UE [S3905]. In particular, as mentioned earlier in FIG. 13, the BS transmits a reference signal to a part of antenna ports only during an interval. Hence, the BS informs the UE of a subset configuration of antenna ports and a transmission order.

In this case, at least one or more antenna ports among a plurality of the antenna ports are included in all subsets.

Meanwhile, averaging results of measuring reference signals transmitted by each subset is prohibited in a same iteration interval. In particular, averaging S3910, S3920 and S3930 belonging to a first iteration interval is prohibited.

The BS transmits a first reference signal, a second reference signal and a third reference signal through antenna ports of a first subset, antenna ports of a second subset and antenna ports of a K subset, respectively [S3910, S3920, S3930]. The UE can obtain partial channel information in a manner of measuring the first reference signal, the second reference signal and the third reference signal, respectively.

Meanwhile, a method for the UE to report a CSI may vary according to an embodiment. For example, the UE can transmit information on all radio channels to a number 1 after the first iteration interval elapses. In this case, the step S3915 and the step S3925 are omitted. For example, the UE matches first partial channel information based on measurement of the first reference signal and second partial channel information based on measurement of the second reference signal with each other. The UE transmits a matched result to the BS.

At least one or more antenna ports included in all subsets provide phase information becoming a reference for matching the first partial channel information based on measurement of the first reference signal and the second partial channel information based on measurement of the second reference signal with each other.

On the contrary, the UE is able to report a CSI whenever a reference signal is measured. For example, the UE transmits first partial channel information corresponding to an antenna port of a first subset based on a measurement result of a first reference signal [S3915] and transmits second partial channel information corresponding to an antenna port of a second subset based on a measurement result of a second reference signal [S3925]. The BS can reconfigure the first partial channel information and the second partial channel information as overall channel information.

For example, the UE performs singular value decomposition on channel information which is generated based on at least one of the measurement of the first reference signal and the measurement of the second reference signal. The UE compares a right singular matrix according to the singular value decomposition with matrixes included in a prescribed codebook in terms of a phase and quantizes the right singular matrix. The UE transmits at least one of the quantized right singular matrix and a left singular matrix according to the singular value decomposition to the BS. Meanwhile, the quantized right singular matrix may correspond to a matrix which is generated by accumulating the measurement result of the first reference signal and the measurement result of the second reference signal.

Figure 40:
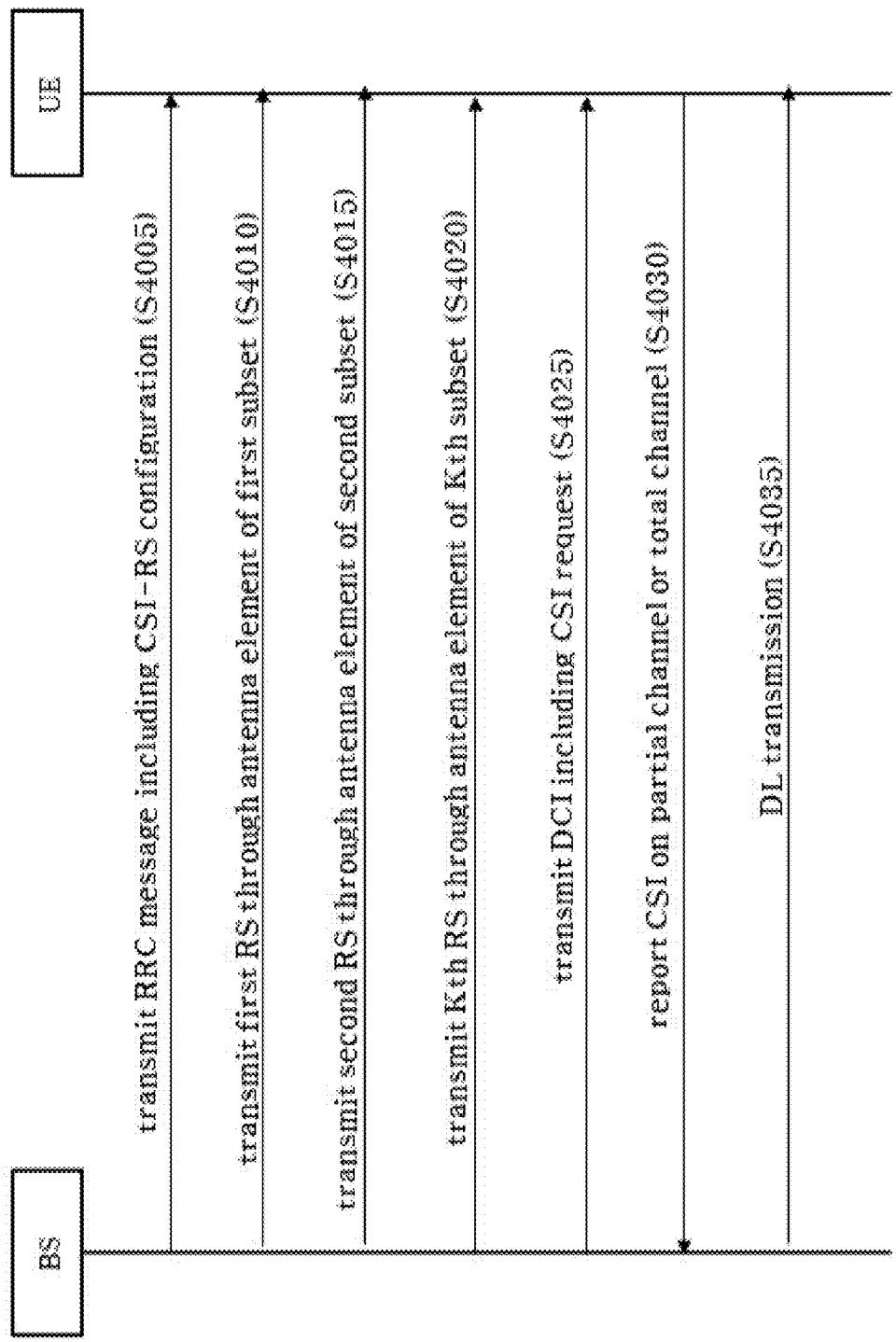
FIG. 40 is a diagram for RS transmission and CSI feedback method according to a different embodiment of the present invention.

FIG. 40 is a flowchart for a method of reporting and receiving a CSI according to a different embodiment of the present invention. Explanation on contents overlapped with the aforementioned contents is omitted at this time.

First of all, a BS transmits an RRC message including at least one or more CSI-RS configurations for a first direction domain to a UE [S4005]. The RRC message can further include at least one or more CSI-RS configurations for a second direction domain. In this case, the first direction and the second direction may correspond to a vertical direction or a horizontal direction (or azimuth direction).

A CSI-RS configuration for a single direction may have a single CSI-RS configuration (the aforementioned case 1 and 2) or may have a plurality of CSI-RS configurations (the aforementioned case 3 and 4).

If a single CSI-RS configuration is set to a UE for a single direction, the CSI-RS configuration can include information on a pattern of virtualization varying. For example, the virtualization varying is to map a first antenna port used to be mapped to a first antenna element of a first subset to a second antenna element of a second subset according to a CSI-RS transmission interval.

The BS transmits the K number of CSI-RSs to the UE through antenna elements of the K number of subsets [S4010, S4015, S4020]. The K number of CSI-RSs can be transmitted from subframes different from each other.

If there is a single CSI-RS configuration for a first direction domain, a first CSI-RS and a second CSI-RS are transmitted through a first subset and a second subset, respectively, as antenna ports related to the single CSI-RS configuration are virtualization varying according to a CSI-RS transmission interval.

If there are pluralities of CSI-RS configurations for the first direction domain, the first CSI-RS and the second CSI-RS respectively correspond to CSI-RS configurations different from each other.

The BS transmits a DCI including a CSI request filed to the UE [S4025]. In case of periodic CSI transmission, the present step can be omitted. Meanwhile, the DCI can further include information on a CSI reporting scheme. The information on the CSI reporting scheme indicates either a first reporting scheme or a second reporting scheme. According to the first reporting scheme, the UE individually reports a CSI for a first partial channel corresponding to a first subset and a CSI for a second partial channel corresponding to a second subset (the aforementioned case 2 and 4). According to the second reporting scheme, the UE reports a CSI for total channels obtained based on at least one of the first partial channel and the second partial channel (the aforementioned case 1 and 3). Meanwhile, the total channels in the second reporting scheme can be obtained in a manner of performing interpolation on at least one of the first partial channel and the second partial channel or matching the first partial channel and the second partial channel with each other.

In another embodiment, the information on the CSI reporting scheme can be transmitted through a MAC or RRC message.

The UE performs a CSI reporting using the K number of CSI-RSs. If the UE performs the CSI reporting according to the first reporting scheme, the CSI reporting includes at least one of a PMI (precoding matrix index) selected from a 4 or 8-port based codebook and an RI (rank indicator) indicating 4 or 8. If the UE performs the CSI reporting according to the second reporting scheme, the CSI reporting includes at least one of a PMI (precoding matrix index) selected from a 16 or 32-port based codebook and an RI (rank indicator) indicating 16 or 32.

The aforementioned technology proposed by the present invention can be identically or similarly applied to a case of performing CSI measurement based on a CSI-RS and a case of performing CSI measurement based on a different reference signal (e.g., a CRS, an SRS, a TRS (tracking RS), a DMRS, a cell-specific reference signal of a different form, or a UE-specific reference signal) and performing CSI feedback.

The aforementioned various examples of the present invention can be independently applied or two or more embodiments can be applied at the same time.

Figure 41:
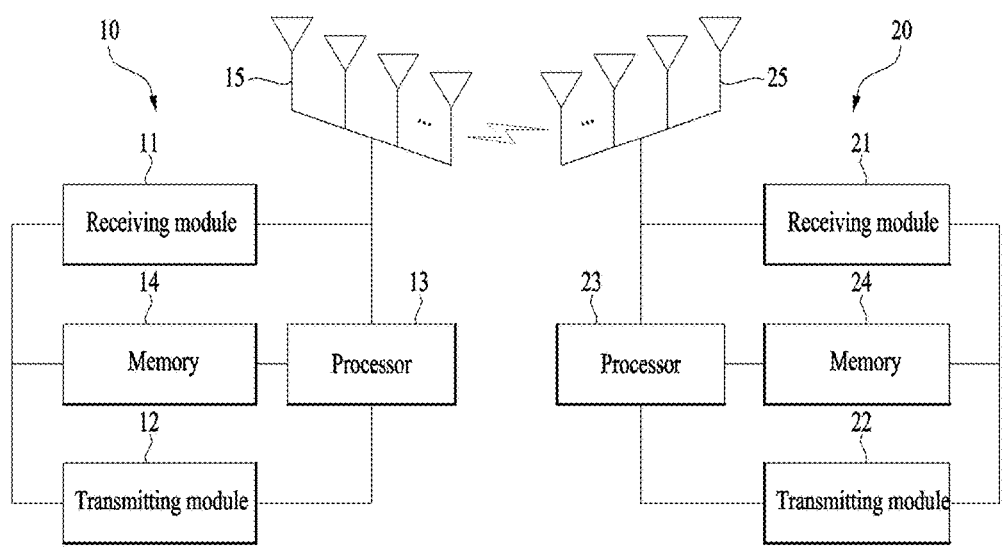
FIG. 41 is a diagram for structures of a user equipment and a base station according to one embodiment of the present invention.

FIG. 41 is a diagram for structures of a user equipment and a base station according to one embodiment of the present invention. In order to prevent a topic of the present invention from being unclear, a common configuration element is not depicted in FIG. 41. And, since the depicted configuration elements are not mandatory configuration elements, those skilled in the art can understand that a part of the configuration elements can be omitted or replaced with a different configuration element. The aforementioned embodiments and methods can be performed by the UE and the BS depicted in FIG. 41.

A base station (BS) 10 according to one embodiment of the present invention can include a transmitter 11, a receiver 12, a processor 13, a memory 14 and a plurality of antennas 15. The transmitter 11 can transmit various signals, data and information to an external device (e.g., a user equipment (UE)). The receiver 12 can receive various signals, data and information from an external device (e.g., a user equipment (UE)). The processor 13 can control overall operation of the BS 10. For example, a plurality of the antennas 15 can be configured according to a 2-dimensional antenna array.

The processor 13 of the BS according to one example of the present invention can be configured to receive channel state information according to examples proposed by the present invention. Besides, the processor 13 of the BS 10 performs a function of calculating and processing information received by the BS 10, information to be transmitted to the external and the like. The memory 14 can store processed information for prescribed time and can be replaced with such a configuration element as a buffer (not depicted).

A UE 20 can include a transmitter 21, a receiver 22, a processor 23, a memory 24 and a plurality of antennas 25. A plurality of the antennas 25 indicates a UE supporting MIMO transmission and reception. The transmitter 21 can transmit various signals, data and information to an external device (e.g., a base station (BS)). The receiver 22 can receive various signals, data and information from an external device (e.g., a base station (BS)). The processor 23 can control overall operation of the UE 20.

The processor 23 of the UE 20 according to one example of the present invention can be configured to transmit channel state information according to examples proposed by the present invention. Besides, the processor 23 of the UE 20 performs a function of calculating and processing information received by the UE 20, information to be transmitted to the external and the like. The memory 24 can store processed information for prescribed time and can be replaced with such a configuration element as a buffer (not depicted).

For a concrete configuration of the UE 10, items mentioned earlier in various embodiments of the present invention can be independently applied or two or more embodiments can be applied at the same time. For clarity, explanation on contents overlapped with the aforementioned contents is omitted.

When the various embodiments of the present invention are explained, a downlink transmission entity or an uplink transmission entity is mainly explained as a base station for example and a downlink reception entity or an uplink transmission entity is mainly explained as a user equipment for example, by which the present invention may be non-limited. For example, explanation on the base station can be identically applied to a case that a cell, an antenna port, an antenna port group, a remote radio head (RRH), a transmission point, a reception point, an access point, a relay or the like becomes a downlink transmission entity to the UE or an uplink reception entity from the UE.

And, if a relay becomes a downlink transmission entity to the UE or an uplink reception entity from the UE, or the relay becomes an uplink transmission entity to the BS or a downlink reception entity from the BS, the principle of the present invention can also be identically applied via various embodiments of the present invention.

The embodiments of the present invention may be implemented through various means. For example, the embodiments can be implemented by hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to accord with the widest scope corresponding to the principles and novel features disclosed herein.

INDUSTRIAL APPLICABILITY

Although a method of reporting channel state information for 3-dimensional beamforming in a wireless communication system and an apparatus therefor are explained centering on examples applied to 3GPP LTE system, the method and the apparatus can also applied to various wireless communication systems as well as 3GPP LTE system.

What is claimed is:

1. A method of reporting channel state information (CSI) by a user equipment in a wireless communication system, the method comprising:
   measuring a first reference signal transmitted from antenna ports of a first subset among a plurality of antenna ports of a base station;
   measuring a second reference signal transmitted from antenna ports of a second subset among the plurality of antenna ports; and
   reporting CSI to the base station based on at least one of measurement of the first reference signal and measurement of the second reference signal,
   wherein at least one of the plurality of antenna ports is contained in both the first subset and the second subset, and
   wherein the reporting the CSI comprises:
      performing singular value decomposition on channel information which is generated based on at least one of the measurement of the first reference signal and the measurement of the second reference signal;
      quantizing a right singular matrix by comparing a phase of the right singular matrix according to the singular value decomposition and a phase of matrixes contained in a prescribed codebook with each other; and
      transmitting at least one of the quantized right singular matrix and a left singular matrix according to the singular value decomposition to the base station.

2. The method of claim 1, wherein the reporting the CSI comprises transmitting information on entire radio channels after all of the plurality of antenna ports are measured at least one time.

3. The method of claim 1, wherein the reporting the CSI comprises:
   transmitting information on a first partial channel corresponding to the antenna ports of the first subset based on a result of measuring the first reference signal; and transmitting information on a second partial channel corresponding to the antenna ports of the second subset based on a result of measuring the second reference signal, wherein the information on the first partial channel and the information on the second partial channel are reconfigured as entire channel information by the base station.

4. The method of claim 1, wherein the reporting the CSI comprises:

matching information on a first partial channel based on the measurement of the first reference signal with information on a second partial channel based on the measurement of the second reference signal; and transmitting a result of the matching to the base station.

5. The method of claim 1, wherein the at least one antenna port contained in both the first subset and the second subset provides phase information to be a reference for matching information on a first partial channel based on the measurement of the first reference signal with information on a second partial channel based on the measurement of the second reference signal.

6. The method of claim 1, further comprising:

receiving a subset configuration of the plurality of antenna ports and information on a reference signal transmission order of each of subsets within a single iteration interval.

7. The method of claim 6, wherein averaging measurement results of reference signals transmitted by each of the subsets is prohibited in a same iteration interval.

8. The method of claim 1, wherein the quantized right singular matrix corresponds to a matrix generated by accumulating the measurement result of the first reference signal and the measurement result of the second reference signal.

9. A user equipment for reporting channel state information (CSI) in a wireless communication system, the user equipment comprising:

a receiver configured to receive a first reference signal transmitted from antenna ports of a first subset among a plurality of antenna ports of a base station and configured to receive a second reference signal transmitted from antenna ports of a second subset among the plurality of antenna ports; and a processor configured to respectively measure the received first reference signal and the second reference signal and configured to report CSI to the base station based on at least one of measurement of the first reference signal and measurement of the second reference signal, wherein at least one of the plurality of antenna ports is contained in both the first subset and the second subset, and wherein in reporting the CSI, the processor performs singular value decomposition on channel information which is generated based on at least one of the measurement of the first reference signal and the measurement of the second reference signal, quantizes a right singular matrix by comparing a phase of the right singular matrix according to the singular value decomposition and a phase of matrixes contained in a prescribed codebook with each other and reports at least one of the quantized right singular matrix and a left singular matrix according to the singular value decomposition to the base station.

* * * * *